US008050217B2

(12) United States Patent
Aso et al.

(10) Patent No.: US 8,050,217 B2
(45) Date of Patent: Nov. 1, 2011

(54) COMMUNICATION NODE AND COMMUNICATION CONTROL METHOD

(75) Inventors: Keigo Aso, Kanagawa (JP); Jun Hirano, Kanagawa (JP); Tien-Ming Benjamin Koh, Singapore (SG); Chan Wah Ng, Singapore (SG); Pek Yew Tan, Singapore (SG)

(73) Assignee: Panasonic Corporation, Osaka (JP)

( * ) Notice: Subject to any disclaimer, the term of this patent is extended or adjusted under 35 U.S.C. 154(b) by 1096 days.

(21) Appl. No.: 11/817,643

(22) PCT Filed: Mar. 3, 2006

(86) PCT No.: PCT/JP2006/304144

§ 371 (c)(1),
(2), (4) Date: Aug. 31, 2007

(87) PCT Pub. No.: WO2006/093288

PCT Pub. Date: Sep. 8, 2006

(65) Prior Publication Data

US 2008/0259848 A1     Oct. 23, 2008

(30) Foreign Application Priority Data

Mar. 4, 2005   (JP) ................................. 2005-061663
Jul. 29, 2005   (JP) ................................. 2005-222240
Feb. 23, 2006   (JP) ................................. 2006-047336

(51) Int. Cl.
*H04L 12/28*     (2006.01)
*H04Q 7/38*      (2006.01)
*H04Q 7/20*      (2006.01)

(52) U.S. Cl. ........ 370/328; 370/331; 370/349; 370/352; 370/401; 455/440; 455/445

(58) Field of Classification Search .......... 370/312–468; 455/417–445; 709/238, 228, 245
See application file for complete search history.

(56) References Cited

U.S. PATENT DOCUMENTS

| 6,233,457 | B1 * | 5/2001 | Wiehe ........................... 455/445 |
| 7,929,435 | B2 | 4/2011 | Ono |
| 2004/0008630 | A1 * | 1/2004 | Corson et al. ................. 370/241 |

(Continued)

FOREIGN PATENT DOCUMENTS

JP     2005-033374     2/2005

(Continued)

OTHER PUBLICATIONS

E. Nordmark, et al., "Multihoming L3 Shim Approach," Internet Draft: <draft-ietf-multi6-l3shim-00.txt>, Jan. 10, 2005, pp. 1-27.

(Continued)

*Primary Examiner* — Afsar M. Qureshi
(74) *Attorney, Agent, or Firm* — Dickinson Wright PLLC

(57) ABSTRACT

A mobility condition determination unit, provided in an MIP controller that manages moving of a communication node, obtains and examines various conditions that have occurred as the communication node is moving, selects an appropriate HoA (e.g., the home address of an MN1) for the current connection situation, and transmits, to a multihoming controller, a notification indicating that a set of the selected HoA and a CoA constitutes appropriate addresses to be used. Upon receiving the notification from the mobility condition determination unit, the multihoming controller transmits, to the MIP controller, an address (Addr2) consonant with the received HoA, and the MIP controller performs packet communication using the HoA or the CoA consonant with the address.

35 Claims, 22 Drawing Sheets

U.S. PATENT DOCUMENTS

2005/0007995 A1     1/2005     Inoue

FOREIGN PATENT DOCUMENTS

WO     2004/105272     12/2004

OTHER PUBLICATIONS

R. Stewart, et al., "Stream Control Transmission Protocol," Network Working Group, Oct. 2000, pp. 1-134.

D. Johnson, et al., "Mobility Support in IPv6," Network Working Group, Jun. 2004, pp. 1-165.

R. Wakikawa, et al., "Multiple Care-of Addresses Registration," MIP6 Working Group, Internet Draft: draft-wakikawa-mobileip-multiplecoa-03.txt, Jun. 19, 2004, pp. 1-27.

R. Draves, "Default Address Selection for Internet Protocol version 6 (IPv6)," Network Working Group, Feb. 2003, pp. 1-24.

PCT International Search Report dated Apr. 4, 2006.

N. Montavont et al.; "Mobile IPv6 for multiple interfaces, draf-montavont-mip6-mmi-01.txt, Oct. 22, 2003,"7, pp. 16-19 ("Load balancing Mobility").

Ryujj Wakikawa et al.; "Multiple Care-of Addresses Registration, draft-wakikawa-mobileip-multiplecoa-03.txt, Jun. 23, 2004," 6.1, Searching Binding Cache with Binding Unique Identification Number.

Ylitalo, J. et al.; "Dynamic network interface selection in multihomed mobile hosts, System Sciences, 2003, Proceedings of the 36th Annual Hawaii International Conference on, Jan. 9, 2003, Distributed Policies, the second sentence" A mobile node specific connection.

Montavont, LSIIT-ULP R Wakikawa Keio University, T Ernst Wide at Keio University, T Noel LSIIT-ULP C Ng Panasonic Singapore Labs N: "Analysis of Multihoming in Mobile Ipv6; draft-montavont-mobileip-multihoming-pb-statement-03.txt," IETF Standard-Working-Draft, Internet Engineering Task Force, IETF, Ch, No. 3, Jan. 10, 2005, XP015039447 ISSN: 0000-0004.

C. Ahlund, A. Zaslavsky: "Multihoming with Mobile IP," 6th IEEE International Conference, High Speed Networks and Multimedia Communications, vol. 2720/2003, Jul. 23, 2003-Jul. 25, 2003 pp. 235-243, XP002467519 Lisbon.

Japanese Office Action dated Jul. 22, 2011.

International Search Report dated Apr. 4, 2006.

Office Action dated Dec. 11, 2009, in the corresponding Chinese Patent Application with English translation.

N. Montavont, et al. "Mobile IPv6 for multiple interfaces," IETF MIP6 Working Group Internet Draft, Oct. 2003, pp. 1-25.

J. Ylitalo, et al. "Dynamic network interface selection in multihomed mobile hosts," Proceedings of the 36th Annual Hawaii International Conference on System Sciences, Jan. 2003, 10 pages.

* cited by examiner

FIG. 7A
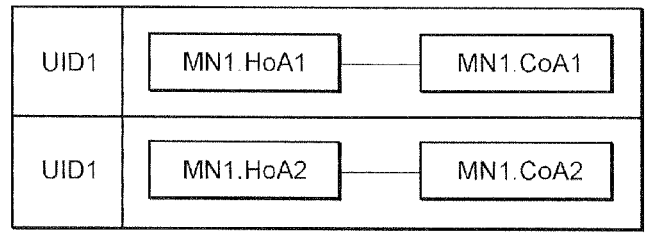
FIG. 7B
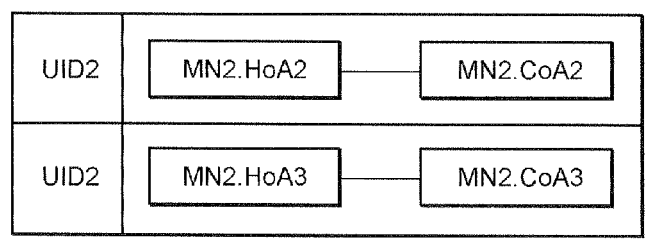
FIG. 8A
| UID | HoA | CoA | LIFETIME | PRIORITY | PFLAGS | IFID | ... |
|---|---|---|---|---|---|---|---|
| UID2 | MN2.HoA2 | MN2.CoA2 | 25 | 25 | 1001 | 1 | |
| UID2 | MN2.HoA3 | MN2.CoA3 | 10 | 30 | 1100 | 2 | |
FIG. 8B
| UID | HoA | CoA | LIFETIME | PRIORITY | PFLAGS | IFID | ... |
|---|---|---|---|---|---|---|---|
| UIDx | MNx.HoAx | MNx.CoA$\alpha$ | 25 | 25 | 1001 | 1 | |
| UIDx | MNx.HoAx | MNx.CoA$\beta$ | 10 | 30 | 1100 | 2 | |

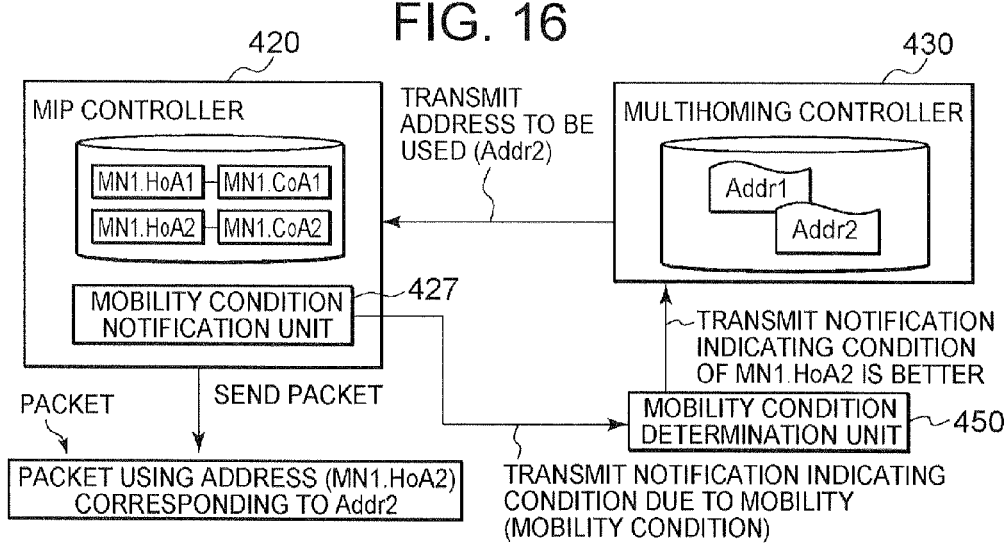
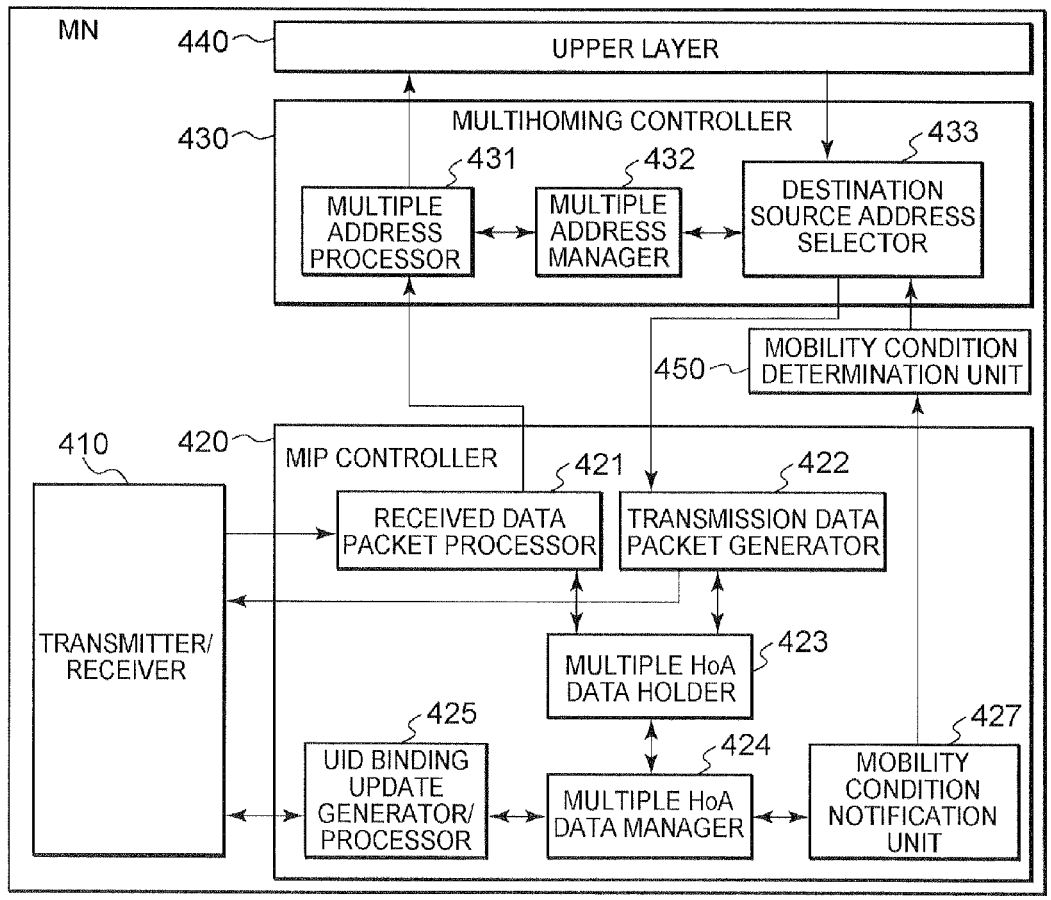

COMMUNICATION NODE AND COMMUNICATION CONTROL METHOD

TECHNICAL FIELD

The present invention relates to a communication node and a communication control method for performing communication using the IP (Internet Protocol), and particularly to a communication node in which both a multihoming function and a mobile function are mounted, and a communication control method therefor.

BACKGROUND ART

First, an explanation will be given for a case wherein a communication node is in a multihomed state. Furthermore, it is assumed that a multihomed state described herein indicates a state wherein a specific communication node maintains a plurality of IP addresses (hereinafter also referred to simply as addresses) configured based on different prefixes.

There are, roughly, the two following cases wherein a communication node is in a multihomed state.

First case: case wherein a network to which a communication node is connected is transmitting (advertising) a plurality of different prefixes.

Second case: case wherein a communication node includes a plurality of interfaces, and these interfaces are all connected to different networks, at the same time.

The first case (the case wherein a network to which a communication node is connected is transmitting (advertising) a plurality of different prefixes) could happen when, for example, a network, to which a communication node is connected, belongs to a site that is connected to a plurality of Internet service providers (ISPs) (when the site is in a multihomed state). In this case, since based on the prefixes owned by the individual ISPs, a plurality of prefixes are transmitted across the network belonging to the site and this enables the communication node connected to the network to maintain, as addresses available on the network, a plurality of addresses having different prefixes. That is, in this case, whether the communication node maintains a plurality of addresses is determined and depends on the configuration of the site. Additionally, even when the site is not in a multihomed state, the site can transmit a plurality of effective prefixes across the network.

Further, in the second case (the case wherein a communication node includes a plurality of interfaces and these interfaces are all connected to different networks, at the same time), since prefixes are transmitted by destination networks respectively connected to the individual interfaces of the communication node, at least one usable IP address for each network is allocated for each interface. Therefore, for the communication node, overall, a plurality of addresses having different prefixes are allocated for the communication node. That is, in this case, whether the communication node maintains a plurality of addresses is determined by the configuration of the communication node.

Furthermore, the communication node can also be in a multihomed state in a case wherein the first and the second cases are combined, such as one wherein a communication node including a plurality of interfaces is connected to a network that is transmitting (advertising) a plurality of different prefixes, or a case wherein at least one of the interfaces of a communication node that includes a plurality of interfaces is connected to a network that is transmitting addresses for a plurality of different networks (first case).

At present, according to the IETF MULTI6 Working Group (http://www.ietf.org/html.charters/multi6-charter.html), a method for providing an additional new layer between a network layer and an upper layer or a lower layer, or providing an additional new sub-layer to a network layer to map a plurality of IP addresses in an identifier of the upper layer, and a method for permitting a transport layer to handle a plurality of IP addresses are proposed as methods whereby a communication node in a multihomed state can perform communication using a plurality of IP addresses (see non-patent documents 1 and 2 below). It should be noted that the above methods for managing a plurality of IP addresses are those for maintaining a connection to a transport layer.

According to the method for controlling these multiple IP addresses to handle the multihomed state, both the transmission side and the reception side perform the processes in order to employ a plurality of addresses, for example, exchange of address information and selection of a source address and a destination address.

Next, a mobile IP (hereinafter also referred to as an MIP; see non-patent document 3 below) will be briefly described. For a communication node (an MN: a Mobile Node. It should here be noted that generally an MN represents both an MH (Mobile Host) and an MR (Mobile Router)) defined according to the mobile IP, at least one HoA is allocated by the home network of the communication node. When this MN has moved to another sub-network (a foreign network), the MN obtains at least one CoA (Care-of Address) on the current network, and transmits to an HA (Home Agent) present on the home network of the MN, information (binding information) that indicates a correlation between the obtained CoA and the HoA allocated via the network. Thus, the HA can receive, by proxy, a packet addressed to the HoA of the MN, and can transfer it to the CoA, so that the MN can receive the packet transmitted to the HoA even though the MN is present in the foreign network.

As defined in non-patent document 3, the address relationship the MN can register for the HA is a one-to-one correspondence of the HoA and the primary CoA, and this information is reported as a binding update message transmitted by the MN.

According to the mobile IP, binding information for the MN is designed so as to maintain a plurality of CoAs that can register with the HA, and is information indicating a correlation between one primary CoA, which is selected from a plurality of CoAs, and one HoA. That is, even when the MN includes a plurality of CoAs, only one CoA can be registered with the HA. As a result, when the MN transmits a plurality of binding update messages in order to correlate a plurality of CoAs with one HoA, the HA regards this as simple CoA updating, and as a result, the HA maintains only the binding information that was received as the last binding update message.

To resolve this problem, a method for registering a plurality of CoAs relative at a single HoA is disclosed in non-patent document 4 below. Using this method, the MN can register, as binding information, a relation between a single HoA and a plurality of CoAs (a one-to-multiple relation).

On the other hand, in a case wherein a home network is in a site multihomed state, or in a case wherein a plurality of home networks are allocated to the MN, when the MN maintains a plurality of HoAs, the MN correlates one primary CoA with each of the individual HoAs, and registers information indicating a correlation between the HoAs and the primary CoAs with the HAs that manage the respective HoAs. At this time, when the HAs that manage the HoAs differ from each other, the MN transmits a binding update message to the individual HAs that manage the HoAs, and as a result, the individual HAs prepare a binding cache.

On the other hand, when there is only one HA to a plurality of HoAs, the MN transmits to the HA binding update messages concerning the individual HoAs. Upon receiving a update message, the HA generates and manages binding caches in consonance with the binding update messages, without being aware that these binding caches are related to binding update messages transmitted by the same MN. Thus, since correlating of these binding caches is not performed, the HA has no perception of the binding caches that are provided by the same MN.

As explained above, the multihoming function of the communication node is different from the mobile IP function, and is employed both for a fixed node and a mobile node. However, when the mobile IP is applied for a communication node that performs multihoming, a plurality of HoAs and CoAs maintained by the MN are included in a plurality of IP addresses to be managed by a multihoming controller. This is because both the function of the multihoming controller and the mobile IP function depend on the configuration of layers, and generally, the multihoming controller is located higher than the mobile IP. When the MN maintains a plurality of HoAs and CoAs, the mobile IP transmits, to higher components, a notification concerning these HoAs and CoAs, and accordingly, the multihoming controller processes these HoAs and CoAs.

As described above, the feature of the MN that includes both the function of the multihoming controller and the mobile IP function is that, when a plurality of HoAs are allocated to the MN, the HoAs are managed by the multihoming controller.

Another method for selecting a source address when a host maintains a plurality of IP addresses is defined in non-patent document 5 below. Here, rules used for the selection of a source address are defined, and "Prefer Home Address" is present in the rules. This "Prefer Home Address" is a rule that, among a plurality of addresses, an address (HoA) connected to the home network is more preferential than a CoA.

[Non-Patent Document 1] Erik Nordmark, Marcelo Bagnulo, "Multihoming L3 Shim Approach", draft-ietf-multi6-13shim-00.txt, 10 Jan. 2005.

[Non-Patent Document 2] R. Stewart, Q. Xie, "Stream Control Transmission Protocol", RFC2960, October 2000.

[Non-Patent Document 3] Johnson, D. B., Perkins, C. E., and Arkko, J., "Mobility Support in IPv6", RFC3775, June 2004.

[Non-Patent Document 4] Ryuji Wakikawa, Keisuke Uehara, Thierry Ernst, "Multiple Care-of Addresses Registration" IETF Internet Draft: draft-wakikawa-mobileip-multiplecoa-03.txt, 19 Jun. 2004.

[Non-Patent Document 5] R. Draves, "Default Address Selection for Internet Protocol version 6 (IPv6)", RFC3484, February 2003.

However, since the multihoming controller is so designed that it is not concerned with the moving of the communication node, and only manages a plurality of addresses maintained by the communication node, the multihoming controller does not recognize that the address managed by the multihoming controller is an HoA or a CoA for the mobile IP, since the communication node has moved. Therefore, for example, the rule described in non-patent document 5 can not be directly employed for the multihoming controller.

Therefore, assume that the MN maintains a plurality of addresses because the site whereat the home network of the MN is located is currently performing multihoming, or because a plurality of home networks are allocated for the MN at the same time. In this case, since the multihoming controller that manages these addresses is separated from an MIP layer (hereinafter referred to as an MIP controller) that includes a function related to a mobile IP, when the multihoming controller selects, for example, a specific address as a source address, actually, as the MN is moving, the selected address is changed to that for the HoA of the mobile IP. Further, in a case wherein a CoA obtained at a connection destination is allocated for the interface, the address the multihoming controller has selected as a source address no longer accurately indicates the current location of the MN.

That is, although a new condition has been established by the movement of the MN, the multihoming controller is not aware of this, and based only on the policy of the multihoming controller, selects, as a source address, one of multiple addresses maintained by the multihoming controller. According to this configuration, it is not possible to say that the actual situation of the MN does not correspond to the address selection performed by the multihoming controller, and a condition that should be considered from the viewpoint of mobility is not referred to at all.

As a result, in the case of the transmission of a packet via the HA by the MN, the transmission is performed through the HA that is present on a network to which a home address selected by the multihoming controller is allocated, and selection of the HA is not performed while the states of a plurality of HAs are considered. Thus, a packet is transmitted using an inappropriate address that has been selected, and there are problems in that various defects, such as delays and packet losses, may occur.

While referring to FIG. 29, an explanation will be given for the above described conventional problem that, in a case wherein both the mobile IP and the protocol that achieves multihoming are mounted in one MN, a mobility condition that occurs as the MN is moving is not appropriately reflected. FIG. 29 is a schematic diagram showing a first example internal arrangement of an MN to explain a problem related to the prior art.

An MIP controller 1920 and a multihoming controller 1930 mounted in an MN are shown in FIG. 29. Further, the presence of the MIP controller 1920 indicates that a protocol, such as an MIP, to provide mobility management is mounted in the MN, and the presence of the multihoming controller 1930 indicates that a protocol that performs multihoming is also mounted in the MN.

Assume, for example, that the MN is in the multihomed state, and the multihoming controller 1930 manages two addresses (Addr1 and Addr2). At this time, suppose that the MN moved from its home network to a foreign network, and has obtained a CoA (MN1.CoA1) correlated with Addr1 (=MN1.HoA1) and a CoA (MN1.CoA2) correlated with Addr2 (=MN1.HoA2).

However, the multihoming controller 1930 is not aware that the two managed addresses (Addr1 and Addr2) have been changed to HoAs for the MN, and selects an address to be used for communication with a predetermined communication partner, not knowing that the MN has moved. For example, when the multihoming controller 1930 has selected Addr1 of the two addresses (Addr1 and Addr2), the multihoming controller 1930 transmits, to the MIP controller 1920, a notification indicating that Addr1 is the address to use. Upon receiving this notification, the MIP controller 1920, which includes only a function for generating a packet using an address that has been transmitted by the multihoming controller 1930, designates, as a source address, MN1.HoA1, which is the same as Addr1, or MN1.CoA1, which corresponds to MN1.HoA1, and transmits a packet. Therefore, according to this problem encountered with the prior art, in a case wherein a condition exists such that, as the MN moves, MN1.HoA2 or MN1.CoA should be designated as a source address for a packet is established, and an address selected by the multihoming controller is designated as a source address for a packet.

A problem that has been encountered in a case wherein the multihoming controller is located higher than the mobile IP is shown in FIG. 29. Likewise, in this case, as shown in FIG. 30, wherein a multihoming controller is located lower than a mobile IP, appropriate cooperation for address selection is not available between an MIP controller and the multihoming controller, and a resulting problem is that a condition (an address selection condition) due to the multihomed state of an MN is not appropriately reflected. This problem will now be described while referring to FIG. 30. FIG. 30 is a schematic diagram showing a second example MN internal arrangement for explaining a problem related to the prior art.

An MIP controller 1920 and a multihoming controller 1930 mounted in an MN are shown in FIG. 29. It should be noted that, as described above, the MIP controller 2020 is located higher than the multihoming controller 2030 in FIG. 30.

Assume, for example, that the MN is in the multihomed state and the multihoming controller 2030 is managing two addresses (Addr1 and Addr2). In addition, the multihoming controller 2030, located lower than the MIP controller 2020, is designed to manage an IP address (also called a locator, according to a technique related to multihoming) allocated to an interface, in correlation with a ULID (Upper-Layer Identifier), and the MIP controller 2020 is designed to correlate and manage home addresses in correlation with the ULIDs. Here, suppose that the multihoming controller 2030 holds a correlation between Addr1 (=MN1.CoA1) and ULID1 and a correlation between Addr2 (=MN1.CoA2) and ULID2, and the MIP controller 2920 holds a correlation between MN1.HoA1 and ULID1 and a correlation between MN1.HoA2 and ULID2.

Further, the multihoming controller 2030 can manage a plurality of ULIDs. The multihoming controller 2030 can also manage one ULID in correlation with a plurality of addresses, and for example, in FIG. 30, can manage ULID1 by correlating it with a plurality of addresses that, at the same time, differ from Addr1. In this case, upon receiving an instruction to use ULID1 in the upper layer, for example, the multihoming controller 2030 can select one of multiple addresses correlated with ULID1.

At this time, in a case wherein, for example, an environment is changed as the MN moves, the MIP controller 2020 employs a condition (a mobility condition) that is due to the mobility attained by the MIP controller 2020 to select an address for use in communication with a predetermined communication partner. For example, when the MIP controller 2030 selects MN1.HoA1, one of the two addresses (MN1.HoA1 and MN1.HoA2), the MIP controller 2030 transmits, to the multihoming controller 2030, a notification indicating that ULID1 is an address to be used. Based on ULID1, the multihoming controller 2030, which includes only a function for selecting one or a plurality of addresses (Addr1 in the example in FIG. 30) correlated with ULID1, designates Addr1 (MN1.CoA1) as a source address, and transmits a packet. Therefore, according to the prior art, the problem is that, even in a case wherein MN1.CoA2 should be designated as a source address for a packet, in accordance with an address selection condition that is due to multihoming, only an address limited to the ULID that is selected by the MIP controller 2020 is designated as a source address for a packet.

DISCLOSURE OF THE INVENTION

While taking the above described shortcomings into account, the objective of the present invention is to select an appropriate address in a case wherein a communication node includes a mobility management function and a multihoming function.

In order to achieve this objective, according to the present invention, a communication node comprises:

multihoming control means for managing a multihomed host that includes a plurality of addresses originating in different networks;

mobility management means, located at a layer lower than the multihoming controller, for managing movements;

mobility condition determination means for determining an address appropriate for communication with a communication partner, while taking into account a mobility condition, the result of moving oneself or of the communication partner moving, made possible by the mobility management means; and transmission data packet generation means for generating a packet for which an appropriate address for communication with the communication partner is designated based on determination results obtained by the mobility condition determination means.

According to this configuration, when the communication node includes both a mobility management function and a multihoming function, based on a condition the result of moving, an appropriate address can be selected from multiple addresses in a multihomed state.

Further, in addition to the above arrangement, the communication node of the invention is so designed that:

the mobility management means includes the mobility condition determination means, and when the mobility condition determination means transmits the determination results to the multihoming control means, the multihoming control means selects, from the plurality of addresses, an address appropriate for communication with the communication partner.

According to this configuration, when the communication node includes both a mobility management function and a multihoming function, based on a condition the result of moving, an appropriate address can be selected from multiple addresses in a multihomed state.

Furthermore, in addition to the above arrangement, the communication node of the present invention is so designed that:

the mobility management means includes the mobility condition determination means, and the mobility condition determination means determines which address is appropriate for communication with the communication partner, while ignoring an address selection condition that is related to a multihomed state and is made possible by the multihoming means.

According to this configuration, when the communication node includes both a mobility management function and a multihoming function, based on a condition the result of moving, an appropriate address can be selected from multiple addresses in a multihomed state.

Also, in addition to the above arrangement, the communication node of the present invention is so designated that:

the mobility management means includes the mobility condition determination means, and the multihoming control means transmits, to the mobility condition determination means, a notification indicating an address selection condition that is related to a multihomed state and is available by the multihoming control means, and, while taking into account not only the mobility condition but also the address selection condition, the mobility condition determination means determines an address appropriate for communication with the communication partner.

According to this configuration, when the communication node includes both a mobility management function and a multihoming function, based on a condition the result of moving, an appropriate address can be selected from multiple addresses in a multihomed state.

Moreover, in addition to the above arrangement, the communication node of the present invention is so designated that:

the mobility management means includes mobility condition notification means for obtaining the mobility condition and transmitting the mobility condition to the mobility condition determination means, the multihoming means includes the mobility condition determination means, and based on the determination results obtained by the mobility condition determination means, the multihoming means selects an address appropriate for communication with the communication partner from the plurality of addresses.

According to this configuration, when the communication node includes both a mobility management function and a multihoming function, based on a condition the result of moving, an appropriate address can be selected from multiple addresses in a multihomed state.

Further, in addition to the above arrangement, the communication node of the present invention is so designated that:

the mobility condition determination means determines an address appropriate for communication with the communication partner, while taking into not only the mobility condition, but also an address selection condition that is related to a multihomed state and is available by the multihoming control means.

According to this configuration, when the communication node includes both a mobility management function and a multihoming function, based on both a condition the result of moving and a condition related to a multihomed state, an appropriate address can be selected from multiple addresses in a multihomed state.

Furthermore, in addition to the above arrangement, the communication node of the present invention is so designed that:

the mobility management means includes mobility condition notification means for obtaining the mobility condition, and transmitting, to the mobility condition determination means, a notification indicating the mobility condition, the mobility condition determination means is provided separately from the multihoming control means and the mobility management means, and based on the determination results received from the mobility condition determination means, the multihoming control means selects, from the plurality of addresses, an address appropriate for communication with the communication partner.

According to this configuration, when the communication node includes both a mobility management function and a multihoming function, based on a condition the result of moving, an appropriate address can be selected from multiple addresses in a multihomed state.

Further, in addition to the above arrangement, the communication node of the present invention is so designed that the mobility management means includes:

multiple home address information sets holding means for employing the plurality of addresses as individual home addresses to hold information indicating a correlation between the plurality of home addresses and care-of addresses corresponding to the home addresses; and message generation means for generating a plurality of messages, each of which includes the plurality of correlation information sets for another communication node, and to which identification information is added in order to identify the communication node.

According to this arrangement, the communication node can transmit a binding update message to transmit, to a communication partner, a notification indicating binding information for a plurality of home addresses of the node and corresponding care-of addresses.

Moreover, in addition to the above arrangement, the communication node of the present invention is so designed that the message generation means generates and transmits the message that includes not only the correlation information, but also a usage priority of addresses included in the correlation information.

According to this arrangement, the communication node can designate the priority level for usage of an address related to binding information for a plurality of home addresses of the node and corresponding care-off addresses.

Also, in addition to the above arrangement, the communication node of the present invention is so designed that the mobility management means includes:

message reception means for receiving, from a different communication node, a message which includes information indicating a correlation between a home address owned by a different communication node and a corresponding care-of address, and to which identification information is added to identify the different communication node; and binding cache holding means for storing the correlation information and the identification information received by the message reception means, in correlation with each other.

According to this arrangement, the communication node can receive, from a communication partner, binding information for a plurality of home addresses for the communication partner and corresponding care-of addresses, and hold a plurality of binding information sets so as to identify a plurality of information sets related to the same communication partner.

Moreover, in addition to the above arrangement, the communication node of the present invention is so designed that:

the message reception means receives the message that includes not only the correlation information but also a usage priority of an address included in the correlation information, and the binding cache holding means also stores the address usage priority, in correlation with the correlation information and the identification information.

According to the arrangement, when a plurality of binding information sets are maintained so as to identify multiple binding sets related to the same communication partner, the communication node can also hold the address usage priority concerning each binding information set.

Furthermore, in addition to the above arrangement, the communication node of the present invention is so designed that the mobility condition considered by the mobility condition determination means is employed as a condition that can be obtained based on information held by the binding cache holding means.

According to this arrangement, the communication node can employ, as a mobility condition, the contents of a binding update message received from the communication partner.

Further, in addition to the above arrangement, the communication node of the present invention is so designed that the mobility management means includes:

address information holding means for employing one of the plurality of addresses as a home address, and holding information indicating a correlation between the home address and a plurality of care-of addresses corresponding to the home address; and message transmission means for generating and transmitting a first message that includes the correlation information and a second message that includes care-of address selection information to be used as a condition for selection of one of the plurality of care-of addresses.

According to this arrangement, when a plurality of care-of addresses are correlated with one home address owned by the communication node, the communication node can transmit, to another communication node, not only the binding information but also care-of address selection information that is used as a condition for selection of one of the plurality of care-of addresses. It should be noted that the first and the second messages may be transmitted separately, or may be formed together as one message to be transmitted.

Also, in addition to the above arrangement, the communication node of the present invention is so designed that the mobility management means includes:

message reception means for receiving, from a different node, a first message, which includes information indicating a correlation between a home address for the different node and a plurality of care-of addresses corresponding to the home address, and a second message, which includes care-of address selection information to be used as a condition for selection of one of the plurality of care-of addresses; and destination address setting means for selecting one of the plurality of care-of addresses based on the care-of address selection information included in the second message that is received by the message reception means, and for designating the selected care-of address as a destination address of a packet that should arrive at the different communication node.

According to this arrangement, the communication node can receive binding information, which indicates a correlation between a plurality of care-of addresses and a home address for a different communication node, and care-of address selection information, which is used as a condition for selection of one of the plurality of care-of addresses for the different communication node, and can employ the care-of address selection information to select a care-of address that is used as a destination address for a packet that should arrive at the different communication node. It should be noted that the first and the second messages may be transmitted separately, or may be formed together as one message to be transmitted.

Moreover, in addition to the above arrangement, the communication node of the present invention is so designed that the mobility management means includes:

message reception means for receiving, from a different communication node, a first message that includes a plurality of addresses for the different communication node, and a second message that includes address selection information to be used as a condition for selection of one of the plurality of addresses;

destination address setting means for selecting one of the plurality of addresses based on the address selection information that is included in the second message received by the message reception means, and for designating the selected address as a destination address of a packet that should arrive at the different communication node.

According to this arrangement, the communication node can receive a plurality of addresses related to a different communication node and address selection information that is used as a condition to select one of the plurality of addresses for the different communication node, and can employ the address selection information to select an address that is used as a destination address for a packet that should arrive at the different communication node. It should be noted that the first and the second messages may be transmitted separately, or may be formed together as one message to be transmitted.

Furthermore, in order to achieve the above objective, according to the present invention, a communication node comprises:

multihoming control means for managing a multihomed host that includes a plurality of addresses originating in different networks;

mobility management means, located at a layer higher than the multihoming controller, for managing movements;

address selection condition determination means for determining an address appropriate for communication with a communication partner, while taking into account an address selection condition, made possible by the mobility management means, and related to a multihomed state; and transmission data packet generation means for generating a packet for which an appropriate address for communication with the communication partner is designated based on determination results obtained by the address selection condition determination means.

According to this configuration, when the communication node includes both a mobility management function and a multihoming function, based on a condition related to the multihomed state, an appropriate address can be selected from multiple addresses in a multihomed state.

Further, in addition to the above arrangement, the communication node of the invention is so designed that:

the multihoming control means includes the address selection condition determination means, and when the address selection condition determination means transmits the determination results to the mobility management means, the mobility management means selects, from the plurality of addresses, an address appropriate for communication with the communication partner.

According to this configuration, when the communication node includes both a mobility management function and a multihoming function, based on a condition related to the multihomed state, an appropriate address can be selected from multiple addresses in a multihomed state.

Furthermore, in addition to the above arrangement, the communication node of the present invention is so designed that:

the multihoming control means includes the address selection condition determination means, and the address selection condition determination means determines which address is appropriate for communication with the communication partner, while ignoring a mobility condition, the result of moving oneself or of the communication partner moving, which is made possible by the multihoming means.

According to this configuration, when the communication node includes both a mobility management function and a multihoming function, based on a condition related to the multihomed state, an appropriate address can be selected from multiple addresses in a multihomed state.

Also, in addition to the above arrangement, the communication node of the present invention is so designated that:

the multihoming control means includes the address selection condition determination means, and the mobility management means transmits, to the address selection condition determination means, a notification indicating a mobility condition, the result of moving oneself or of communication partner moving, which is made possible by the mobility management means, and, while taking into account not only the address selection condition but also the mobility condition, the address selection condition determination means determines an address appropriate for communication with the communication partner.

According to this configuration, when the communication node includes both a mobility management function and a multihoming function, based on a condition related to the multihomed state, an appropriate address can be selected from multiple addresses in a multihomed state.

Moreover, in addition to the above arrangement, the communication node of the present invention is so designated that:

the multihoming control means includes address selection condition notification means for obtaining the address selection condition and transmitting the address selection condition to the address selection condition determination means, the mobility management means includes the address selection condition determination means, and based on the determination results obtained by the address selection condition determination means, the mobility management means selects an address appropriate for communication with the communication partner from the plurality of addresses.

According to this configuration, when the communication node includes both a mobility management function and a multihoming function, based on a condition related to a multihomed state, an appropriate address can be selected from multiple addresses in a multihomed state.

Further, in addition to the above arrangement, the communication node of the present invention is so designated that:

the address selection condition determination means determines an address appropriate for communication with the communication partner, while taking into not only the address selection condition, but also a mobility condition, the result of moving oneself or of the communication partner moving, which is made possible by the mobility management means.

According to this configuration, when the communication node includes both a mobility management function and a multihoming function, based on both a condition the result of moving and a condition related to a multihomed state, an appropriate address can be selected from multiple addresses in a multihomed state.

Furthermore, in addition to the above arrangement, the communication node of the present invention is so designed that:

the multihoming control means includes address selection condition notification means for obtaining the address selection condition, and transmitting, to the address selection condition determination means, a notification indicating the address selection condition, the address selection condition determination means is provided separately from the mobility management means and the multihoming control means, and based on the determination results received from the address selection condition determination means, the mobility management means selects, from the plurality of addresses, an address appropriate for communication with the communication partner.

According to this configuration, when the communication node includes both a mobility management function and a multihoming function, based on a condition related to a multihomed state, an appropriate address can be selected from multiple addresses in a multihomed state.

Further, to achieve the above objective, a communication node of the present invention, which can obtain a plurality of care-of addresses in consonance with one home address, comprises:

address information holding means for holding information indicating a correlation between the home address and a plurality of care-of addresses corresponding to the home address; and message transmission means for generating and transmitting a first message that includes the correlation information and a second message that includes care-of address selection information to be used as a condition for selection of one of the plurality of care-of addresses.

According to this arrangement, when a plurality of care-of addresses are correlated with one home address owned by the communication node, the communication node can transmit, to another communication node, not only the binding information but also care-of address selection information that is used as a condition for selection of one of the plurality of care-of addresses. It should be noted that the first and the second messages may be transmitted separately, or may be formed together as one message to be transmitted.

Also, to achieve the above objective, a communication node of the present invention, which performs transmission or transfer of a packet, comprises:

message reception means for receiving, from a different node, a first message, which includes information indicating a correlation between a home address for the different node and a plurality of care-of addresses corresponding to the home address, and a second message, which includes care-of address selection information to be used as a condition for selection of one of the plurality of care-of addresses; and destination address setting means for selecting one of the plurality of care-of addresses based on the care-of address selection information included in the second message that is received by the message reception means, and for designating the selected care-of address as a destination address of a packet that should arrive at the different communication node.

According to this arrangement, the communication node can receive binding information, which indicates a correlation between a plurality of care-of addresses and a home address for a different communication node, and care-of address selection information, which is used as a condition for selection of one of the plurality of care-of addresses for the different communication node, and can employ the care-of address selection information to select a care-of address that is used as a destination address for a packet that should arrive at the different communication node. It should be noted that the first and the second messages may be transmitted separately, or may be formed together as one message to be transmitted.

Moreover, to achieve the above objective, a communication node according to the present invention, which performs packet transmission, comprises:

message reception means for receiving, from a different communication node, a first message that includes a plurality of addresses for the different communication node, and a second message that includes address selection information to be used as a condition for selection of one of the plurality of addresses;

destination address setting means for selecting one of the plurality of addresses based on the address selection information that is included in the second message received by the message reception means, and for designating the selected address as a destination address of a packet that should arrive at the different communication node.

According to this arrangement, the communication node can receive a plurality of addresses related to a different communication node and address selection information that is used as a condition to select one of the plurality of addresses for the different communication node, and can employ the address selection information to select an address that is used as a destination address for a packet that should arrive at the different communication node. It should be noted that the first and the second messages may be transmitted separately, or may be formed together as one message to be transmitted.

In order to achieve this objective, according to the present invention, provided is a communication control method, for a communication node that comprises: multihoming control means, for managing a multihomed host that includes a plurality of addresses originating in different networks; and mobility management means, located at a layer lower than the multihoming controller, for managing movements, whereby a packet, for which an address appropriate for communication with a communication partner is designated, is generated, while taking into account a mobility condition, the result of moving oneself or of the communication partner moving, made possible by the mobility management means.

According to this arrangement, when the communication node includes both a mobility management function and a multihoming function, based on a condition that has occurred due to moving, an appropriate address can be selected from a plurality of addresses in the multihomed state.

Further, in addition to the above arrangement, for the communication control method of this invention, the mobility management means selects an address appropriate for communication with the communication partner, while taking the mobility condition into account.

According to this arrangement, when the communication node includes both a mobility management function and a multihoming function, based on a condition that has occurred due to moving, an appropriate address can be selected from a plurality of addresses in the multihomed state.

Furthermore, in addition to the above arrangement, for the communication control method of this invention, the mobility management means transmits, to the multihoming control means, a notification indicating the mobility condition, and the multihoming control means selects, from the plurality of addresses, an address appropriate for communication with the communication partner, while taking the mobility condition into account.

According to this configuration, when the communication node includes both a mobility management function and a multihoming function, based on a condition the result of moving, an appropriate address can be selected from multiple addresses in a multihomed state.

Moreover, in addition to the above arrangement, for the communication control method of this invention, the mobility management means transmits the mobility condition to mobility condition determination means that is provided separately from the multihoming control means and the mobility management means, and the mobility condition determination means selects an address appropriate for communication with the communication partner, while taking the mobility condition into account.

According to this configuration, when the communication node includes both a mobility management function and a multihoming function, based on a condition the result of moving, an appropriate address can be selected from multiple addresses in a multihomed state.

Also, in addition to the above arrangement, for the communication control method of this invention, not only the mobility condition, but also an address selection condition, which is related to a multihomed state and is available by the multihoming control means, is taken into account.

According to this configuration, when the communication node includes both a mobility management function and a multihoming function, based on a condition the result of moving, an appropriate address can be selected from multiple addresses in a multihomed state.

Furthermore, in order to achieve the above objective, according to the present invention, provided is a communication control method, for a communication node that comprises: multihoming control means for managing a multihomed host that includes a plurality of addresses originating in different networks; and mobility management means, located at a layer higher than the multihoming controller, for managing movements, whereby a packet, for which an address appropriate for communication with a communication partner, is designated, while taking into account an address selection condition, made possible by the mobility management means, and related to a multihomed state.

According to this configuration, when the communication node includes both a mobility management function and a multihoming function, based on a condition related to the multihomed state, an appropriate address can be selected from multiple addresses in a multihomed state.

Further, in addition to the above arrangement, for the communication control method of this invention, the multihoming control means selects an address appropriate for communication with the communication partner, while taking the address selection condition into account.

According to this configuration, when the communication node includes both a mobility management function and a multihoming function, based on a condition related to a multihomed state, an appropriate address can be selected from multiple addresses in a multihomed state.

Also, in addition to the above arrangement, for the communication control method of this invention, the multihoming control means transmits, to the mobility management means, a notification indicating the address selection condition, and the mobility management means selects, from the plurality of addresses, an address appropriate for communication with the communication partner, while taking the address selection condition into account.

According to this configuration, when the communication node includes both a mobility management function and a multihoming function, based on a condition related to a multihomed state, an appropriate address can be selected from multiple addresses in a multihomed state.

Moreover, in addition to the above arrangement, for the communication control method of this invention, the multihoming control means transmits the address selection condition to address selection condition determination means that is provided separately from the mobility management means and the multihoming control means, and the address selection condition determination means selects an address appropriate for communication with the communication partner, while taking the address selection condition into account.

According to this configuration, when the communication node includes both a mobility management function and a multihoming function, based on a condition related to a multihomed state, an appropriate address can be selected from multiple addresses in a multihomed state.

Moreover, in addition to the above arrangement, for the communication control method of this invention, not only the address selection condition, but also a mobility condition that is caused by movement of the communication node or a communication partner and that is available by the multihoming control means is taken into account.

According to this configuration, when the communication node includes both a mobility management function and a multihoming function, based on both a condition the result of moving and a condition related to a multihomed state, an appropriate address can be selected from multiple addresses in a multihomed state.

While taking the above described problems into account, the present invention provides the effects that, when the communication node includes both a mobility management function and a multihoming function, an appropriate address can be selected from multiple addresses in a multihomed state.

BRIEF DESCRIPTION OF THE DRAWINGS

FIG. 7A is a diagram showing a first example binding cache according to the present invention;

FIG. 7B is a diagram showing a second example binding cache according to the present invention;

FIG. 8A is a diagram showing a third example binding cache according to the present invention;

FIG. 8B is a diagram showing a fourth example binding cache according to the present invention;

FIG. 16 is a schematic diagram showing the internal arrangement of an MN for explaining the overview of a fourth embodiment of the present invention;

FIG. 17 is a block diagram showing a first example internal configuration for the MN according to the fourth embodiment of the present invention;

BEST MODES FOR CARRYING OUT THE INVENTION

Figure 29:
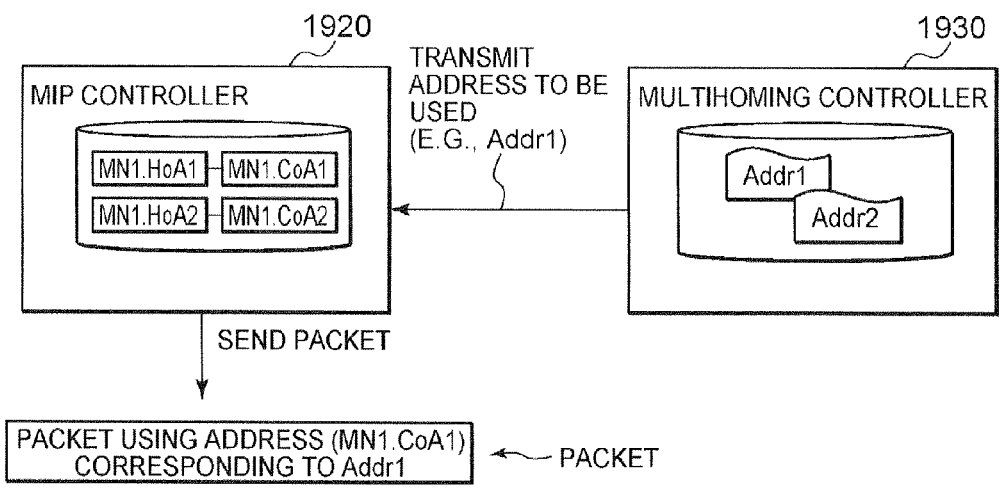
FIG. 29 is a schematic diagram showing a first example internal configuration for an MN to explain a problem related to prior art.
Figure 30:
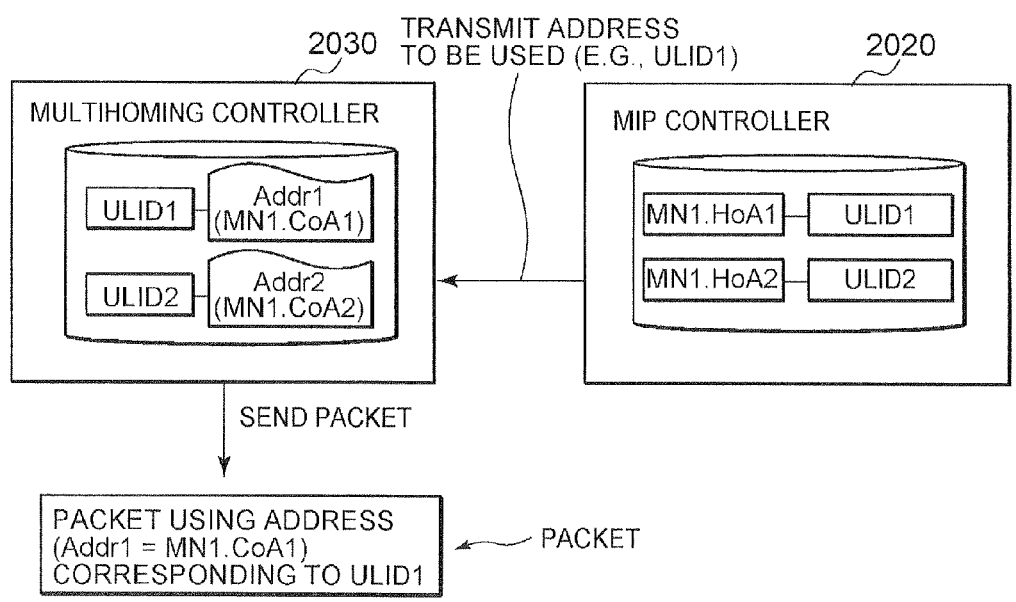
FIG. 30 is a schematic diagram showing a second example internal configuration for an MN to explain the problem related to prior art.

The first to ninth embodiments of the present invention will now be described while referring to drawings. In the first to the fourth embodiments, an explanation will be given for configurations and operations, while taking into account the problems that occur in the case wherein the multihoming controller 1930 shown in FIG. 29 is located higher than the MIP controller 1920. In the fifth to the ninth embodiments, an explanation will be given for configurations and operations, while taking into account the problems that occur in the case wherein the multihoming controller 2030 shown in FIG. 30 is located lower than the MIP controller 2020.

First, a multihomed state used as a prior condition for this invention will be described while referring to FIG. 1. The state wherein an MN 100 to which two home networks (a home network A and a home network B) are allocated has moved to a foreign network and has obtained a CoA is typically shown in FIG. 1. Further, the state wherein an MN 100a having one interface (IF_a) has obtained a CoA 1 by accessing the foreign network A, and the state wherein an MN 100b having two interfaces (IF_b and IF_c) has obtained CoA2 by accessing the foreign network B through the IF-b, and has obtained CoA by accessing a foreign network C through the IF_c are shown in FIG. 1.

Figure 1:
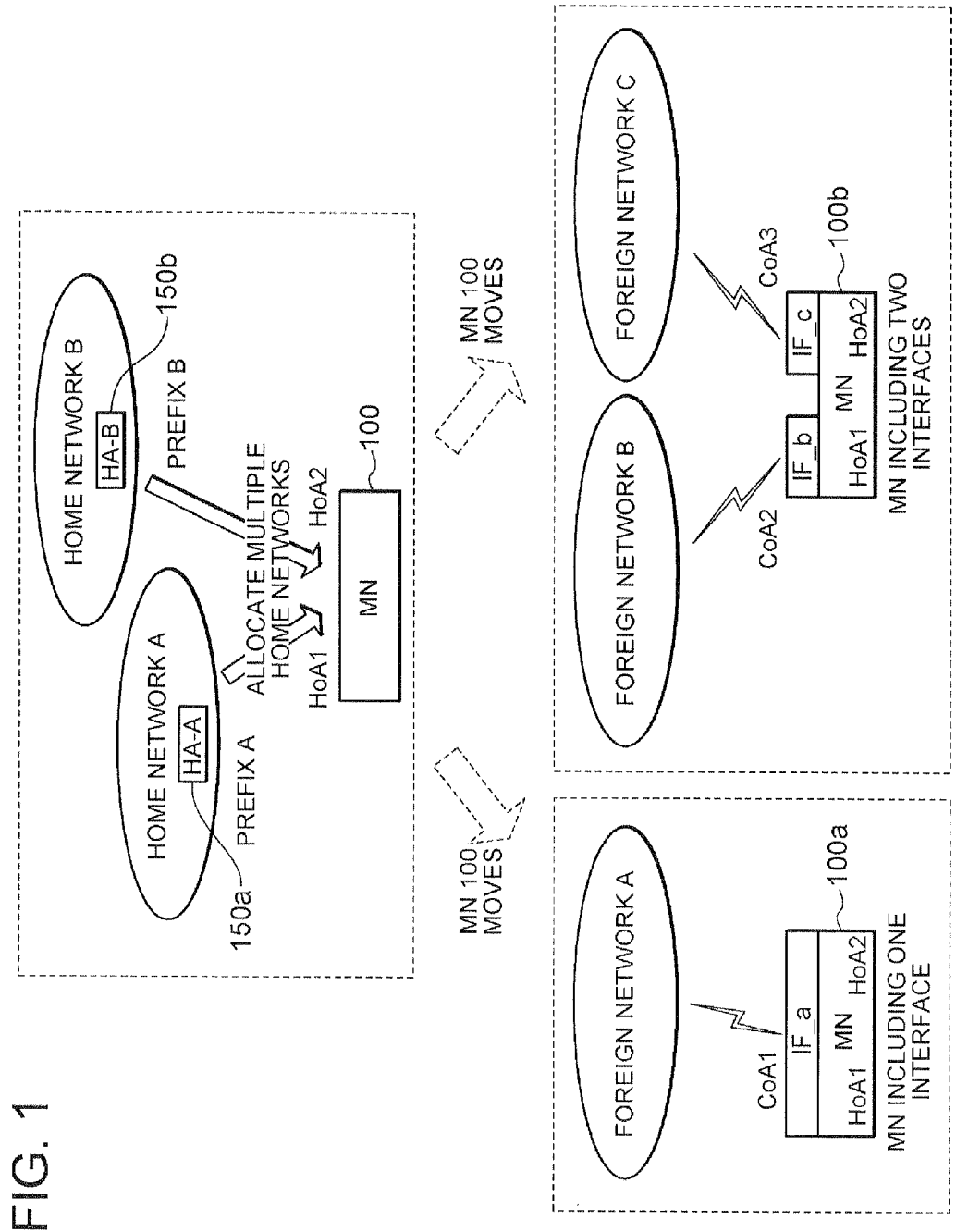
FIG. 1 is a diagram for explaining a multihomed state that is used as a prior condition for the present invention.

There are several factors that the MN 100 performs multihoming in the above described manner, and in FIG. 1 is shown a case wherein home addresses are configured based on prefixes notified through a plurality of allocated home networks, and as a result, the MN 100 is in the multihomed state while maintaining a plurality of home addresses.

The MN 100 holds an HoA1 generated based on a prefix A of a home network A and an HoA2 generated based on a prefix B of a home network B. Naturally, HAs (HA-A 150a, HA-B 150b) are present in the home networks A and B, and the HoA1 is managed by the HA-A 150a, while the HoA2 is managed by the HA-B 150b.

Further, as shown in FIG. 1, multihoming performed when the MN 100 that has moved maintains a plurality of home addresses does not depend on the number of interfaces included in the MN 100. That is, even in the case wherein the MN 100 includes only one interface, a plurality of home networks can be allocated to the MN 100.

Even when there is only one home network to be allocated, in the case wherein the MN 100 is so designed as to configure a plurality of addresses based on one prefix, or in the case wherein a home network transmits a plurality of prefixes through site multihoming, the MN 100 can perform multihoming.

Further, the state wherein the MN 100 has moved to the foreign network and obtained a CoA is shown in FIG. 1. However, this state is a phenomenon independent from a multihomed state that occurs when a plurality of home addresses is held. The MN 100 may be in the state wherein it is connected to a home network, instead of being moved, or in the case of maintaining a plurality of interfaces, may be connected to both a home network and a foreign network at the same time.

First Embodiment

Figure 2:
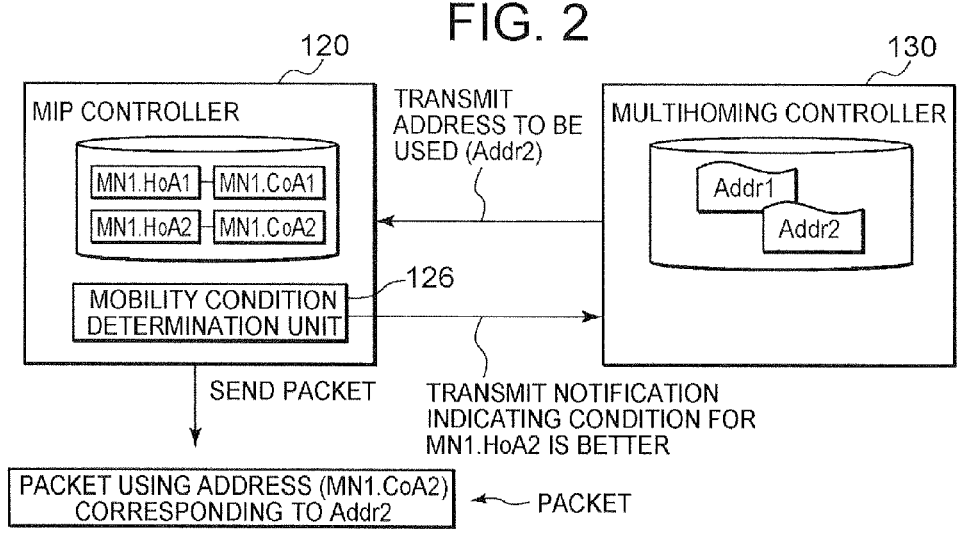
FIG. 2 is a schematic diagram showing the internal arrangement of an MN to explain the overview of a first embodiment of the present invention.

The first embodiment of the present invention will now be described. FIG. 2 is a schematic diagram showing the internal arrangement of an MN to explain the overview of the first embodiment of the invention.

An MIP controller 120 and a multihoming controller 130 mounted in an MN are shown in FIG. 2. It should be noted that the presence of the MIP controller 120 indicates that a protocol, such as an MIP that achieves mobility management, is mounted in the MN, and the presence of the multihoming controller 130 indicates that a protocol that achieves multihoming is mounted in the MN.

The MIP controller 120 according to the first embodiment of the invention includes a mobility condition determination unit 126. The mobility condition determination unit 126 includes a function that obtains and examines various conditions (hereinafter called mobility conditions) that occur as the MN moves, and that, based on this mobility condition, determines the most appropriate set of an HoA and a CoA for the current connection situation of the MN and/or a communication partner. The mobility condition can be, as will be described later, various conditions that the MIP controller 120 can obtain; for example, a condition that a path to a communication partner is the shortest, a condition that the security along the path to the communication partner is highest and a communication condition requested by the communication partner.

Assume that, for example, the MN is in the multihomed state, and the multihoming controller 130 manages two addresses (Addr1 and Addr2). And assume that the MN moved from its own home network to a foreign network, and has obtained a CoA (MN1.CoA1) correlated with Addr1 (=MN1.HoA1) and a CoA (MN1.CoA2) correlated with Addr2 (=MN1.HoA2).

According to the first embodiment of the invention, when the mobility condition determination unit 126 of the MIP controller 120 employs a mobility condition and determines that more appropriate communication can be performed by using a set of MN1.HoA2 and MN1.CoA2 than a set of MN1.HoA1 and MN1.CoA1, the mobility condition determination unit 126 transmits, to the multihoming controller 130, a notification representing that MN1.HoA2 should be used.

Further, in the state wherein the MN 100 is connected to the home network, the mobility condition determination unit 126 can also determine that an address effective on the home network is an address to be used. For example, in FIG. 1, in the case wherein the IF_c of the MN 100 is connected to the home network B, the mobility condition determination unit 126 may transmit, to the multihoming controller 130, a notification indicating that MN1.HoA2 should be employed.

Upon receiving a notification from the mobility condition determination unit 126, the multihoming controller 130 selects Addr2 (=MN1.HoA2), and transmits, to the MIP controller 120, a notification that Addr2 is an address to be employed. Upon receiving the notification indicating Addr2, the MIP controller 120 designates, to a source address, MN1.HoA2 equal to Addr2, or MN1.CoA2 consonant with MN1.HoA2, and transmits a packet. Thus, the MN performs packet transmission with address setting that has reflected a mobility condition.

Figure 3:
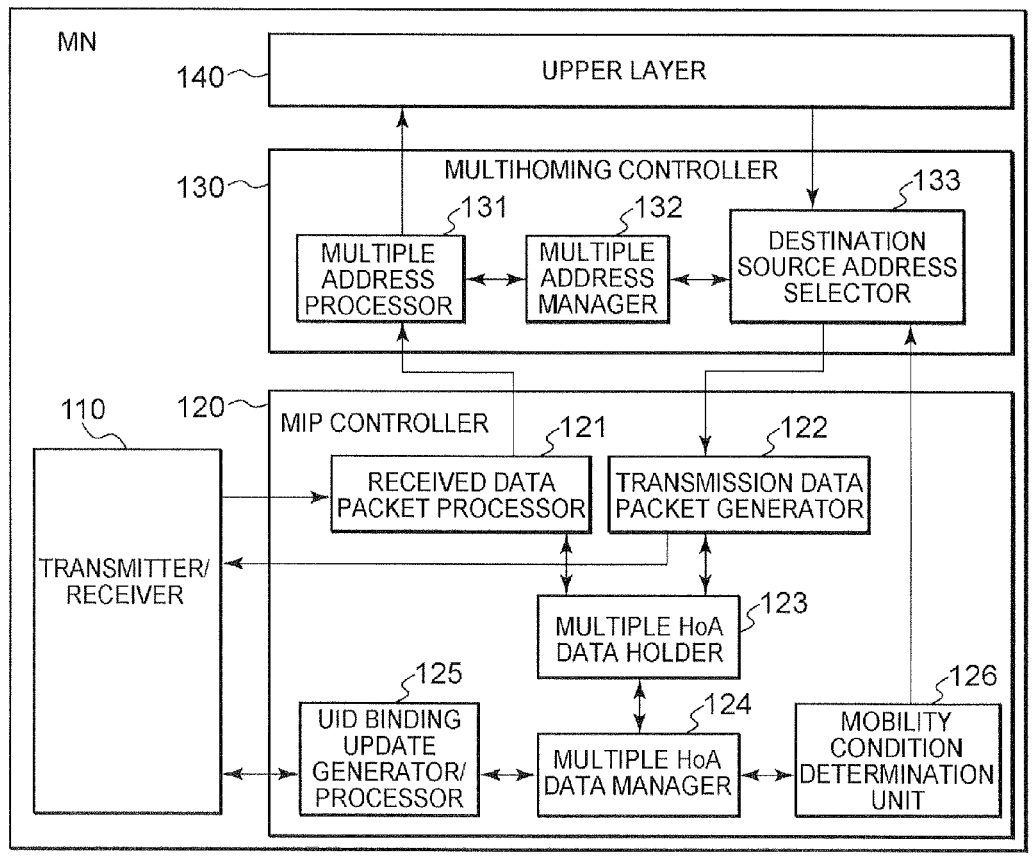
FIG. 3 is a block diagram for an example internal configuration for the MN of the first embodiment of the present invention.

The first embodiment of this invention will now be specifically explained. FIG. 3 is a block diagram showing an example internal arrangement for the MN according to the first embodiment of the invention. The MN in FIG. 3 includes a transmitter/receiver 110, an MIP controller 120, a multihoming controller 130 and an upper layer 140.

The transmitter/receiver 110 has a function for performing communication with a communication node in a network the MN accesses and an arbitrary communication node present in an upper network. Further, the upper layer 140 is a layer (e.g., a TCP/UDP layer) higher than an IP in a common layer structure.

Furthermore, the MIP controller 120 is a function for managing moving of the MN. The MIP controller 120 includes a received data packet processor 121, a transmission data packet generator 122, a multiple HoA data holder 123, a multiple HoA data manager 124, a UID binding update generator/processor 125 and a mobility condition determination unit 126.

The received data packet processor 121 has a function whereby, in the case wherein an MIP is employed to transfer a received data packet, the packet is converted into the original form. A packet transfer using an MIP includes a case wherein a packet is encapsulated by the HA and a case where a routing header is inserted by a communication partner and the resultant packet is transmitted directly to oneself.

The transmission data packet generator 122 has a function whereby a destination address and a source address reported by the multihoming controller 130 are converted so as to transfer a packet using an MIP.

The multiple HoA data manager 124 has a function for managing a plurality of HoAs maintained by its own and for determining a plurality of HoAs to be registered at the HA and CoAs to be correlated with the HoAs. Further, the multiple HoA data manager 124 has a function for transmitting, to the UID binding update generator/processor 125, binding information to be registered, together with a unique ID indicating that a plurality of binding update messages to be transmitted to the HA are related to the same MN, and for issuing an instruction to generate a binding update message. The multiple HoA data manager 124 also has a function for transmitting, to the multiple HoA data holder 123, binding information received from a communication partner. Additionally, the multiple HoA data manager 124 has a function for obtaining and managing various conditions that the MIP controller 120 can obtain. Moreover, the multiple HoA data manager 124 has a function for transmitting, to the mobility condition determination unit 126, a notification indicating a mobility condition that is stored in multiple HoA data holder 123.

The multiple HoA data holder 123 has a function for holding information related to a plurality of HoAs held by its own and CoAs correlated with the plurality of HoAs. For example, for storage, the multiple HoA data holder 123 correlates MN1.HoA with MN1.CoA consonant with this HoA, and MN1.HoA2 with MN1.CoA2 consonant with this HoA. Also, the multiple HoA data holder 123 has a function for holding position registration/update information (binding information) relative to a communication partner, and at this time, holding a plurality of HoA and CoA sets (these are transmitted using, for example, a binding update message to which identification information (unique ID: hereinafter it may be written simply as a UID) is added, as will be described later) that are transmitted from a communication partner in the multihomed state. In the following explanation, a case wherein a notification indicating binding information is transmitted using a binding update message with a UID being added is mainly employed. However, the use of a binding update message with a UID is merely an example, and the present invention is not limited to the use of a binding update message with a UID being added.

Furthermore, the UID binding update generator/processor 125 includes a function whereby, based on information (a unique ID and binding information) received from the multiple HoA data manager 124, a binding update message to register a plurality of HoAs at the HA is generated for each of HoAs, and is transmitted. The UID binding update generator/processor 125 has a function for processing a binding update message received from a communication partner, and for transmitting, to the multiple HoA data manager 124, a notification indicating binding information that is included in the binding update message. The binding update message that is generated and processed by the UID binding update generator/processor 125 will be described later in detail.

The mobility condition determination unit 126 includes a function for obtaining, from the multiple HoA data manager 124, a mobility condition that occurs as the MN moves and a mobility condition transmitted by the communication partner, and examining these conditions, and for, based on these mobility conditions, determining the most appropriate set of an HoA and a CoA for the current connection situation of the MN and/or the communication partner, and transmitting the determination results to the multihoming controller 130.

Additionally, the multihoming controller 130 has a function for managing the multihomed state of the MN. The multihoming controller 130 includes a multiple address processor 131, a multiple address manager 132 and a destination/source address selector 133.

The multiple address processor 131 includes a function for obtaining a packet for which the MIP controller 120 completes packet conversion, and for performing the processing for the packet, and transmitting the resultant packet to the upper layer 140.

The multiple address manager 132 includes a function for managing a plurality of addresses owned by the MN. The multiple address manager 132 holds and manages, for example, a plurality of addresses (Addr1 and Addr2) in the multihomed state. Further, the multiple address manager 132 transfers necessary information in accordance with a request from the multiple address processor 131 or the destination/source address selector 133. The multiple address manager 132 can also manage a plurality of addresses owned by a communication partner. An arbitrary method can be employed for a communication partner to obtain an address. For example, a communication partner may obtain an address by receiving a message (e.g., a binding update message to which a UID that will be described later is added) handled by the multihoming controller 130 or the MIP controller 120, or may obtain an address from a DNS (Domain Name System) server.

Further, the destination/source address selector 133 includes a function for, based on information transmitted by the mobility condition determination unit 126 of the MIP controller 120, an address used as a source address and a destination address for a packet is selected from addresses held by the multiple address manager 132, and is transmitted to the MIP controller 120. The destination/source address selector 133 may be designed so as to passively receive, from the mobility condition determination unit 126, a notification indicating the determination results obtained by the mobility condition determination unit 126, or to actively obtain, for a reference, such a notification from the mobility condition determination unit 126.

It should be noted that the MIP controller 120, the mobility condition determination unit 126 and the multihoming controller 130 shown in FIG. 3 correspond to the MIP controller 120, the mobility condition determination unit 126 and the multihoming controller 130 shown in FIG. 2.

Next, a mobility condition used as a reference by the mobility condition determination unit 126 will be specifically described. In the MN, basically, the MIP controller 120 manages moving of the MN, and can obtain various conditions that occur in accordance with movement. Here, an explanation will be given for a mode wherein a function for generating and processing a binding update message that includes a UID that is obtained by altering a conventional binding update message is provided for the mobility condition determination unit 126 so as to obtain various mobility conditions, such as a condition that the path to a communication partner is the shortest, a condition that the security for the path to the combination partner is the highest and a communication condition requested by the communication partner.

Figure 4:
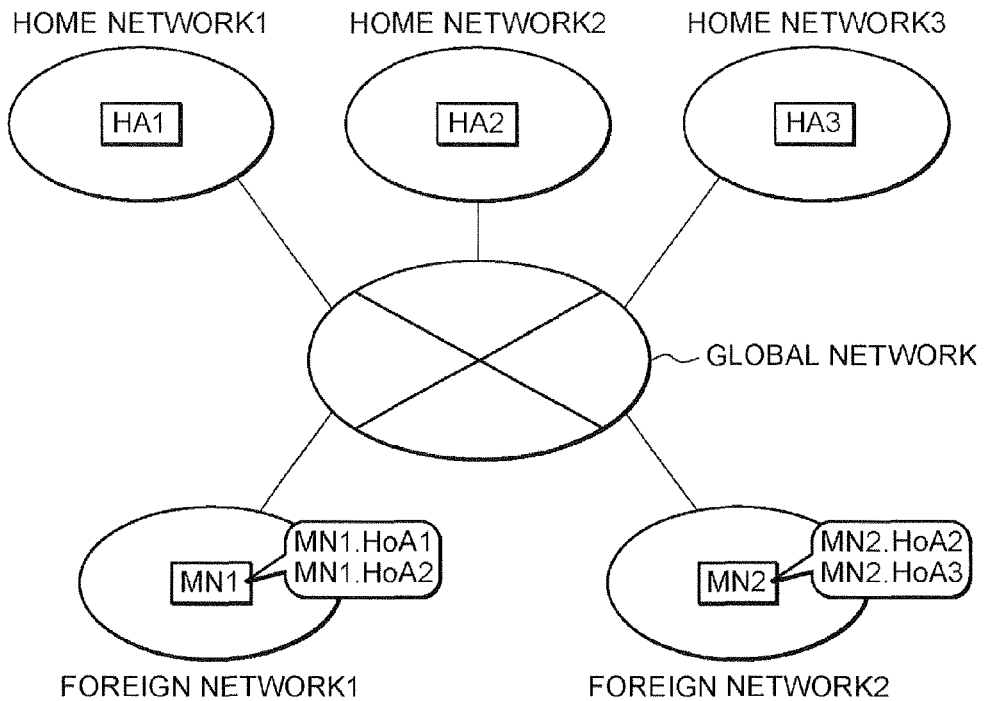
FIG. 4 is a diagram showing an example network configuration according to the present invention.

An explanation will be given by employing, as an example, a network configuration shown in FIG. 4. In FIG. 4, a network configuration is shown wherein home networks 1 to 3 and foreign networks 1 and 2 are connected respectively to global networks.

In FIG. 4, an MN1 maintains an address (MN1.Addr1) managed by an HA1 that belongs to a home network 1 and an address (MN1.Addr2) managed by an HA2 that belongs to a home network 2. On the other hand, an MN2 maintains an address (MN2.Addr2) managed by the HA2 that belongs to the home network 2 and an address (MN2.Addr3) managed by an HA3 that belongs to a home network 3. Therefore, the MN1 and MN2 maintain addresses originating in the home network 2 used in common.

Furthermore, the MN1 is connected to a foreign network 1 by moving, and in the foreign network 1, obtains a CoA (MN1.CoA1) consonant with a HoA (MN1.HoA1) equal to an address (MN1.Addr1), and also a CoA (MN1.CoA2) consonant with a HoA (MN1.HoA2) equal to an address (MN1.Addr2). On the other hand, the MN2 is connected to a foreign network 2 by moving, and in the foreign network 2, obtains a CoA (MN2.CoA2) consonant with a HoA (MN2.HoA2) equal to an address (MN2.Addr2), and also a CoA (MN2.CoA3) consonant with a HoA (MN2.HoA3) equal to an address (MN2.Addr3). It should be noted that HA1 to HA3 are located in the home network 1 to 3, and manages HoAs and CoAs for the MN1 and MN2.

An explanation will be given for a case wherein the MN1 and MN2 perform communication in the above described state. Assume that both the MN1 and the MN2 have the internal arrangement shown in FIG. 3.

The MN1 transmits, to the HA1 and HA2, separate binding update messages that include binding information concerning a plurality of HoAs (MN1.HoA1, MN1.HoA2) held by the MN1, in order to register the binding information at the HA1 and HA2, respectively.

That is, the MN1 transmits, to the HA1, a binding update message that includes binding information of an HoA (MN1.HoA1) and a CoA (MN1.CoA1) that was obtained in the foreign network 1, and also transmits, to the HA1, a binding update message that includes binding information of an HoA (MN1.HoA2) and a CoA (MN1.CoA2) that was obtained in the foreign network 1. Similarly, the MN1 transmits, to the HA2, a binding update message that includes binding information of an HoA (MN1.HoA1) and a CoA (MN1.CoA1) that was obtained in the foreign network 1, and also transmits a binding update message that includes binding information of an HoA (MN1.HoA2) and a CoA (MN1.CoA2) that was obtained in the foreign network 1.

Additionally, the MN1 adds an option (unique ID option) that includes UID to each binding update message, so that, when the HA1 and HA2 receive a plurality of binding update messages that include different HoAs, the HA1 and HA2 can identify these binding update messages were issued by the same MN1. Thus, the HA1 and HA2 can identify that binding update messages including the same UID are transmitted from a single MN1.

Figure 5:
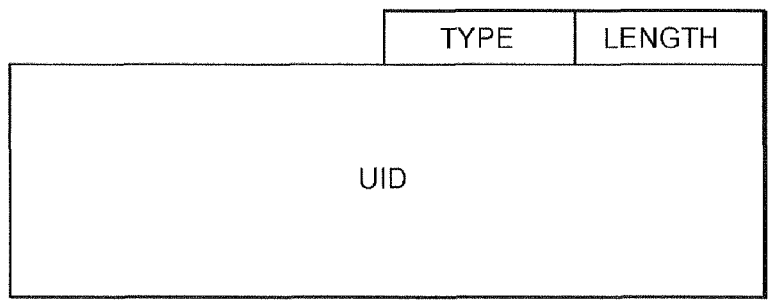
FIG. 5 is a diagram showing an example unique ID option to be added to a binding update message according to the present invention.

As shown in FIG. 5, for example, a unique ID option is formed of a type field (Type), a length field (Length) and a UID field. The type (Type) field includes an identifier of eight bits that indicates the type of a mobility option. The length (Length) field includes a non-sign integer of eight bits that employs the octet unit to represent the length of a unique ID option, except for the type and length fields. The UID field includes an integer value with which an MN can be uniquely identified.

The MN2, as well as the MN1, transmits, to the HA2 and HA3, a binding update message to which a unique ID option that includes a UID indicating the MN2, so that binding information concerning a plurality of HoAs (MN2.HoA2, MN2.HoA3) are to be registered. It should be noted that binding information related to a plurality of HoAs may be included in a single binding update message. In this case, a UID may be added on the transmission side, or may be added by the side that receives the binding update message. When a plurality of HoAs are not transmitted, there is no need for identifying that a plurality of binding update messages are transmitted by a single MN, so that a UID used for identification is not necessarily added.

Figure 6A:
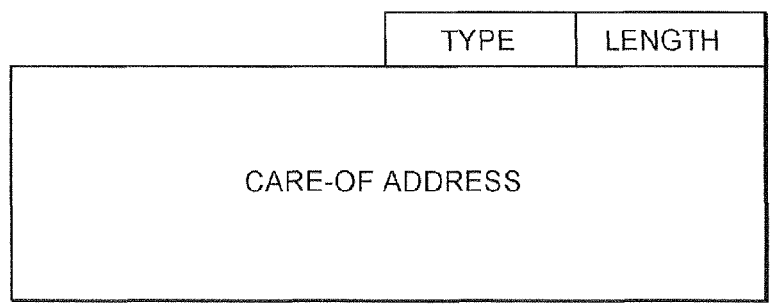
FIG. 6A is a diagram showing a first example for a CoA option to be added to a binding update message according to the present invention.
Figure 6B:
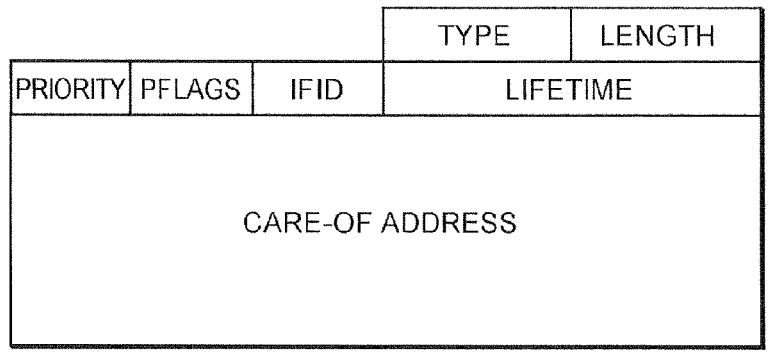
FIG. 6B is a diagram showing a second example for a CoA option to be added to a binding update message according to the present invention.
Figure 6C:
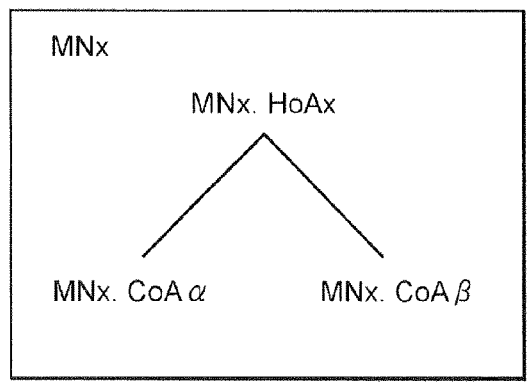
FIG. 6C is a schematic diagram showing the state of an MN according to the present invention wherein a plurality of CoAs (CoAα, CoAβ) are correlated with one HoA (HoAx)

Furthermore, in the case wherein a plurality of CoAs are correlated with one HoA (e.g., a case wherein two CoAs (CoAα, CoAβ) are correlated with a specific HoAx, as shown in FIG. 6C), each binding update message need only include a plurality of CoA options having the structure shown in FIG. 6A, and be transmitted (see a binding update message shown in FIG. 6D), so that binding information for a plurality of CoAs relative to one HoA can be registered. Further, when binding information sets for a plurality of CoAs relative to one HoA are to be registered, a UID ma be added to binding for the individual CoAs, so that the reception side can identify each set of binding information. A method for transmitting a plurality of CoA options is not limited to a method for transmitting a binding update message, while a plurality of CoA options is included in each binding update message. Each CoA option may be inserted in consonance with each of multiple binding update message, so that transmission of multiple CoA options is also enabled.

The CoA option in FIG. 6A is formed of a type field (Type), a length field (Length) and a CoA (Care-of Address) field. The type (Type) field includes an identifier of eight bits that indicates the type of a mobility option. The length (Length) field includes a non-sign integer of eight bits that employs the octet unit to represent the length of a unique ID option, except for the type and length fields. The CoA field includes a CoA allocated to an interface.

Further, as the structure of the CoA option, optional information, such as a priority, may be added to each CoA, as shown in FIG. 6B. The CoA option shown in FIG. 6B includes, in addition to the structure in FIG. 6A, a priority (Priority), a P flag (PFlags), an interface ID (IFID) and a life time (Lifetime). The priority (Priority) field includes a non-sign integer of eight bits that indicates a priority level related to the usage of the interface. The P flag (PFlags) field consists of eight 1-bit flags, and include values indicating a traffic type (e.g., video, audio, interactive communication, best effort, etc.) in communication through the interface. The interface ID (IFID) field includes a non-sign integer of four bits with which an interface to which a CoA is allocated can be identified. Information with which various interface types, such as cellular, WLAN802.11 (a/b/g/n), 802.16, 802.20 and Bluetooth (trademark), can be identified is entered in the interface ID field. The life time (Lifetime) field includes a value (non-sign integer of 16 bits) to be multiplied by a unit time (e.g., one unit time=four seconds) that represents remaining time until binding expires. Additionally, although not shown, a band width and an ISP name can also be added as optional information, and by adding information related to the communication processing, the MN can register an arbitrary CoA at the HA as a CoA that is to be used for transmission of a packet concerning a specific process. Here, the case wherein optional information is added to the CoA has been explained; however, these sets of optional information may be added as information for the HoAs. This is effective for the case wherein, for example, one or a plurality of CoAs are correlated with a plurality of HoAs.

Furthermore, an explanation has been given for the structure of the binding update message used for the case wherein binding information and optional information are transmitted using a binding update message. However, for transmission, optional information may be inserted in, for example, a message other than a binding update message. In this case, the side that receives binding information need correlate binding information and optional information that are included in separate messages, so that binding information can be correctly registered (e.g., preparation of a binding cache shown in FIGS. 8A and 8B that will be described later). For this correlation, it is preferable that, for example, the same identifier used for correlation be included in both binding information and optional information (or a message that includes binding information and a message that includes optional information). A CoA, for example, may be employed as this identifier, or a BID (Binding Unique Identification number) described in non-patent document 4 may be employed.

In the case wherein the HA1 and HA2 identify, based on the UID, that the received binding update messages are from the same MN1, the HA1 and HA2 store binding information included in the binding update messages, in correlation with the binding information with UIDs, written in the unique ID options of the binding update messages. That is, the HoA and the CoA of the MN1 are held in the binding cache by employing as a key the UID that is used to identify the MN1.

The binding cache that is held by the HA1 and HA2 and is related to the MN1 has a structure shown in, for example, FIG. 7A. It should be noted that a UID indicating the MN1 is written as a UID1. In the binding cache concerning the MN1, a relation between the HoA (MN1.HoA1) and the CoA (MN1.CoA1) of the MN1 is stored by using, as a key, the UID1 of the MN1. Similarly, a relation between the HoA (MN1.HoA2) and the CoA (MN1.CoA2) of the MN1 is also stored by using, as a key, the UID1 of the MN1.

The HoA and CoA of the MN2 are also stored in the binding cache by using, as key, a UID that identifies the MN2. The binding cache that is held by the HA2 and HA3 and is related to the MN2 has a structure shown in, for example, FIG. 7B. It should be noted that a UID indicating the MN2 is written as a UID2. In the binding cache concerning the MN2, a relation between the HoA (MN2.HoA2) and the CoA (MN2.CoA2) of the MN2 is stored by using, as a key, the UID2 indicating the MN2. Similarly, a relation between the HoA (MN2.HoA3) and the CoA (MN2.CoA3) of the MN2 is also stored by using, as a key, the UID2 indicating the MN2.

Here, an explanation has been given for the case wherein a different CoA is allocated to each HoA, like the case wherein a CoA (MN1.CoA1) is allocated to the HoA (MN1.HoA1) of the MN1, and a CoA (MN1.CoA2) is allocated to the HoA (MN1.HoA2) of the MN1. However, for example, in the case wherein a plurality of CoAs are allocated to one HoA, like the case wherein two CoAs are allocated to the HoA of the MN1, a relation between the HoA of the MN1 and the two CoA is stored in the binding cache concerning the MN1 by using, as a key, the UID1 that indicates the MN1. It should be noted that, in the case wherein the UID is added to the individual CoAs, the relation is stored as binding information that includes these UIDs.

Furthermore, a binding cache to store information included in the CoA option in FIG. 6B, together with binding information, has a structure shown in, for example, FIG. 8A.

In FIG. 8A is shown a binding cache that is related to the MN2 and is held by the HA2 that received, from the MN2, a binding update message with a unique ID option being added. As shown in, for example, FIG. 8A, information entered in the individual fields (Lifetime, Priority, PFlags, IFID, etc.) of the above described CoA option is stored in the relevant entries of the UID, HoA and CoA.

Figure 6D:
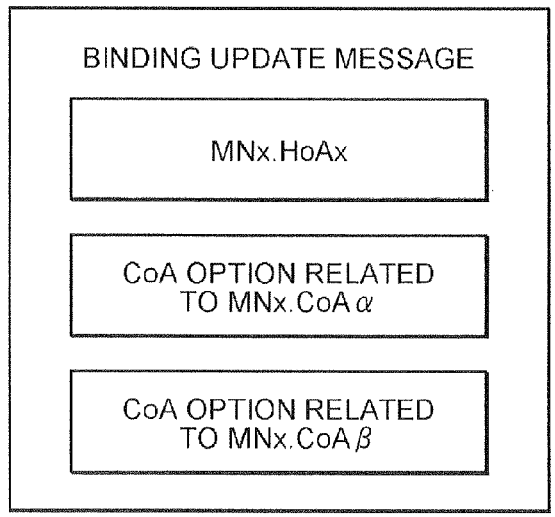
FIG. 6D is a diagram showing an example binding update message (binding update message to be transmitted when a plurality of CoAs are correlated with one HoA) according to the present invention.

Moreover, in the case wherein a CoA option shown in FIG. 6B is included in a binding update message shown in FIG. 6D, the HA that received this binding update message holds a binding cache (see FIG. 8B) having the same structure as shown in FIG. 8A. In FIG. 8B, a relation between the HoA (MNx.HoAx) of an MNx and two CoAs (MNx.CoAα and MNx.CoAβ) is stored by using, as a key, a UIDx indicating the MNx, and further, information entered in the individual fields (Lifetime, Priority, PFlags, IFID, etc.) of CoA options consonant with the CoAs are stored respectively to the relevant entries of the CoAs.

Additionally, although not shown, in the case wherein information concerning a process is added to the CoA option, and is registered as a CoA to be used for transfer a packet that is related to a specific process, the information concerning this process is also stored in the respective CoA relevant entries. Likewise, in the case wherein CoA selection information is transmitted using a message different from a binding update message, information entered in the individual fields is stored. As the storage locations for this information, the usage of a conventional binding cache is effective. However, so long as correlation with CoAs is correctly performed, the information may be stored in the portion where QoS information is stored, or in a processing information list.

It is preferable that the HA that received an address registration message (binding update message) having the above described structure return a registration acknowledgement message (binding acknowledgement message) in the same manner as in the prior art. And results for registration of optional information may be included in this registration acknowledgement message. The MN, which is a source of an address registration message, need only examine the registration results for optional information included in the registration acknowledgement message, so that the MN can determine, for example, whether the HA performs selection of a packet destination address that will be described later.

Figure 9:
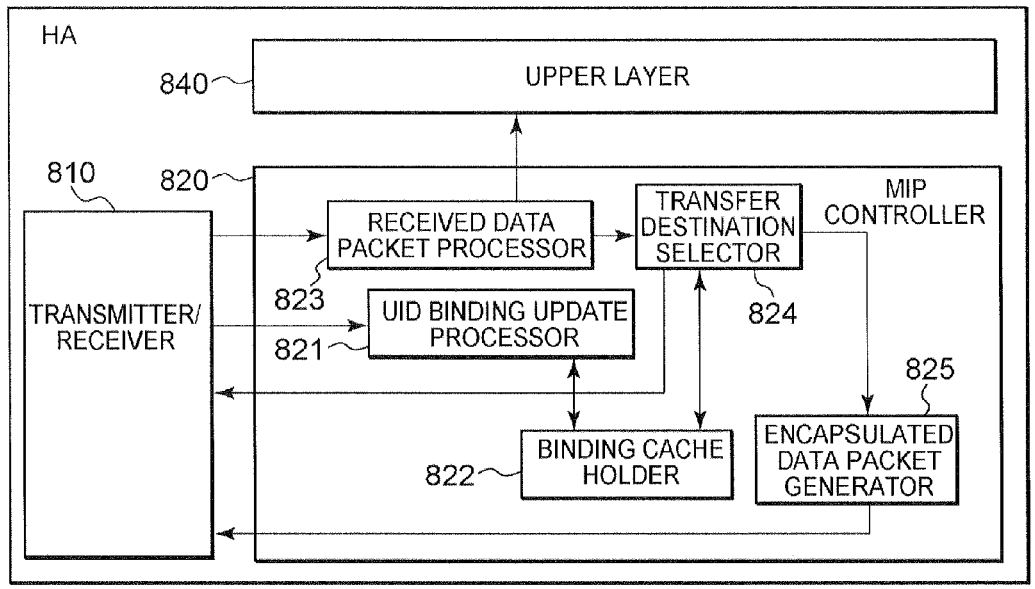
FIG. 9 is a block diagram showing an example arrangement of an HA according to the first embodiment of the present invention.

The internal arrangement of the HA that can hold a plurality of binding information sets that originates in a single MN in the above described manner is as shown in, for example, FIG. 9. FIG. 9 is a block diagram showing an example configuration for the HA according to the first embodiment of this invention. The HA shown in FIG. 9 includes a transmitter/receiver 810, an MIP controller 820 and an upper layer 840. It should be noted that the HA shown in FIG. 9 corresponds to the HA1 or the HA2 in FIG. 4.

The transmitter/receiver 810 includes a function for transmitting a packet addressed to an MN that performs management, or for receiving a packet transmitted by the MN. The upper layer 840 is a layer (e.g., a TCP/UDP layer) higher than an IP in the common layer structure.

Further, the MIP controller 820 serves as a function for employing information in common by an MN where the same MIP controller is mounted, or exchanging information with the MN, and for managing moving of the MN. The MIP controller 820 includes: a UID binding update processor 821, a binding cache holder 822, a received data packet processor 823, a transfer destination selector 824 and an encapsulated data packet generator 825.

The UID binding update processor 821 includes a function for processing a binding update message to which a unique ID option received from the MN is added. The UID binding update processor 821 transmits, to the binding cache holder 822, a UID and binding information that are extracted from a binding update message.

Further, the binding cache holder 822 has a function for holding binding information received from the MN. It should be noted that, as described above, the binding cache holder 822 stores binding information that is related to a plurality of HoAs owned by the same MN, in correlation with UIDs indicating the MN (the state shown in, for example, FIG. 7A or 7B).

The received data packet processor 823 includes a function whereby, in the case wherein a received data packet has been transferred using an MIP, the packet is converted into the original form. A packet transfer using an MIP includes a case wherein a packet is encapsulated by the HA and a case where a routing header is inserted by a communication partner and the resultant packet is transmitted directly to oneself. A packet addressed to the HA is transmitted from the received data packet processor 823 to the upper layer 840, while a packet to be transmitted from a specific MN to another MN through the HA is, for example, decapsulated, and thereafter, is transmitted from the received data packet processor 823 to the transfer destination selector 824.

Additionally, the transfer destination selector 824 includes a function that examines the destination address of a packet received from the received data packet processor 823, and determines whether a binding cache that includes the same HoA as the destination address has already been registered to the binding cache holder 822, and that, in the case wherein the binding cache has been registered to the binding cache holder 822, transmits, to the encapsulated data packet generator 825, a CoA (transfer destination) correlated with the HoA and the packet that is received from the received data packet processor 823. In the case wherein the transfer destination selector 824 does not find a transfer destination, the packet is transmitted to the transmitter/receiver 810, unchanged in the state received from the received data packet processor 823, and is externally output.

The encapsulated data packet generator 825 includes a function for encapsulating a packet received from the transfer destination selector 824 by employing, as an address, a CoA also received from the transfer destination selector 824, and for transmitting the encapsulated packet to the transmitter/receiver 810. The packet encapsulated by the encapsulated data packet generator 825 is externally output by the transmitter/receiver 810.

As described above, the HA receives, from the MN, a binding update message to which a unique ID option is added, and stores, in the binding cache holder 822, a UID and binding information included in the binding update message, in correlation with each other. Thus, all the binding information related to a plurality of HoAs maintained by the same MN can be stored, and a plurality sets of binding information related to an arbitrary MN can be identified by employing, as a key, a UID that can identify the MN.

For communication between the NN1 and the MN2, a packet is transmitted along a communication path (triangular path) via the HA. Assume that communication starts between the MN1 and the MN2 in the state wherein the HA1 holds a binding cache shown in FIG. 7A, the HA2 holds a binding cache in FIGS. 7A and 7B, and the HA3 holds a binding cache shown in FIG. 7B. Further, assume that the MN1 obtains in advance the HoA (MN2.HoA3) of the MN2.

The MN1 is to transmit a packet for which the HoA (NM2.HoA3) of the MN2 obtained in advance is designated as a destination address. At this time, since the MN1 has moved to the foreign network 1, the MN1 must encapsulate a packet and transmit it to the HA1 or the HA2. Here, assume that the MN1 selects transmission of an encapsulated packet to the HA2. In this case, the MN1 transmits, to the HA2, a packet having a structure shown in FIG. 10.

Figure 10:
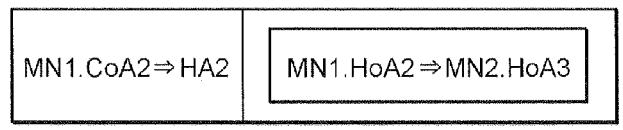
FIG. 10 is a diagram showing an example encapsulated packet that is to be transmitted by the MN of the present invention.

A packet shown in FIG. 10 is a packet obtained by encapsulating an internal packet in an outer packet. For the internal packet, an HoA (MN1.HoA2) for the MN1 is set as a source address, and an HoA (MN2.HoA3) is set as a destination address. Further, for the outer packet, a CoA (a CoA (MN1.CoA2) consonant with the HoA (MN1.HoA2) for the MN1 is set as a source address, and the address of the HA2 is set as a destination address.

In the case of receiving, from the MN1, a packet having the structure in FIG. 10, the HA2 examines whether MN2.HoA3, which is a destination address for the internal packet obtained by decapsulating, is included in the binding cache. In the case wherein, as the result of checking, MN2.HoA3 is included in the binding cache (e.g., the case of the example in FIG. 7B), the HA2 searches binding caches to which the same UID as UID2 added to the binding cache of MN2.HoA3 is added and finds a binding cache that includes an HoA that is appropriate for packet transfer. For example, from binding caches that are related to MN2 and designated by UID2, a binding cache that includes an HoA effective for the home network 2 (i.e., a binding cache that includes the HoA (MN2.HoA2) of the MN2 and is allocated based on the same home network 2) is selected.

As the results of the search, the HA2 transmits an encapsulated packet while a destination address is a CoA (MN2.CoA2) consonant with the HoA (HoA (MN2.HoA2) for the MN2 in this case)) that is stored in the selected binding cache. In the case wherein an encapsulated packet from the HA2 arrives at the MN2, the MN2 need only decapsulate this packet to correctly receive a packet transmitted by the MN1.

In this manner, the HA that can hold all the binding information related to a plurality of HoAs maintained by the same MN can change the destination address of a packet, so that packet transmission is performed without, for example, through an HA of another network as described above. Thus, reduction of a redundant communication path, and prevention of deterioration of security that is caused by transmission of a packet to another network can be provided.

Furthermore, the HA, which can hold not only binding information related to a plurality of HoAs owned by the same MN, but also various optional information such as the priority level of an address, can also compare the priority levels stored in the binding cache, and generate and transmit an encapsulated packet for which a CoA to which the highest priority level is designated is employed as a destination address. Therefore, the destination address of a packet can be changed to an address designated by the packet reception side, and in accordance with, for example, a stream type, the reception side can employ an appropriate interface for reception of a packet.

That is, for example, in the case wherein the HA holds the above described binding cache shown in FIG. 8A related to the MN2, for transfer of a packet received from the MN1 to the MN2, the HA employs, as CoA selection information, various optional information that is included in the individual entries in the binding cache in FIG. 8A (in FIG. 8A, an entry concerning a correlation of MN2.HoA2 and MN2.CoA2 and an entry concerning a correlation of MN2.HoA3 and MN2.CoA3), and compares CoA selection information entered in these entries. Then, the HA can select a CoA that is to be used as a destination address for an encapsulated packet to be transmitted to the MN2.

Furthermore, for example, in the case wherein the HA holds the above described binding cache shown in FIG. 8B related to the MNx, for transfer of a packet received from the MN1 to the MNx, the HA employs, as CoA selection information, various optional information that is included in the individual entries in the binding cache in FIG. 8B (in FIG. 8B, an entry concerning a correlation of MNx.HoAx and MNx.CoAα and an entry concerning a correlation of MNx.HoAx and MNx.CoAβ), and compares CoA selection information entered in these entries. Then, the HA can select a CoA that is to be used as a destination address for an encapsulated packet to be transmitted to the MNx.

It is obvious that the above described operation for selecting a destination address for a packet to be transmitted may be performed not only by the HA, but also by a CN (Correspondent Node: a communication partner of an MN). That is, for example, in the case where the optimal path for the MIP is employed as a path from the MN1 (corresponding to a CN) to the MN2 (or the MNx), binding information (e.g., the binding cache shown in FIG. 8A or 8B) concerning the MN2 (or the MNx) is stored in the binding cache of the MN1, as will be described later (to be described later). Thus, the MN1 employs optional information as CoA selection information, and compares the CoA selection information in individual entries so as to select a CoA that is used as a destination address for a packet to be transmitted to the MN2 (or the MNx).

Additionally, the above operation for selecting a destination address for a packet to be transmitted can also be applied for the operation for selecting a destination address for a packet to be transmitted from an MN to an HA. In this case, from, for example, the HA that maintains a plurality of addresses, the MN obtains a plurality of addresses (multiple HA address data) for the HA and information (HA address selection information) indicating a condition for selecting these addresses. Then, the MN examines the multiple HA address data and the HA address selection information, and compares the HA address selection information corresponding to the multiple HA addresses so as to select the addresses of the HA that are employed as a destination address for an encapsulated packet addressed to a CN and a destination address for a packet addressed to the HA. It should be noted that multiple HA address data and HA address selection information are included in, for example, a mobility condition, and the mobility condition determination unit 126 selects the optimal destination address.

Further, the HA may employ an arbitrary message to transmit to the MN multiple HA address data and HA address selection information. The HA can include multiple HA address data and HA address selection information in, for example, a conventional Home Agent Address Discovery Reply Message or Mobile Prefix Advertisement Message, a binding acknowledgement message, a new message (new message for transmitting multiple HA address data and HA address selection information), or another conventional message, and can transmit the message to the MN. Moreover, multiple HA address data and HA address selection information may be included in a message received from the MN in response to an arbitrary message, or may be transmitted as a unsolicited message (message voluntarily transmitted without any request) from the HA. Additionally, the MN may transmit, to the HA, request information to request the HA for transmission of multiple HA address data and HA address selection information. The MN may transmit an address registration message (a binding update message, a new message, etc.) to register a relation between an HoA and a CoA and optional information, and request a registration acknowledgement message that includes multiple HA address data and HA address selection. Or, the MN may transmit a Dynamic HA Address Request Message to request a Home Agent Address Discovery Reply Message that includes multiple HA address data and HA address selection, or may transmit a Mobile Prefix Solicitation Message to request a Mobile Prefix Advertisement Message that includes multiple HA address data and HA address selection.

As described above, the MN, the HA and the CN can perform the process for selecting a destination address for a packet to be transmitted, and this operation is independently performed. Therefore, not all the operations need be performed, and one of these operations may be performed. Or, the operations related to the process for selecting a plurality of, or all of the destination addresses may be performed at the same time.

Further, according to the MIP, not only a triangular path via the HA, but also the optimal path for exchanging a packet directly between the MNs can be employed as a communication path between the MNs. In this case, when the MNs exchange a plurality of binding update messages to which a unique ID option is added, both the MN can hold binding information related to a plurality of HoAs. That is, the binding cache shown in FIG. 7B related to the MN2 is held in the multiple HoA data holder 123 of the MN1, and the binding cache shown in FIG. 7A related to the MN1 is held in the multiple HoA data holder 123 of the MN2. It should be noted that this optimal path need not be always employed. Further, optimization may be performed for only a unidirectional path, e.g., transmission from the MN1 to the MN2 is performed along the optimal path, and transmission from the MN2 to the MN1 is performed along the triangular path. In this case, a binding update message is transmitted from the MN2 to the MN1, and the MN1 holds a binding cache concerning the MN2.

Here, an explanation will be given for the case wherein, under the situation where binding information for the MN1 and the MN2 have been already registered to the entries of the binding caches stored respectively by the HA1 to HA3, and where the MN2 has transmitted to the MN1 a binding update message concerning a plurality of home addresses (i.e., a packet is ready for being transferred from the MN1 to the MN2 along the optimal path) and optimization for the path from the MN2 to the MN1 is not yet performed, the MN1 starts packet transmission using a triangular path, not using the optimal path, so as not to, for example, disclose the CoA of the MN1.

One of multiple HoAs maintained by the MN1 is selected and designated as a source address of a packet that the MN1 transmits to the MN2. At this time, the mobility condition determination unit 126 of the MN1 compares multiple HoAs of the MN1, stored in the multiple HoA data holder 123, with multiple HoAs maintained by the MN2. As the comparison results, the mobility condition determination unit 126 finds that the prefix of MN1.HoA2 matches the prefix of MN2.HoA2, and identifies that the two are addresses managed by the same HA2.

Sequentially, the mobility condition determination unit 126 transmits, to the multihoming controller 130, a notification indicating that a set of MN1.HoA2 and MN2.HoA2 is an appropriate set of a source and a destination address for a packet addressed to the MN2. Based on this notification, the source/destination address selector 133 of the multihoming controller 130 transmits, to the MIP controller 120, a notification indicating that Addr2 that is equal to MN1.HoA2 should be used as a source address and MN2.HoA2 should be used as a destination address.

Following this, the transmission data packet generator 122 generates a packet for which MN1.HOA2 is designated as a source address and a CoA (MN2.CoA2) that is correlated with MN2.HoA2 is designated as a destination address, and to which a routing header including MN2.HoA2 is inserted, encapsulates this packet as an internal packet, and transmits the encapsulated packet to the HA2.

As a result, after the HA2 has decapsulated the packet and has transmitted the internal packet, this internal packet reaches the MN2 via a network (home network 2) under the same control. Thus, communication between the HA2 and the MN2 becomes more efficient, and since packet transmission is performed through the home network 2 used in common, reliability of security concerning packet transmission is increased.

Here, as described above, the mobility condition determination unit 126 detects matching of the prefixes of the HoAs of the MN1 and MN2, and selects an address. However, in addition to the above situation, for transmission of a packet to a communication partner, address selection may be performed based on various information, such as the priority level of an address. For example, for transmission to the MN1 of information concerning multiple addresses maintained by the MN2, a notification may be transmitted to the MN1 using the MIP, indicating that an address allocated to an interface connected to a home network is effective for the home network (currently accessing the home network), or is not effective for the currently connected home network (not accessing the home network). In this case, the MN1 can employ, as one mobility condition, a condition (home network connection condition) indicating which address of the MN2 is effective for the home network to which the MN2 is connected, i.e., which address should be used to transmit a packet directly to the MN2, or which address should be used to obtain a transfer path via the HA. It should be noted that this mobility condition can also be stored in the multiple HoA data holder 123.

As described above, according to the first embodiment of the present invention, the following effects are produced.

First effect: Since the MIP controller selects an address to be used while taking into account a mobility condition that has occurred by moving the MN, the multihoming controller can perform address selection based on a notification received from the MIP controller, so that an address can be selected and employed, while taking a mobility condition into account.

Second effect: Since the MIP controller generate and transmit a binding update message that can indicate the state holding multiple HoAs, a notification indicating the binding state related to multiple HoAs can be transmitted to a communication partner. Further, when optional information is included in a binding update message, a notification for optional information concerning the individual HoAs can also be transmitted.

Third effect: Upon receiving the binding update message, a communication node can store binding information related to multiple HoAs for the same MN, and can store optional information designated by a communication partner. When these sets of information are considered as a mobility condition, address selection and usage while taking a mobility condition into account is enabled.

Fourth effect: When address selection is performed based on a mobility condition, address selection that provides the increase of communication efficiency (e.g., reduction of a packet transmission path), address selection that provides improvement of security and address selection that takes a condition on the packet reception side into account are performed, and an appropriate address can be selected in a multihomed state.

Second Embodiment

Figure 11:
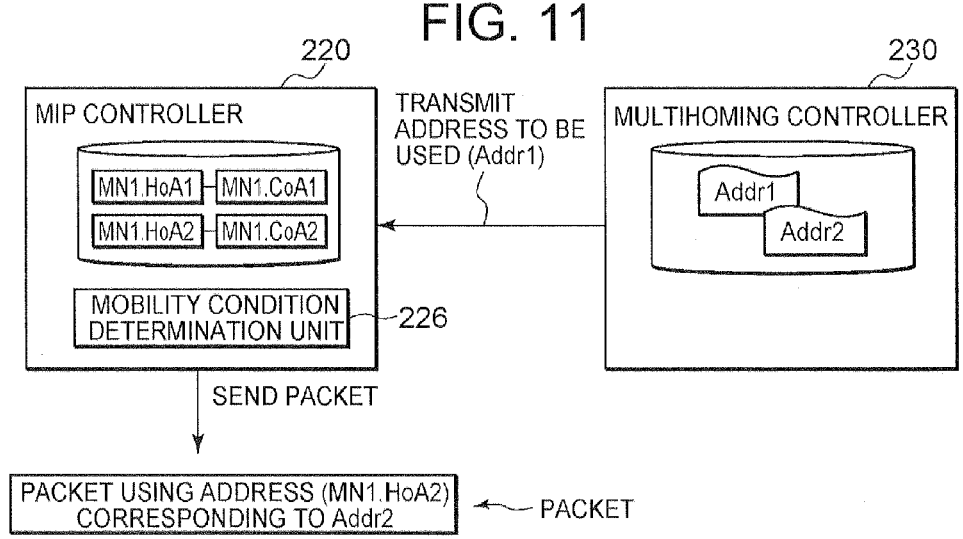
FIG. 11 is a schematic diagram showing the internal arrangement of an MN for explaining the overview of a second embodiment of the present invention.

Next, the second embodiment of the present invention will be described. FIG. 11 is a schematic diagram showing the internal arrangement of an MN to explain the overview of the second embodiment of the invention.

An MIP controller 220 and a multihoming controller 230 mounted in an MN are shown in FIG. 11. It should be noted that, as well as in FIG. 2, the presence of the MIP controller 220 indicates that a protocol, such as an MIP that achieves mobility management, is mounted in the MN, and the presence of the multihoming controller 230 indicates that a protocol that achieves multihoming is mounted in the MN.

The MIP controller 220 according to the second embodiment of the invention includes a mobility condition determination unit 226. The mobility condition determination unit 226 includes a function that obtains and examines a mobility condition, and based on this mobility condition, determines the most appropriate set of an HoA and a CoA for the current connection situation of the MN and/or a communication partner.

Assume that, for example, the MN is in the multihomed state, and the multihoming controller 230 manages two addresses (Addr1 and Addr2). And assume that the MN moved from its own home network to a foreign network, and has obtained a CoA (MN1.CoA1) correlated with Addr1 (=MN1.HoA1) and a CoA (MN1.CoA2) correlated with Addr2 (=MN1.HoA2).

According to the second embodiment of the invention, the multihoming controller 230, as well as the multihoming controller 1930 in the prior art, independently performs address selection, and transmits a selected address to the MIP controller 230. On the other hand, the mobility condition determination unit 226 of the MIP controller 220 of the second embodiment of this invention receives an address from the multihoming controller 230, and further, determines an address used for a packet to be transmitted, while taking a mobility condition into account. It should be noted that, at this time, the mobility condition determination unit 226 may determine an address, while ignoring a notification transmitted by the multihoming controller 230.

Assume that, for example, the multihoming controller 230 selects Addr1 of two addresses (Addr1 and Addr2), and notifies the MIP controller 220 of Addr1 as an address to be used. The mobility condition determination unit 226 of the MIP controller 220 receives a notification indicating Addr1 from the multihoming controller 230. Further, when, by considering a mobility condition, it is determined that, for example, MN1.HoA2 and MN1.CoA2 consonant with MN1.HoA2 are better to be used than Addr1 (=MN1.HoA1) and MN1.HoA1 to perform more appropriate communication, the MIP controller 220 designates, as a source address, MN1.HoA2 or MN1.CoA2 consonant with MN1.HoA2, and transmits a packet. On the other hand, for setting of a destination address as well as for a source address, the mobility condition determination unit 226 of the MIP controller 220 determines a destination address while taking a mobility condition into account, and transmits a packet with the address being designated. Thus, the MN performs packet transmission, while address setting that has reflected a mobility condition is performed.

Further, in the state wherein the MN 100 is connected to the home network, the mobility condition determination unit 126 can also determine that an address effective on the home network should be an address to be used. For example, in FIG. 1, in the case wherein the IF_c of the MN 100 is connected to the home network B, MN1.HoA2 is designated as a source address to perform packet transmission.

Figure 12:
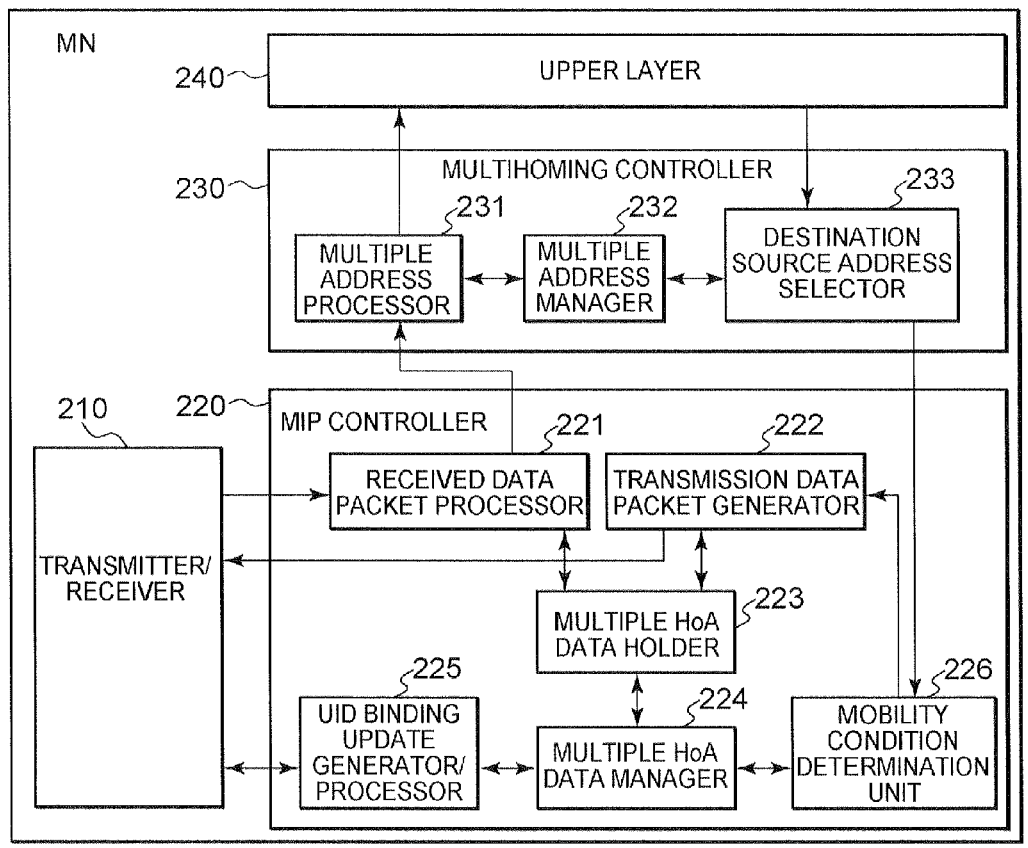
FIG. 12 is a block diagram showing an example internal configuration for the MN according to the second embodiment of the present invention.

The second embodiment of this invention will now be specifically explained. FIG. 12 is a block diagram showing an example internal arrangement for the MN according to the second embodiment of the invention. The MN in FIG. 12 includes a transmitter/receiver 210, an MIP controller 220, a multihoming controller 230 and an upper layer 240. Further, the MIP controller 220 includes a received data packet processor 221, a transmission data packet generator 222, a multiple HoA data holder 223, a multiple HoA data manager 224, a UID binding update generator/processor 225 and a mobility condition determination unit 226, while the multihoming controller 230 includes a multiple address processor 231, a multiple address manager 232 and a destination/source address selector 233. It should be noted that the MIP controller 220, the mobility condition determination unit 226 and the multihoming controller 230 shown in FIG. 12 correspond to the MIP controller 220, the mobility condition determination unit 226 and the multihoming controller 230 shown in FIG. 11.

The internal arrangement of the MN for the second embodiment of the invention will now be described by comparison with the internal arrangement (arrangement in FIG. 3) of the MN for the first embodiment of the invention.

Compared with the internal arrangement of the MN for the first embodiment of the invention, the internal arrangement of the MN for the first embodiment of this invention differs in the functions of the transmission data packet generator 222, the mobility condition determination unit 226 and the destination/source address selector 233.

The destination/source address selector 233 has a function for selecting an address to be used, in accordance with a unique policy provided in the multihoming controller 230. An address selected by the destination/source address selector 233 is transmitted to the mobility condition determination unit 226 of the MIP controller 220. It should be noted that, instead of selecting an address, the destination/source address selector 233 may transmit an address selection condition for the multihoming controller 230 (a condition referred to when the multihoming controller 230 selects an address).

Further, the mobility determination condition unit 226 has a function whereby, in the case of receiving address information or an address selection condition from the destination/source address selector 233 of the multihoming controller 230, a mobility condition that occurs as the MN moves is obtained from the multiple HoA data manager 224 and is examined, and the address information or the address selection condition and the mobility condition are employed to determine a set of an HoA and a CoA that is most appropriate for the current connection situation of the MN and/or a communication partner. The determination results (a set of an HoA and a CoA determined to be most appropriate) obtained by the mobility condition determination unit 226 are transmitted to the transmission data packet generator 222.

Furthermore, the transmission data packet generator 222 has a function for performing conversion so as to transfer a packet, using an MIP, to a destination address and a source address that are indicated by the mobility condition determination unit 226.

According to the above described arrangement, the MN can select an address while taking into account a mobility condition (further, an address selection condition employed by the multihoming controller 230). Further, as well as in the first embodiment of the invention, binding information obtained by receiving a binding update message to which a unique ID option is added, optional information, such as the priority level of an address, and a network connection condition can be referred to as a mobility condition.

As described above, according to the second embodiment of this invention, the same effects as the first to the fourth effects of the first embodiment of the invention are produced.

Furthermore, the MIP controller 220 can select an address to be used, while taking into account not only a mobility condition that occurs as the MN moves, but also an address selection condition that is employed as a reference by the multihoming controller 230.

Third Embodiment

Figure 13:
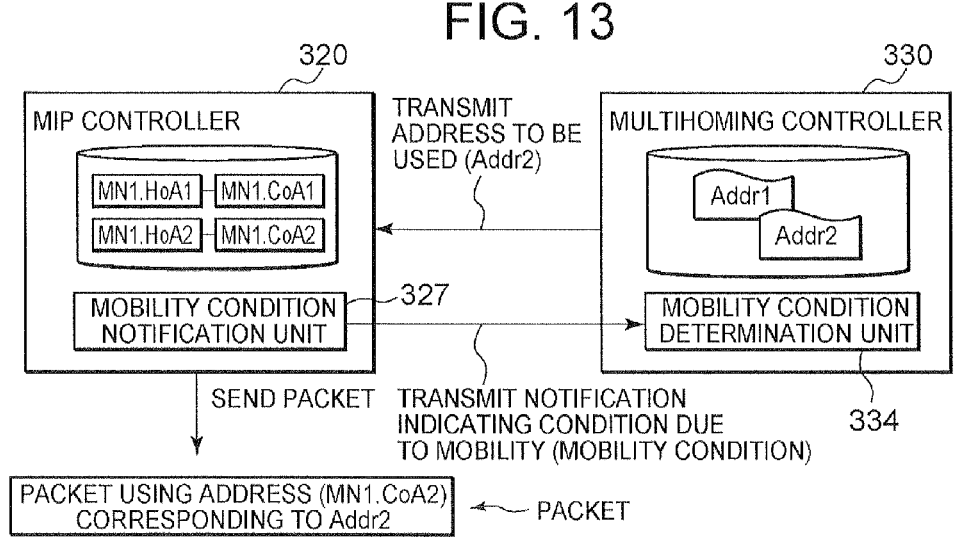
FIG. 13 is a schematic diagram showing the internal arrangement of an MN for explaining the overview of a third embodiment of the present invention.

Next, the third embodiment of the present invention will be described. FIG. 13 is a schematic diagram showing the internal arrangement of an MN to explain the overview of the third embodiment of the invention.

An MIP controller 320 and a multihoming controller 330 mounted in an MN are shown in FIG. 13. It should be noted that, as well as in FIG. 2, the presence of the MIP controller 320 indicates that a protocol, such as an MIP that achieves mobility management, is mounted in the MN, and the presence of the multihoming controller 330 indicates that a protocol that achieves multihoming is mounted in the MN.

The MIP controller 320 according to the third embodiment of the invention includes a mobility condition notification unit 327. The mobility condition notification unit 327 includes a function for transmitting, to the multihoming controller 330, a mobility condition available for the MIP controller 320.

Assume that, for example, the MN is in the multihomed state, and the multihoming controller 330 manages two addresses (Addr1 and Addr2). And assume that the MN moved from its own home network to a foreign network, and has obtained a CoA (MN1.CoA1) correlated with Addr1 (=MN1.HoA1) and a CoA (MN1.CoA2) correlated with Addr2 (=MN1.HoA2).

For the third embodiment of the invention, the mobility condition notification unit 327 of the MIP controller 320 notifies the multihoming controller 330 of a mobility condition. On the other hand, the mobility condition determination unit 334 of the multihoming controller 330 of the third embodiment of the invention has a function for, based on the mobility condition transmitted by the mobility condition notification unit 327, selecting, of two addresses (Addr1 and Addr2) an address to be used for communication with a predetermined communication partner. At this time, the mobility condition determination unit 334 can also perform address selection, while further taking into account a condition related to the multihoming controller 330 (e.g., an address selection condition that is exchanged with the multihoming controller of a predetermined communication partner).

As a result, when Addr2, for example, is selected from two addresses (Addr1 and Addr2), the mobility condition determination unit 334 of the multihoming controller 330 transmits, to the MIP controller 320, a notification indicating Addr2 as an address to be used. Upon receiving the notification indicating Addr2 from the multihoming controller 330, the MIP controller 320 designates, as a source address, MN1.HoA2 that is equal to Addr2 or MN1.CoA2 consonant with MN1.HoA2, and performs packet transmission. On the other hand, for setting of a destination address as well as for a source address, based on a mobility condition transmitted by the mobility condition notification unit 327, the mobility condition determination unit 334 selects the most appropriate address for the current connection situation of the MN and/or the communication partner, and notifies the MIP controller 320 of this address. Thus, the MN transmits a packet with address setting that reflects a mobility condition.

Figure 14:
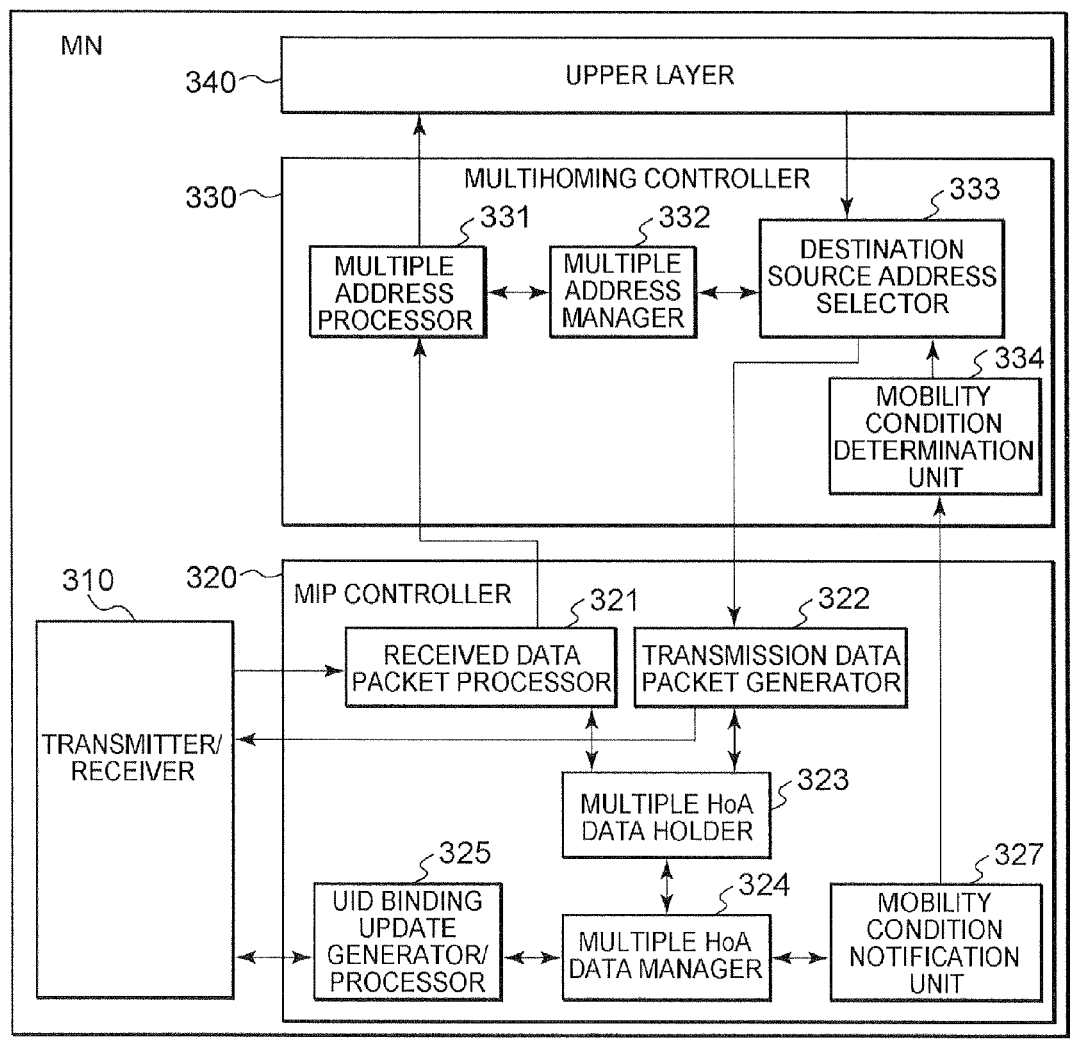
FIG. 14 is a block diagram showing a first example internal configuration for the MN according to the third embodiment of the present invention.

The third embodiment of this invention will now be specifically explained. FIG. 14 is a block diagram showing a first example internal arrangement for the MN according to the third embodiment of the invention. The MN in FIG. 14 includes a transmitter/receiver 310, an MIP controller 320, a multihoming controller 330 and an upper layer 340. Further, the MIP controller 320 includes a received data packet processor 321, a transmission data packet generator 322, a multiple HoA data holder 323, a multiple HoA data manager 324, a UID binding update generator/processor 325 and a mobility condition notification unit 327, while the multihoming controller 330 includes a multiple address processor 331, a multiple address manager 332, a destination/source address selector 333, and a mobility condition determination unit 334. It should be noted that the MIP controller 320, the mobility condition notification unit 327, the multihoming controller 330 and the mobility condition determination unit 334 shown in FIG. 14 correspond to the MIP controller 320, the mobility condition notification unit 327, the multihoming controller 330 and the mobility condition determination unit 334 shown in FIG. 14.

The internal arrangement of the MN for the third embodiment of the invention will now be described by comparison with the internal arrangement (arrangement in FIG. 3) of the MN for the first embodiment of the invention.

In the case wherein the internal arrangement of the MN for the third embodiment of the invention is compared with the internal arrangement of the MN for the first embodiment of the invention, the mobility condition notification unit 327 is arranged in the MIP controller 320, instead of the mobility condition determination unit 126, and the mobility condition determination unit 334 is arranged in the multihoming controller 330.

The mobility condition notification unit 327 has a function for transmitting, to the mobility condition determination unit 334 of the multihoming controller 330, a notification indicating a mobility condition available for the MIP controller 320. That is, the mobility condition notification unit 327 transmits, to the mobility condition determination unit 334, a notification that indicates various information like binding information of the own HoA and CoA, binding information of the HoA and CoA of a communication partner and optional information, such as a priority level correlated with binding information that is obtained from a communication partner. Further, when an address that is determined that should not be used as an address selection choice for the multihoming controller is included in multiple HoAs and multiple CoAs of a communication partner that are managed by the multihoming controller 330, the mobility condition notification unit 327 of the MIP controller 320 transmits this fact as one of mobility conditions to the mobility condition determination unit 334. In this case, for example, when the mobility condition notification unit 327 transmits to the mobility condition determination unit 334 a notification indicating a mobility condition, the priority level of 0 is transmitted for an address that should not be selected, and the mobility condition determination unit 334 performs address selection excluding an address having the priority of 0 from choices. Additionally, when there is a new address to be included as a choice for address selection by the multihoming controller 330, the mobility condition notification unit 327 of the MIP controller 320 transmits an address as one of mobility conditions. It should be noted that, when this address is to be transmitted to the multihoming controller 330, the address may be handled as a newly added one, or may be handled as a replacement for an old address.

Additionally, the mobility condition determination unit 334 includes a function whereby, upon receiving a mobility condition from the mobility condition notification unit 327 of the MIP controller 320, this mobility condition, or the mobility condition and an address selection condition employed as a reference by the multihoming controller 330 are used to determine the most appropriate set of HoA and a CoA for the current connection situation of the MN and/or the communication partner. The determination results (an address determined to be most appropriate) obtained by the mobility condition determination unit 334 are transmitted to the destination/source address selector 333, and the destination/source address selector 333 transmits the address to the transmission data packet generator 322 of the MIP controller 320. It should be noted that the destination/source address selector 333 may examine a mobility condition that the mobility condition notification unit 327 has transmitted to the mobility condition determination unit 334, and may consider these sets of information to select a destination address and a source address. Furthermore, for address selection, not only a mobility condition, but also another condition employed as a reference by the multihoming controller 330 may be taken into account. It should be noted that the mobility condition determination unit 334 may be designed so as to passively accept a mobility condition from the mobility condition notification unit 327, or may be designed so as to actively obtain, for a reference, a mobility condition from the multiple HoA data manager 324.

With the above arrangement, the MN can perform address selection while taking into account a mobility condition (further, an address selection condition employed as a reference by the multihoming controller 330).

Additionally, for the third embodiment of this invention, the mobility condition determination unit 334 is located in the multihoming controller 330. This arrangement is effective especially for the state wherein, as shown in FIG. 15, multiple HoAs and CoAs owned by the MN are managed respectively by multiple MIP controllers 320 (state wherein multiple MIP controllers 320 are present)

Figure 15:
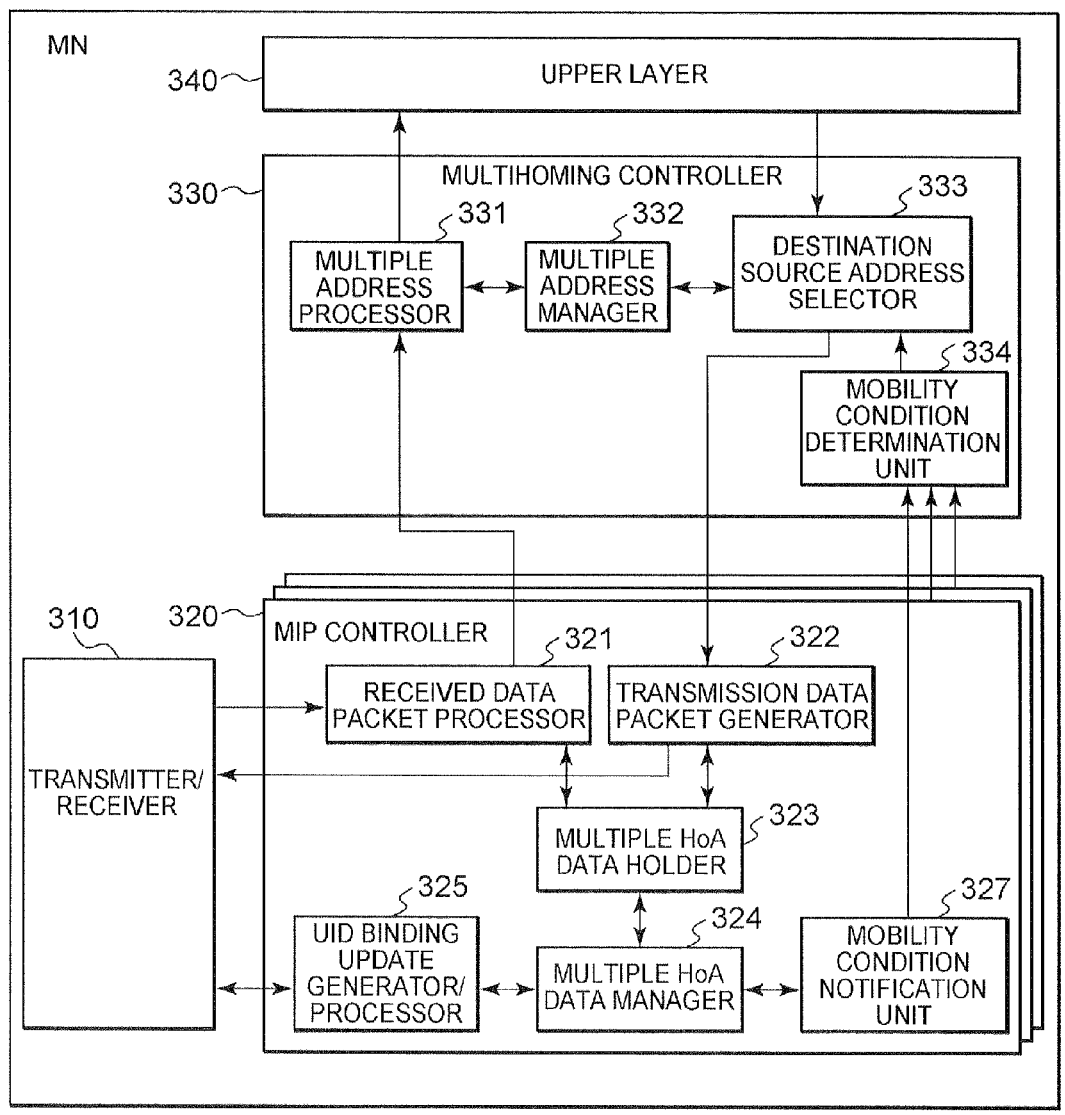
FIG. 15 is a block diagram showing a second example internal configuration for the MN according to the third embodiment of the present invention.

FIG. 15 is a block diagram showing a second example internal arrangement for the MN according to the third embodiment of the invention. The MN in FIG. 15 includes a transmitter/receiver 310, multiple MIP controllers 320, a multihoming controller 330 and an upper layer 340. Further, each of the MIP controllers 320 includes a mobility condition notification unit 327, and a mobility condition determination unit 334 of the multihoming controller 330 is so designed as to receive mobility conditions related to HoAs from the individual mobility condition notification units 327, collect these mobility conditions, and select the most appropriate address as a whole.

With the above arrangement, also in the case wherein multiple MIP controllers 320 manage the individual HoAs, the MN can perform address selection while taking into account a mobility condition (further, an address selection condition employed as a reference by the multihoming controller 330).

As described above, according to the third embodiment of this invention, the same effects as the first to the fourth effects of the first embodiment of the invention are produced. Furthermore, the MIP controller 320 can select an address to be used, while taking into account not only a mobility condition that occurs as the MN moves, but also an address selection condition that is employed as a reference by the multihoming controller 330. Also in the case wherein multiple MIP controllers 320 independently manage the individual HoAs, the MN can perform address selection while taking into account mobility conditions concerning the HoAs.

Fourth Embodiment

Next, the fourth embodiment of the present invention will be described. FIG. 16 is a schematic diagram showing the internal arrangement of an MN to explain the overview of the fourth embodiment of the invention.

An MIP controller 420, a multihoming controller 430 mounted in an MN and a mobility condition determination unit 450 are shown in FIG. 16. It should be noted that, as well as in FIG. 2, the presence of the MIP controller 420 represents that a protocol, such as an MIP that achieves mobility management, is mounted in the MN, and the presence of the multihoming controller 430 represents that a protocol that achieves multihoming is mounted in the MN. Additionally, the presence of the mobility condition determination unit 450 represents that a function related to determination of a mobility condition is mounted, separately from both the MIP controller 420 and the multihoming controller 430.

The MIP controller 420 according to the fourth embodiment of the invention includes a mobility condition notification unit 427. The mobility condition notification unit 427 includes a function for transmitting, to the mobility condition determination unit 450, a mobility condition available for the MIP controller 420.

Assume that, for example, the MN is in the multihomed state, and the multihoming controller 430 manages two addresses (Addr1 and Addr2). And assume that the MN moved from its own home network to a foreign network, and has obtained a CoA (MN1.CoA1) correlated with Addr1 (=MN1.HoA1) and a CoA (MN1.CoA2) correlated with Addr2 (=MN1.HoA2).

The mobility condition notification unit 427 of the MIP controller 420 for the fourth embodiment of the invention transmits a mobility condition to the mobility condition determination unit 450. On the other hand, the mobility condition determination unit 450 for the fourth embodiment of this invention has a function for examining the mobility condition, and for, based on this mobility condition, determining the most appropriate set of an HoA and a CoA for the current connection situation of the MN and/or a communication partner. And, when, for example, the mobility condition determination unit 450 determines based on the mobility condition that a set of MN1.HoA2 and MN1.CoA2 is better to be used than a set of MN1.HoA1 and MN1.CoA1 to perform more proper communication, the mobility condition determination unit 450 transmits, to the multihoming controller 430, a notification indicating that MN1.HoA2 should be employed.

In accordance with the notification transmitted by the mobility condition determination unit 450, the multihoming controller 430 selects Addr2 (=MN1.HoA2), and transmits, to the MIP controller 420, a notification indicating that Addr2 is an address to be used. Upon receiving the notification indicating Addr2, the MIP controller 420 performs packet transmission by designating, as a source address, MN1.HoA2 that is equal to Addr2, or MN1.CoA2 that is consonant with MN1.HoA2. On the other hand, for setting a destination address as well as for a source address, based on a mobility condition transmitted by the mobility condition notification unit 427, the mobility condition determination unit 450 determines the most appropriate set of an HoA and a CoA for the current connection situation of the MN and/or a communication partner, and transmits a notification indicating this information to the multihoming controller 430. In accordance with this notification, the multihoming controller 430 notifies the MIP controller 420 of an address to be used. Thus, the MN transmits a packet for which address setting that reflects a mobility condition has been performed.

The fourth embodiment of this invention will now be specifically explained. FIG. 17 is a block diagram showing a first example internal arrangement for the MN according to the fourth embodiment of the invention. The MN in FIG. 17 includes a transmitter/receiver 410, an MIP controller 420, a multihoming controller 430, an upper layer 440 and a mobility condition determination unit 450. Further, the MIP controller 420 includes a received data packet processor 421, a transmission data packet generator 422, a multiple HoA data holder 423, a multiple HoA data manager 424, a UID binding update generator/processor 425 and a mobility condition notification unit 427, while the multihoming controller 430 includes a multiple address processor 431, a multiple address manager 432 and a destination/source address selector 433. It should be noted that the MIP controller 420, the mobility condition notification unit 427, the multihoming controller 430 and the mobility condition determination unit 450 shown in FIG. 17 correspond to the MIP controller 420, the mobility condition notification unit 427, the multihoming controller 430 and the mobility condition determination unit 450 shown in FIG. 16.

The internal arrangement of the MN for the fourth embodiment of the invention will now be described through a comparison with the internal arrangement (arrangement shown in FIG. 14 or 15) of the MN for the third embodiment of the invention.

Compared with the internal arrangement of the MN for the third embodiment of the invention, there is a difference in that the mobility condition determination unit 450 in the MN for the fourth embodiment of the invention is provided separately from the MIP controller 420 and the multihoming controller 430.

The mobility condition determination unit 450 includes a function whereby, upon receiving a mobility condition from the mobility condition notification unit 427 of the MIP controller 420, this mobility condition is employed to determine the most appropriate set of HoA and a CoA for the current connection situation of the MN and/or the communication partner. The determination results (an address determined to be most appropriate) obtained by the mobility condition determination unit 450 are transmitted to the destination/source address selector 433, and the destination/source address selector 433 transmits the address to the transmission data packet generator 422 of the MIP controller 420.

It should be noted that the mobility condition determination unit 450 may obtain, from the multihoming controller 430, an address selection condition employed as a reference by the multihoming controller 430. In this case, based on a mobility condition and an address selection condition employed by the multihoming controller 430, the mobility condition determination unit 450 determines the most appropriate address for the current connection situation of the MN and/or the communication partner. Additionally, the destination/source address selector 433 may examine a mobility condition that the mobility condition notification unit 427 has transmitted to the mobility condition determination unit 450, and may consider these sets of information to select a destination address and a source address. Furthermore, for address selection, not only a mobility condition, but also another condition employed as a reference by the multihoming controller 430 may be taken into account. It should be noted that the mobility condition determination unit 450 may be designed so as to passively accept a mobility condition from the mobility condition notification unit 427, or may be designed so as to actively obtain, for a reference, a mobility condition from the multiple HoA data manager 424.

With the above arrangement, the MN can perform address selection while taking into account a mobility condition (further, an address selection condition employed as a reference by the multihoming controller 430).

Additionally, the fourth embodiment of this invention, as well as the third embodiment of the invention, is effective especially for the state wherein multiple HoAs and CoAs owned by the MN are managed respectively by multiple MIP controllers 420 (state wherein multiple MIP controllers 420 are present).

Figure 18:
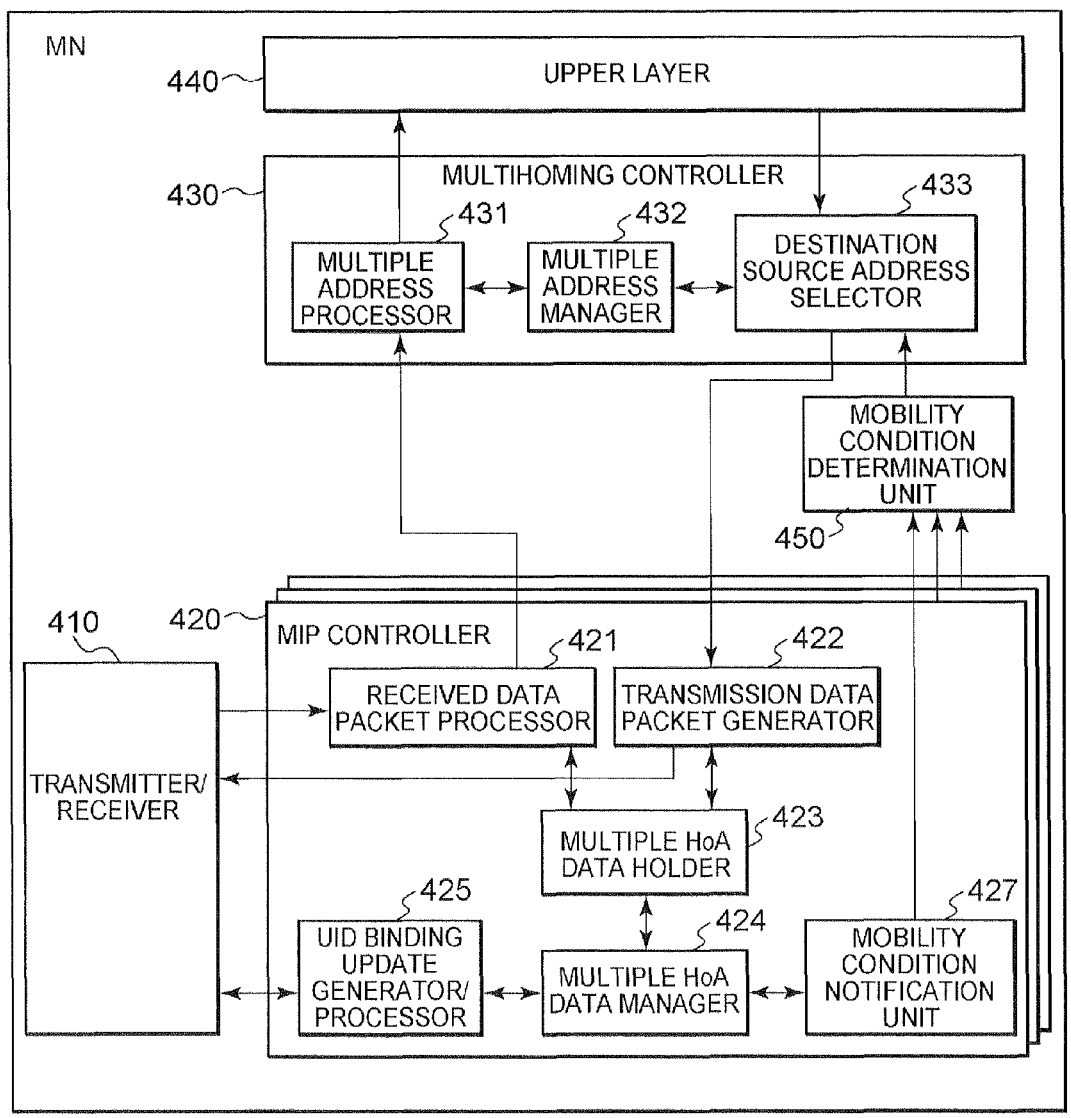
FIG. 18 is a block diagram showing a second example internal configuration for the MN according to the fourth embodiment of the present invention.

FIG. 18 is a block diagram showing a second example internal arrangement for the MN according to the fourth embodiment of the invention. The MN in FIG. 18 includes a transmitter/receiver 410, multiple MIP controllers 420, a multihoming controller 430 and an upper layer 440. Further, each of the MIP controllers 420 includes a mobility condition notification unit 427, and a mobility condition determination unit 450 is so designed as to receive mobility conditions related to HoAs from the individual mobility condition notification units 427, collect these mobility conditions, and select the most appropriate address as a whole. Further, also in this case, the mobility condition determination unit 450 may obtain, from the multihoming controller 430, an address selection condition employed as a reference by the multihoming controller 430. It should be noted that the mobility condition determination unit 450 may be designed so as to passively accept a mobility condition from the mobility condition notification unit 427, or may be designed so as to actively obtain, for a reference, a mobility condition from the multiple HoA data manager 424 of each MIP controller 420.

With the above arrangement, also in the case wherein multiple MIP controllers 420 manage the individual HoAs, the MN can perform address selection while taking into account a mobility condition (further, an address selection condition employed as a reference by the multihoming controller 430).

As described above, according to the fourth embodiment of this invention, the same effects as the third embodiment of the invention are produced.

The case wherein the multihoming controller is arranged at a position higher than the MIP controller has been explained in the first to the fourth embodiments of this invention. In the following fifth to ninth embodiments of the invention, the case wherein a multihoming controller is arranged at a position lower than an MIP controller will be explained.

Fifth Embodiment

Figure 19:
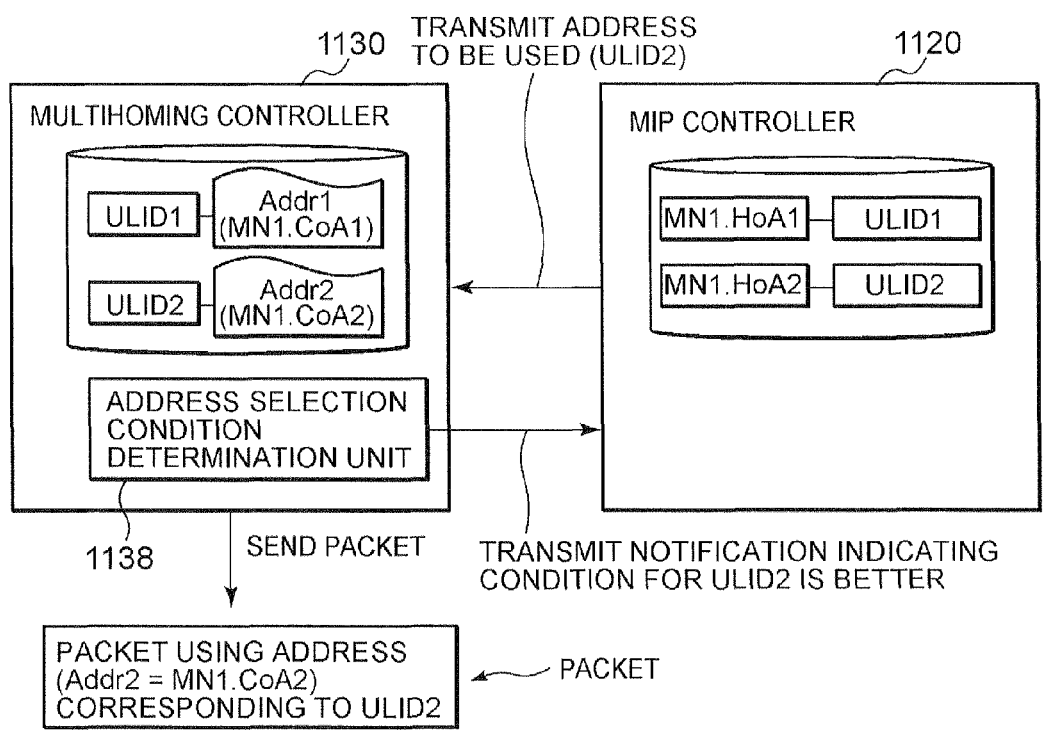
FIG. 19 is a schematic diagram showing the internal arrangement of an MN for explaining the overview of a fifth embodiment of the present invention.

Next, the fifth embodiment of the present invention will be described. FIG. 19 is a schematic diagram showing the internal arrangement of an MN to explain the overview of the fifth embodiment of the invention.

An MIP controller 1120 and a multihoming controller 1130 mounted in an MN are shown in FIG. 19. It should be noted that the presence of the MIP controller 1120 indicates that a protocol, such as an MIP that achieves mobility management, is mounted in the MN, and the presence of the multihoming controller 1130 indicates that a protocol that achieves multihoming is mounted in the MN.

Furthermore, as described above, the multihoming controller 1130 present below the MIP controller 1120 is so designed as to manage an IP address allocated to an interface, in correlation with a ULID, and the MIP controller 1120 is so designed as to perform correlation with this ULID for management of a home address. Here, assume that the multihoming controller 1130 maintains a correlation between Addr1 (=MN1.CoA1) and ULID1 and a correlation between Addr2 (=MN1.CoA2) and ULID2, and the MIP controller 1120 maintains a correlation between MN1.HoA1 and ULID1 and a correlation between MN1.HoA2 and ULID2. It should be noted that the multihoming controller 1130 can manage a plurality of ULIDs, and can also correlate a plurality of addresses with one ULID for management.

The multihoming controller 1130 for the fifth embodiment of this invention includes an address selection condition determination unit 1138. This address selection condition determination unit 1138 has a function for obtaining and referring to an address selection condition (a condition due to multihoming that the multihoming controller 1130 employs as a reference for address selection), and for employing the address selection condition to determine the most appropriate ULID (or an address consonant with a ULID) for the current connection situation of an MN and/or a communication partner. Various conditions available for the multihoming controller 1130, such as a condition that the path to a communication partner is shortest, a condition that security along the path to the communication partner is the highest, a communication condition requested by the communication partner and a condition related to the speed or the stability of an interface or a cost, can be employed as address selection conditions.

Assume that, for example, the address selection condition concerning multihoming is changed due to the change of the communication environment of the MN or another factor. In this case, when the address selection condition determination unit 1138 of the multihoming controller 1130 for the fifth embodiment of this invention employs the address selection condition to determine that, for example, an address (Addr2) correlated with ULID2 is better to use than an address (Addr1) correlated with ULID1 to perform more appropriate communication, the address selection condition determination unit 1138 transmits, to the MIP controller 1120, a notification indicating that ULID2 should be used as an address.

Upon receiving a notification from the address selection condition determination unit 1138, the MIP controller 1120 selects ULID2, and transmits, to the multihoming controller 1130, a notification that ULID2 is an address to be employed. Upon receiving the notification indicating ULID2, the multihoming controller 1130 designates, to a source address, an address (Addr2) consonant with ULID2, and transmits a packet. Thus, the MN performs packet transmission with address setting that has reflected a mobility condition.

Figure 20:
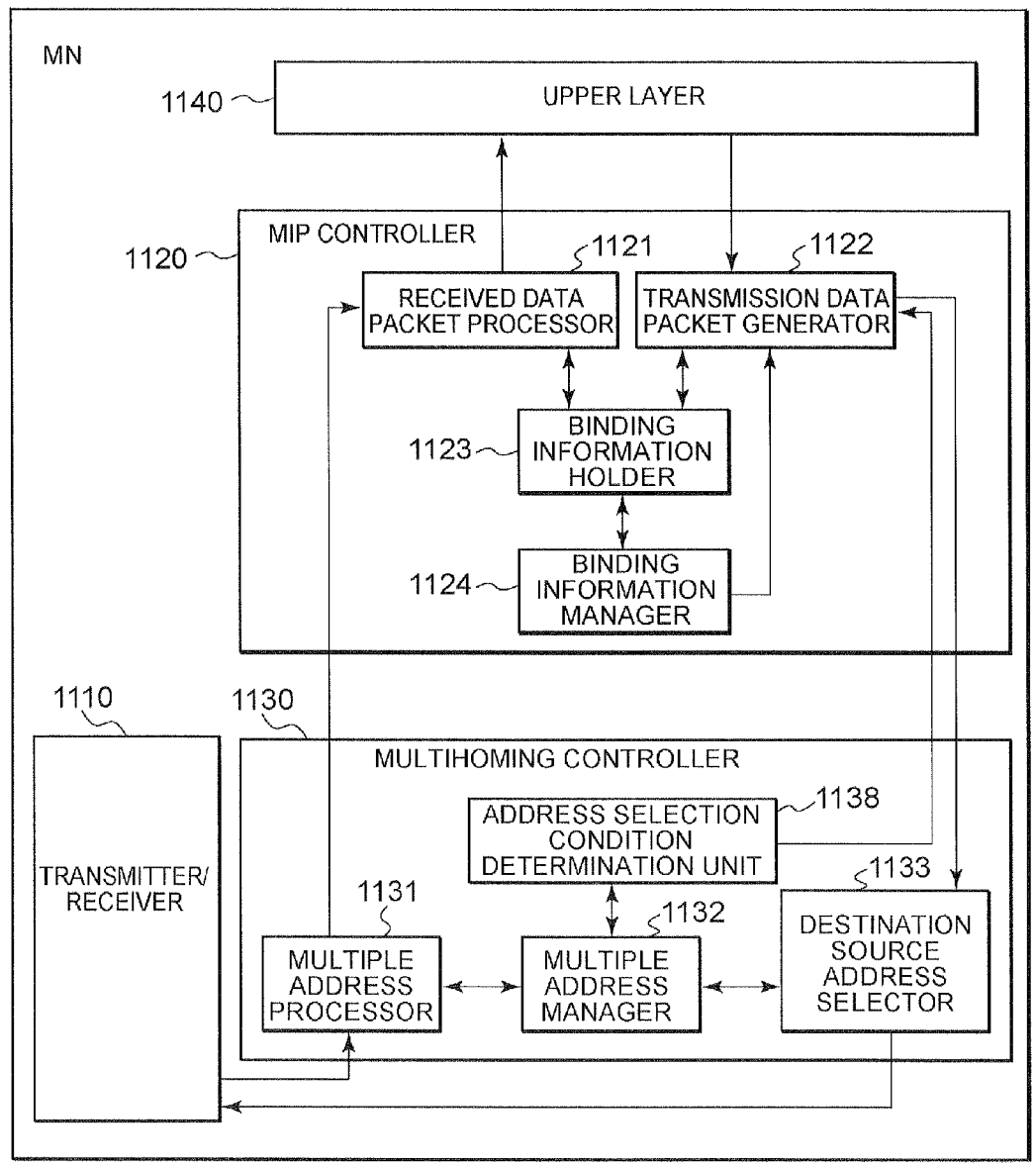
FIG. 20 is a block diagram showing an example internal configuration for the MN according to the fifth embodiment of the present invention.

The fifth embodiment of this invention will now be specifically explained. FIG. 20 is a block diagram showing an example internal arrangement for the MN according to the fifth embodiment of the invention. The MN in FIG. 20 includes a transmitter/receiver 1110, an MIP controller 1120, a multihoming controller 1130 and an upper layer 1140. It should be noted that the MIP controller 1120, an address selection condition determination unit 1138, the multihoming controller 1130 shown in FIG. 20 correspond to the MIP controller 1120, the address selection condition determination unit 1138 and the multihoming controller 1130 shown in FIG. 19.

The transmitter/receiver 1110 has a function for performing communication with a communication node in a network the MN accesses and an arbitrary communication node present in an upper network. Further, the upper layer 1140 is a layer (e.g., a TCP/UDP layer) higher than an IP in a common layer structure.

Furthermore, the MIP controller 1120 is a function for managing moving of the MN. The MIP controller 1120 includes a received data packet processor 1121, a transmission data packet generator 1122, a binding information holder 1123 and a binding information manager 1124.

The received data packet processor 1121 has a function whereby, in the case wherein an MIP is employed to transfer a received data packet, the packet is converted into the original form. A packet transfer using an MIP includes a case wherein a packet is encapsulated by the HA and a case where a routing header is inserted by a communication partner and the resultant packet is transmitted directly to oneself.

Additionally, the transmission data packet generator 1122 includes a function for forming, into a packet, data received from, for example, the upper layer 1140. Here, the transmission data packet generator 1122 selects, as a packet source address, an address that is consonant with the ULID transmitted from the address selection condition determination unit 1138 of the multihoming controller 1130. It should be noted that, in the arrangement wherein the multihoming controller 1130 is arranged at a position lower than the MIP controller 1120, the MIP controller 1120 receives a notification indicating a ULID from the multihoming controller 1130. Therefore, generally, the MIP controller 1120 handles a ULID instead of a CoA, and the transmission data packet generator 1122 selects a ULID that is used as, for example, a packet source address, and transmits the ULID to the lower multihoming controller 1130. It should be noted that the transmission data packet generator 1122 may be designed so as to passively accept, from the address selection condition determination unit 1138, the determination results obtained by the address selection condition determination unit 1138, or may be designed so as to actively obtain the determination results, for a reference, from the address selection condition determination unit 1138.

Further, the binding information holder 1123 includes a function for holding binding information where the HoAs maintained by the MN are correlated with ULIDs transmitted by the multihoming controller 1130. For example, as shown in FIG. 19, the binding information holder 1123 holds binding information for MN1.HoA1 and ULID1, binding information for MN1.HoA2 and ULID2, etc. It should be noted that a plurality of ULIDs may be mapped for one HoA, or reversely, a plurality of HoAs may be mapped for one ULID.

Furthermore, the binding information manager 1124 includes a function for managing addresses maintained by the MN. The binding information manager 1124 also has a function for obtaining and managing various conditions (e.g., a mobility condition) available for the MIP controller 1120, and for selecting an address to be used. For the fifth embodiment of this invention, the transmission data packet generator 1122 selects an address based on a ULID transmitted by the address selection condition determination unit 1138 of the multihoming controller 1130. However, it is also possible that the transmission data packet generator 1122 receives an address notification from the binding information manager 1124, and performs address selection by the common address selection method employed by the MIP controller 1120 (based on a mobility condition, the binding information manager 1124 selects an address to be used). It is also possible that, for example, the transmission data packet generator 1122 changes, as needed, an address consonant with an ULID transmitted by the address selection condition determination unit 1138 of the multihoming controller 1130 and an address transmitted by the binding information manager 1124.

On the other hand, the multihoming controller 1130 has a function for managing the multihomed state of the MN. The multihoming controller 1130 includes a multiple address processor 1131, a multiple address manager 1132, a destination/source address selector 1133 and an address selection condition determination unit 1138.

The multiple address processor 1131 includes a function for obtaining a packet that the transmitter/receiver has received externally, performing the processing concerning the packet, and transmitting the packet to the MIP controller 1120. The process for, for example, transmitting a received packet while converting, into a corresponding ULID, a CoA that is designated to the destination address for the received packet is performed.

Further, the multiple address manager 1132 includes a function for managing multiple addresses owned by this MN. The multiple address manager 1132 holds and manages, for example, a plurality of addresses (Addr1 and Addr2) in the multihomed state, in correlation with ULIDs. Furthermore, the multiple address manager 1132 transfers necessary information in accordance with a request issued by the multiple address processor 1131 or the destination/source address selector 1133.

Additionally, the destination/source address selector 1133 includes a function for receiving a transmission packet from the transmission data packet generator 1122 of the MIP controller 1120, and for selecting addresses that are used as a source address for a transmission packet that is received, and as a destination address. It should be noted that the destination/source address selector 1133 receives a ULID notification from the transmission data packet generator 1122, selects an address corresponding to the ULID, and designates the address as a source address.

Moreover, the address selection condition determination unit 1138 includes a function for obtaining, from the multiple address manager 1132, various address selection conditions available for the multihoming controller 1130, such as a condition that occurs as the change of the multihomed state and a condition related to multihoming that is transmitted by the communication partner, and for employing these address selection conditions to determine the most appropriate address (or the ULID) for the current connection situation for the MN and/or the communication partner, and transmitting the determination results to the MIP controller 1120.

With the above described arrangement, the MN can transmit a packet by employing an address that is selected while taking into account an address selection condition available for the multihoming controller 1130 (and an address that is selected while taking into account a mobility condition available for the MIP controller 1120).

As described above, according to the fifth embodiment of the invention, since the multihoming controller 1130 selects an address to be used, while taking into account an address selection condition due to the multihomed state of the MN, the MIP controller 1120 can perform address selection based on the notification received from the multihoming controller 1130, so that selection and usage of an address while taking an address selection condition into account is enabled.

Sixth Embodiment

Figure 21:
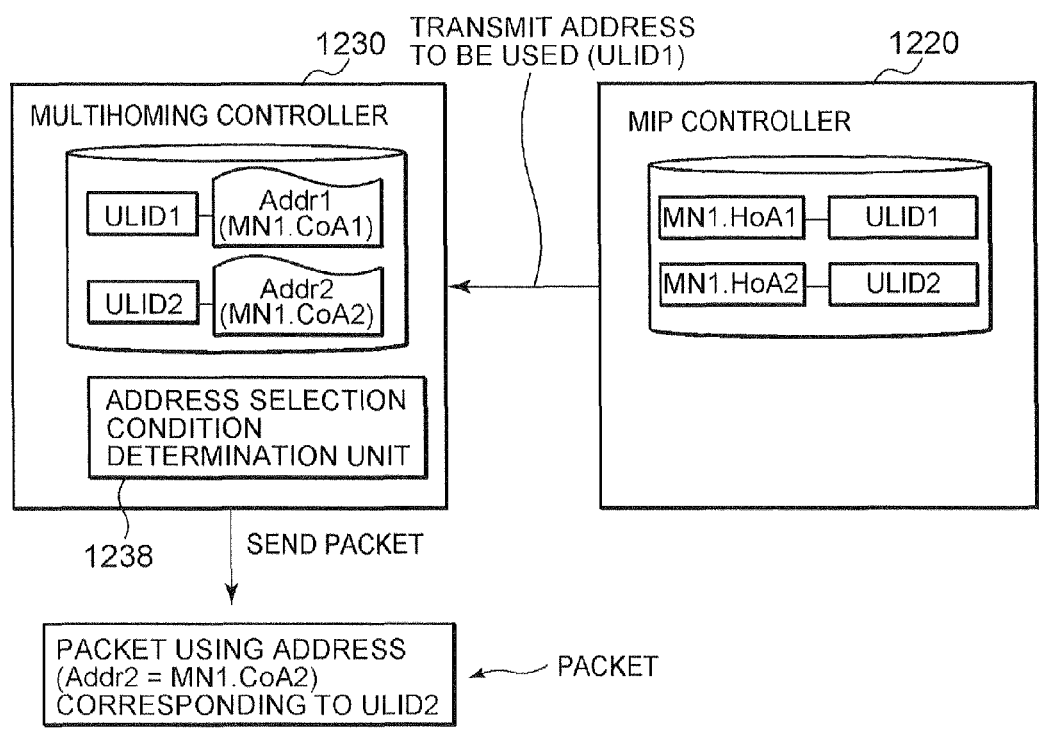
FIG. 21 is a schematic diagram showing the internal arrangement of an MN for explaining the overview of a sixth embodiment of the present invention.

Next, the sixth embodiment of the present invention will be described. FIG. 21 is a schematic diagram showing the internal arrangement of an MN to explain the overview of the sixth embodiment of the invention.

An MIP controller 1220 and a multihoming controller 1230 mounted in an MN are shown in FIG. 21. It should be noted that, as well as in FIG. 19, the presence of the MIP controller 1220 indicates that a protocol, such as an MIP that achieves mobility management, is mounted in the MN, and the presence of the multihoming controller 1230 indicates that a protocol that achieves multihoming is mounted in the MN. Further, as well as in FIG. 19, the multihoming controller 1230 holds a correlation between Addr1 (=MN1.CoA1) and ULID1 and a correlation between Addr2 (=MN1.CoA2) and ULID2, and the MIP controller 1220 holds a correlation between MN1.HoA1 and ULID1 and a correlation between MN1.HoA2 and ULID2.

The multihoming controller 1230 according to the sixth embodiment of the invention includes an address selection condition determination unit 1238. The address selection condition determination unit 1238 includes a function that obtains and examines an address selection condition, and based on this address reference condition, determines the most appropriate ULID (or an address corresponding to a ULID) for the current connection situation of the MN and/or a communication partner.

According to the sixth embodiment of the invention, the MIP controller 1220, as well as the MIP controller 2020 in the prior art (see FIG. 30), independently performs address selection, and transmits a selected address (ULID) to the multihoming controller 1230. On the other hand, according to the sixth embodiment of the invention, when the multihoming controller 1230 receives a transmission packet from the MIP controller 1220, the address selection condition determination unit 1238 of the multihoming controller 1230 determines an address used for a packet to be transmitted, while taking into account an address selection condition available for the multihoming controller 1230. It should be noted that, at this time, the address selection condition determination unit 1238 may determine an address, while ignoring a notification transmitted by the MIP controller 1220.

Assume that, for example, the MIP controller 1220 selects, of two addresses (ULID1 and ULID2), ULID1 consonant with Addr1, and transmits, to the multihoming controller 1230, a notification that ULID1 is an address to be used. At this time, when the address selection condition determination unit 1238 of the multihoming controller 1230 considers an address selection condition, and determines that, for example, the address (Addr2) consonant with ULID2 is better to be used than the address (Addr1) consonant with ULID1 to perform more appropriate communication, the multihoming controller 1230 designates, as a source address, the address (Addr2) consonant with ULID2, and transmits a packet. Furthermore, for setting of a destination address as well as for a source address, the address selection condition determination unit 1238 of the multihoming controller 1230 determines a destination address while taking an address selection condition into account, and transmits a packet with the address being designated. Thus, the MN performs packet transmission, while address setting that has reflected an address selection condition is performed.

Figure 22:
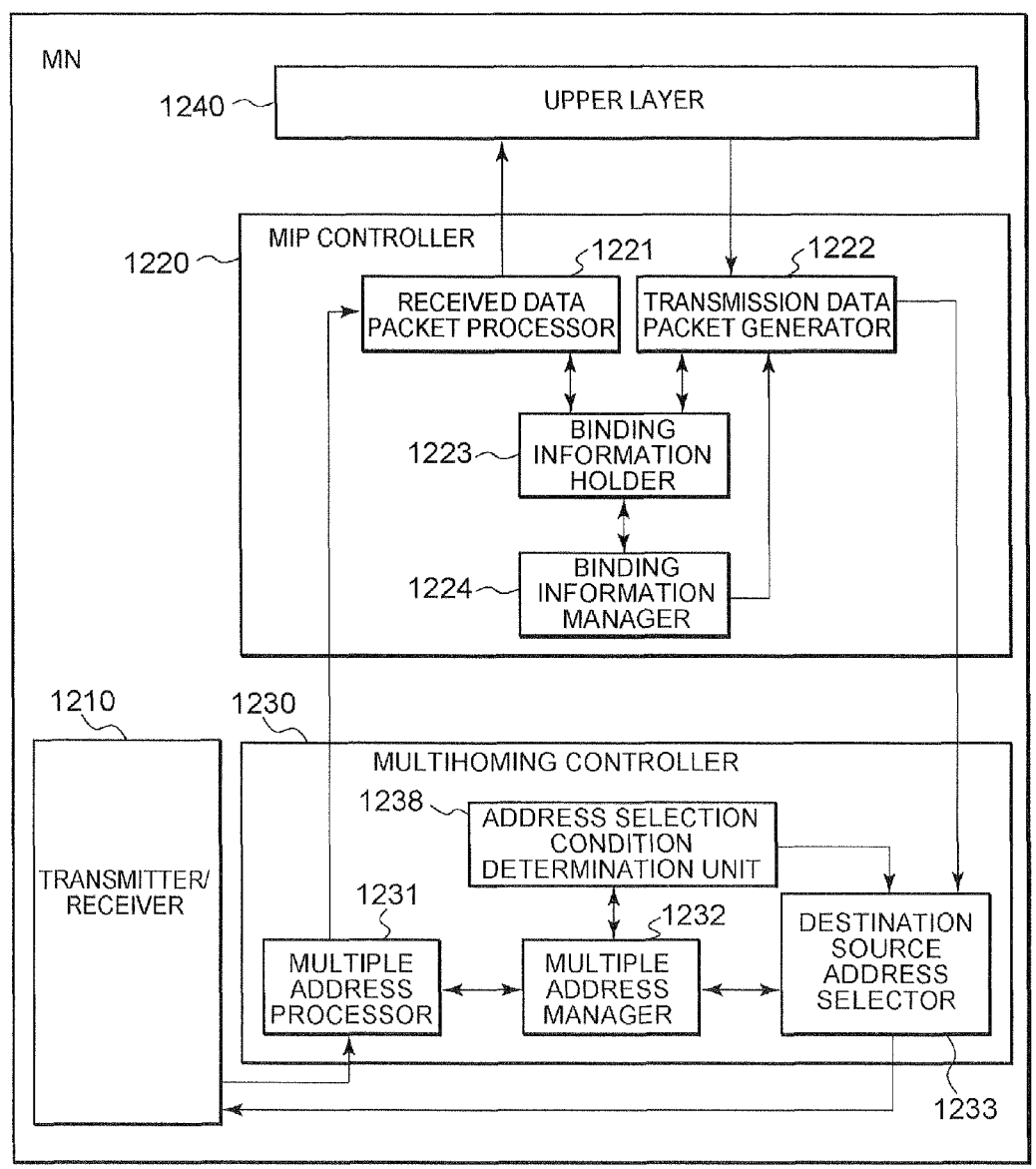
FIG. 22 is a block diagram showing an example internal configuration for the MN according to the sixth embodiment of the present invention.

The sixth embodiment of this invention will now be specifically explained. FIG. 22 is a block diagram showing an example internal arrangement for the MN according to the sixth embodiment of the invention. The MN in FIG. 22 includes a transmitter/receiver 1210, an MIP controller 1220, a multihoming controller 1230 and an upper layer 1240. Further, the MIP controller 1220 includes a received data packet processor 1221, a transmission data packet generator 1222, a binding information holder 1223 and a binding information manager 1224, while the multihoming controller 1230 includes a multiple address processor 1231, a multiple address manager 1232, a destination/source address selector 1233 and an address selection condition determination unit 1238. It should be noted that the MIP controller 1220, the multihoming controller 1230 and the address selection condition determination unit 1238 shown in FIG. 22 correspond to the MIP controller 1220, the multihoming controller 1230 and the address selection condition determination unit 1238 and shown in FIG. 21.

The internal arrangement of the MN for the sixth embodiment of the invention will now be described by comparison with the internal arrangement (arrangement in FIG. 20) of the MN for the fifth embodiment of the invention.

Compared with the internal arrangement of the MN for the fifth embodiment of the invention, the internal arrangement of the MN for the sixth embodiment of this invention differs in the functions of the transmission data packet generator 1222, the destination/source address selector 1233 and the address selection condition determination unit 1238.

According to the sixth embodiment of the invention, the MIP controller 1220, as well as the conventional MIP controller, is designed so as to independently select an address to be used, while taking a mobility condition into account. Therefore, the transmission data packet generator 1222 designates, to a packet, an address (ULID) selected by, for example, the binding information manager 1224, and transmits this packet to the multihoming controller 1230.

On the other hand, as described above, the address selection condition determination unit 1238 has a function for considering an address selection condition available for the multihoming controller 1230 to determine an address to be used for a packet to be transmitted. In the case of receiving a transmission packet from the transmission data packet generator 1233 of the MIP controller 1220, the destination/source address selector 1233 of the multihoming controller 1230 transmits, to the address selection condition determination unit 1238, information, such as the address of the communication partner. Then, based on the address selection condition, the address selection condition determination unit 1238 determines the most appropriate ULID (or an address consonant with a ULID) for communication related to this packet, and transmits the determination results to the destination/source address selector 1233. The destination/source address selector 1233 converts the source address for a transmission packet into an address that corresponds to the ULID transmitted by the address selection condition determination unit 1238, and thereafter transmits a packet.

With the above described arrangement, the MN can perform address selection while taking into account an address selection condition available for the multihoming controller 1230. And the most appropriate address for communication can be selected from among all the managed addresses, including an address that is not correlated with the ULID transmitted by the MIP controller 1220 as an address to be used (an address that is correlated with another ULID), and packet transmission can be performed.

As described above, according to the sixth embodiment of the invention, since the multihoming controller 1230 selects an address to be used, while taking into account an address selection condition due to the multihomed state of the MN, address selection can be performed without relying on the notification transmitted by the MIP controller 1220, so that selection and usage of an address while taking an address selection condition into account is enabled.

Seventh Embodiment

Figure 23:
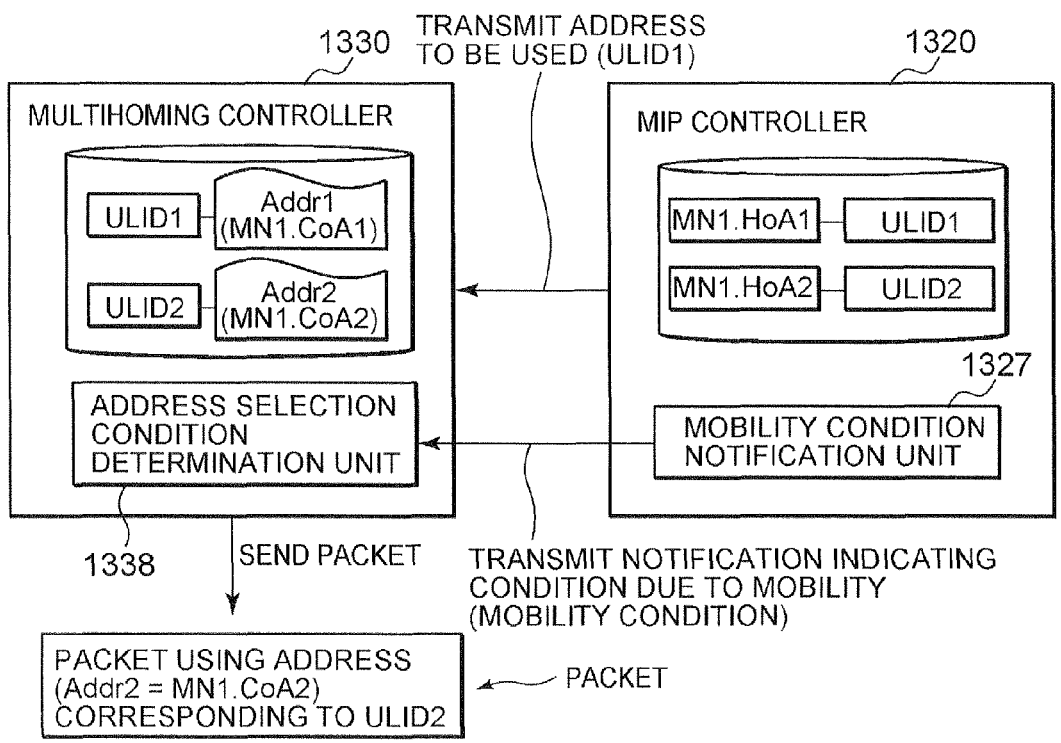
FIG. 23 is a schematic diagram showing the internal arrangement of an MN for explaining the overview of a seventh embodiment of the present invention.

Next, the seventh embodiment of the present invention will be described. FIG. 23 is a schematic diagram showing the internal arrangement of an MN to explain the overview of the seventh embodiment of the invention.

An MIP controller 1320 and a multihoming controller 1330 mounted in an MN are shown in FIG. 23. It should be noted that, as well as in FIG. 19, the presence of the MIP controller 1320 indicates that a protocol, such as an MIP that achieves mobility management, is mounted in the MN, and the presence of the multihoming controller 1330 indicates that a protocol that achieves multihoming is mounted in the MN. Further, as well as in FIG. 19, the multihoming controller 1330 holds a correlation between Addr1 (=MN1.CoA1)

and ULID1 and a correlation between Addr2 (=MN1.CoA2) and ULID2, and the MIP controller 1320 holds a correlation between MN1.HoA1 and ULID1 and a correlation between MN1.HoA2 and ULID2.

The MIP controller 1320 according to the seventh embodiment of the invention includes a mobility condition notification unit 1327. The mobility condition notification unit 1327 includes a function for transmitting, to the multihoming controller 1330, a mobility condition available for the MIP controller 1320. The multihoming controller 1330 according to the seventh embodiment of the invention includes an address selection condition determination unit 1338. The address selection condition determination unit 1338 includes a function for obtaining and examining an address selection condition, and also examining a mobility condition transmitted by the mobility condition notification unit 1327, and for, based on these conditions, determining the most appropriate ULID (or an address corresponding to a ULID) for the current connection situation of the MN and/or a communication partner.

Assume that, for example, the MIP controller 1320 selects, of two addresses (ULID1 and ULID2), ULID1 that corresponds to Addr1, and transmits, to the multihoming controller 1330, a notification indicating that ULID1 is an address to be used. On the other hand, separate from this ULID1 notification, the mobility condition notification unit 1327 transmits, to the multihoming controller 1330, a notification indicating a mobility condition available for the MIP controller 1320. In the case wherein the address selection condition determination unit 1338 of the multihoming controller 1330 considers both the address selection condition and the mobility condition, and determines that, for example, the address (Addr2) corresponding to ULID2 is better to use than the address (Addr1) corresponding to ULID1 to perform more appropriate communication, an instruction for the use of ULID2 is transmitted to the address selection condition determination unit 1338. Thus, the multihoming controller 1330 designates the address (Addr2) corresponding to the ULID2 as a source address, and performs packet transmission. Further, for setting of a destination address as well as for a source address, the address selection condition determination unit 1338 of the multihoming controller 1330 determines a destination address, while taking the address selection condition and the mobility condition into account, and transmits a packet by setting the address. In this manner, the MN performs packet transmission with address setting that reflects the address selection condition and the mobility condition.

Figure 24:
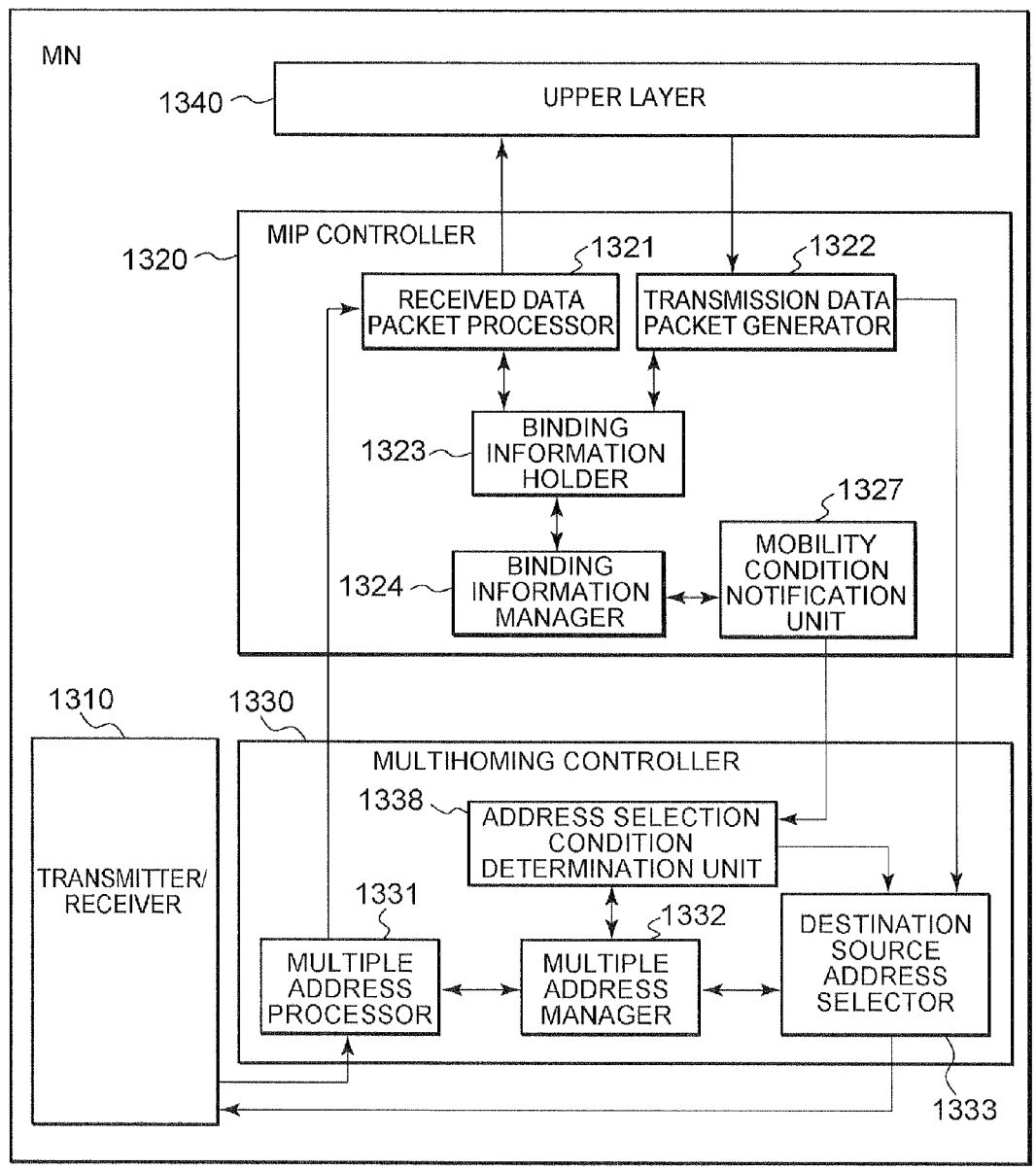
FIG. 24 is a block diagram showing an example internal configuration for the MN according to the seventh embodiment of the present invention.

The seventh embodiment of this invention will now be specifically explained. FIG. 24 is a block diagram showing an example internal arrangement for the MN according to the seventh embodiment of the invention. The MN in FIG. 24 includes a transmitter/receiver 1310, an MIP controller 1320, a multihoming controller 1330 and an upper layer 1340. Further, the MIP controller 1320 includes a received data packet processor 1321, a transmission data packet generator 1322, a binding information holder 1323, a binding information manager 1324 and a mobility condition notification unit 1327, while the multihoming controller 1330 includes a multiple address processor 1331, a multiple address manager 1332, a destination/source address selector 1333 and an address selection condition determination unit 1338. It should be noted that the MIP controller 1320, the mobility condition notification unit 1327, the multihoming controller 1330 and the address selection condition determination unit 1338 shown in FIG. 24 correspond to the MIP controller 1320, the mobility condition notification unit 1327, the multihoming controller 1330 and the address selection condition determination unit 1338 shown in FIG. 23.

The internal arrangement of the MN for the seventh embodiment of the invention will now be described by comparison with the internal arrangement (arrangement in FIG. 22) of the MN for the sixth embodiment of the invention.

Compared with the internal arrangement of the MN for the sixth embodiment of the invention, the internal arrangement of the MN for the seventh embodiment of the invention is greatly different in that the mobility condition notification unit 1327 is arranged in the MIP controller 1320.

The seventh embodiment of the invention is so designed that the mobility condition notification unit 1327 of the MIP controller 1320 transmits, to the address selection condition determination unit 1338 of the multihoming controller 1330, a notification indicating a mobility condition available for the MIP controller 1320. It should be noted that an arbitrary mode is employed for this notification, and is provided as, for example, a periodical notification, a notification issued only in the case wherein a mobility condition is changed, a notification indicating only a difference in a change of a mobility condition, or a notification in consonance with a request issued by the address selection condition determination unit 1338.

On the other hand, as one of conditions to be referred to for address selection, the address selection condition determination unit 1338 of the multihoming controller 1330 employs a mobility condition transmitted by the mobility condition notification unit 1327, in addition to an address selection condition available for the multihoming controller 1330. As a result, the address selection condition determination unit 1338 can consider both the address selection condition and the mobility condition related to multihoming, and determine an address to be used for a packet to be transmitted. Based on the address selection condition and the mobility condition, the address selection condition determination unit 1338 determines the most appropriate ULID (or the address corresponding to the ULID) for communication for the packet, and transmits the determination results to the destination/source address selector 1333. Further, the seventh embodiment of this invention may be designed so that the transmission data packet generator 1322 does not designate a ULID to transfer a transmission packet to the destination/source address selector 1333, and the destination/source address selector 1333 ignores a ULID transmitted by the transmission data packet generator 1322. Further, the address selection condition determination unit 1338 may be designed so as to passively accept a mobility condition from the mobility condition notification unit 1327, or to actively obtain the mobility condition for a reference from the binding information manager 1324.

With the above described arrangement, the MN can perform address selection while taking into account both a mobility condition available for the MIP controller 1320, and an address selection condition available for the multihoming controller 1330. And based on the overall condition, the most appropriate address for communication can be selected from among all the managed addresses, including an address that is not correlated with the ULID transmitted by the MIP controller 1320 as an address to be used (an address that is correlated with another ULID), and packet transmission can be performed by using this address.

As described above, according to the seventh embodiment of the invention, since the multihoming controller 1330 selects an address to be used, while taking into account a mobility condition and an address selection condition, address selection can be performed by considering the overall condition related to communication of the MN.

Eighth Embodiment

Figure 25:
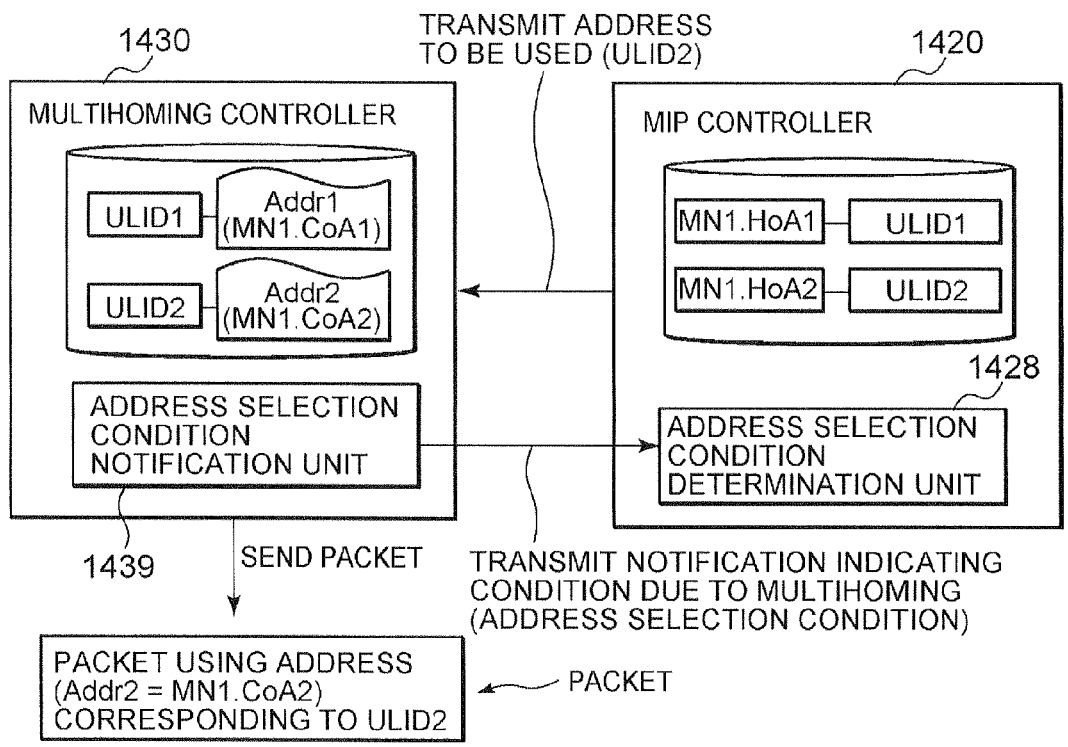
FIG. 25 is a schematic diagram showing the internal arrangement of an MN for explaining the overview of an eighth embodiment of the present invention.

Next, the eighth embodiment of the present invention will be described. FIG. 25 is a schematic diagram showing the internal arrangement of an MN to explain the overview of the eighth embodiment of the invention.

An MIP controller 1420 and a multihoming controller 1430 mounted in an MN are shown in FIG. 25. It should be noted that, as well as in FIG. 19, the presence of the MIP controller 1420 indicates that a protocol, such as an MIP that achieves mobility management, is mounted in the MN, and the presence of the multihoming controller 1430 indicates that a protocol that achieves multihoming is mounted in the MN. Further, as well as in FIG. 19, the multihoming controller 1430 holds a correlation between Addr1 (=MN1.CoA1) and ULID1 and a correlation between Addr2 (=MN1.CoA2) and ULID2, and the MIP controller 1420 holds a correlation between MN1.HoA1 and ULID1 and a correlation between MN1.HoA2 and ULID2.

The multihoming controller 1430 according to the eighth embodiment of the invention includes an address selection condition notification unit 1439. The address selection condition notification unit 1439 includes a function for transmitting, to the MIP controller 1420, an address selection condition that is available for the multihoming controller 1430 and is related to multihoming. On the other hand, the MIP controller 1420 according to the eighth embodiment of the invention includes an address selection condition determination unit 1428. The address selection condition determination unit 1428 includes a function for examining an address selection condition transmitted by the address selection condition notification unit 1439, and further obtaining and examining a mobility condition available for the MIP controller 1420, and for, based on these conditions, determining the most appropriate ULID (or an address corresponding to a ULID) for the current connection situation of the MN and/or a communication partner.

The address selection condition determination unit 1428 of the MIP controller 1420 obtains the address selection condition transmitted by the address selection notification unit 1439 of the multihoming controller 1430 and also obtains the mobility condition, and performs address selection based on both the address selection condition and the mobility condition. When the MIP controller 1420 designates, to a transmission packet, one of two addresses (ULID1 and ULID2) to be used, the address selection condition determination unit 1428 considers both the address selection condition and the mobility condition, determines that, for example, the address (Addr2) corresponding to ULID2 is better to use than the address (Addr1) corresponding to ULID1 to perform more appropriate communication, and transmits an instruction for setting of ULID2 to the transmission data packet generator 1422. As a result, the MIP controller 1420 transmits, to the multihoming controller 1430, a packet for which the address (Addr2) corresponding to the ULID2 is set as a source address. Further, for setting of a destination address as well as for a source address, the address selection condition determination unit 1428 of the MIP controller 1420 determines a destination address, while taking the address selection condition and the mobility condition into account, and transmits a packet by setting the address. In this manner, the MN performs packet transmission with address setting that reflects the address selection condition and the mobility condition.

Figure 26:
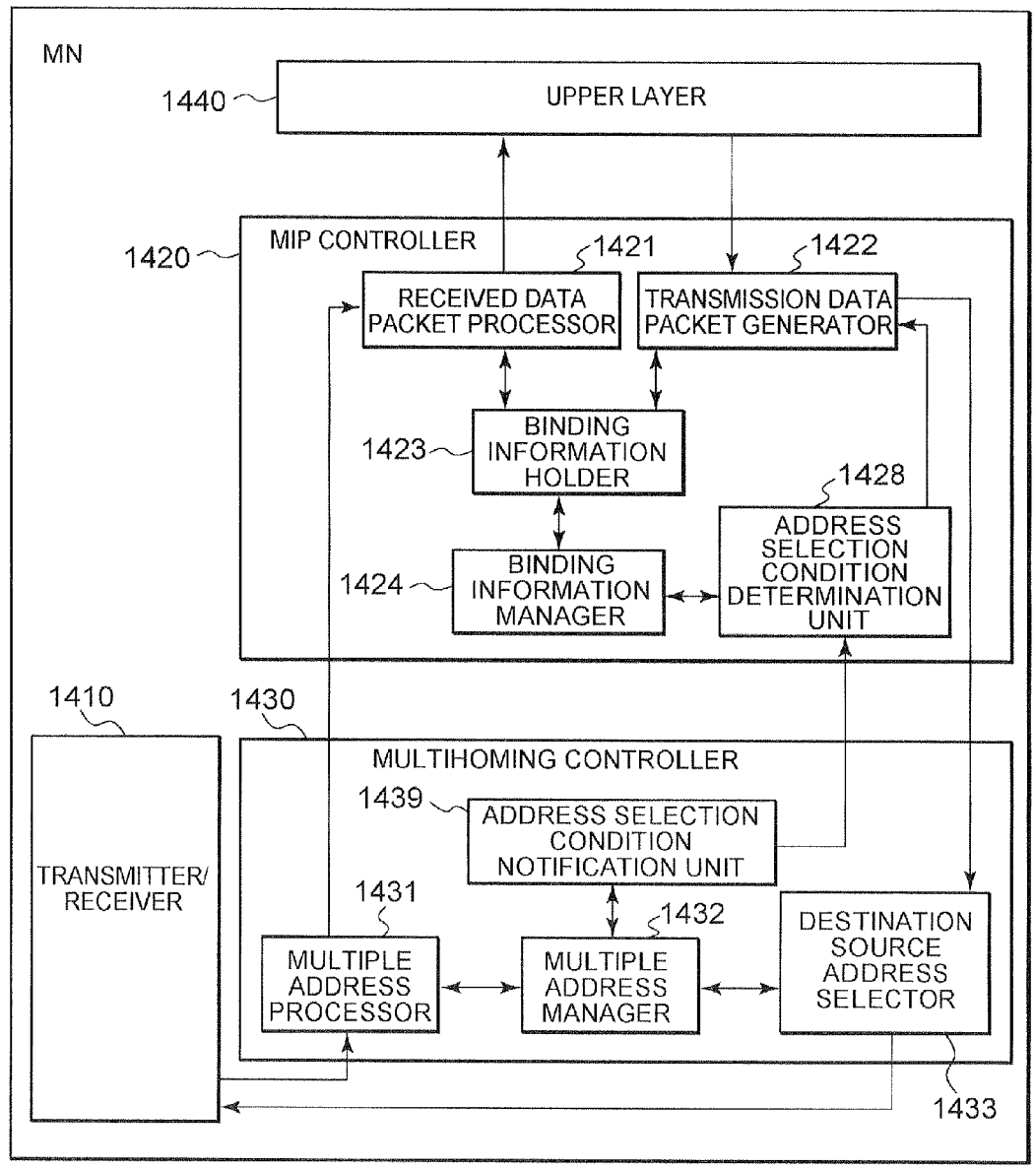
FIG. 26 is a block diagram showing an example internal configuration for the MN according to the eighth embodiment of the present invention.

The eighth embodiment of this invention will now be specifically explained. FIG. 26 is a block diagram showing an example internal arrangement for the MN according to the eighth embodiment of the invention. The MN in FIG. 26 includes a transmitter/receiver 1410, an MIP controller 1420, a multihoming controller 1430 and an upper layer 1440. Further, the MIP controller 1420 includes a received data packet processor 1421, a transmission data packet generator 1422, a binding information holder 1423, a binding information manager 1424 and an address selection condition determination unit 1428, while the multihoming controller 1430 includes a multiple address processor 1431, a multiple address manager 1432, a destination/source address selector 1433 and an address selection condition notification unit 1439. It should be noted that the MIP controller 1420, the address selection condition determination unit 1428, the multihoming controller 1430 and the address selection condition notification unit 1439 shown in FIG. 26 correspond to the MIP controller 1420, the address selection condition determination unit 1428, the multihoming controller 1430 and the address selection condition notification unit 1439 shown in FIG. 25.

The internal arrangement of the MN for the eighth embodiment of the invention will now be described by comparison with the internal arrangement (arrangement in FIG. 20) of the MN for the fifth embodiment of the invention.

Compared with the internal arrangement of the MN for the fifth embodiment of the invention, the internal arrangement of the MN for the eighth embodiment of the invention is greatly different in that, instead of the address selection condition determination unit 1138, the address selection condition notification unit 1439 is provided in the multihoming controller 1430, and the address selection condition determination unit 1428 is arranged in the MIP controller 1420.

The eighth embodiment of this invention is so designed that the address selection condition notification unit 1439 of the multihoming controller 1430 transmits, to the address selection condition determination unit 1428 of the MIP controller 1420, an address selection condition available for the multihoming controller 1430. It should be noted that, as well as the mobility notification unit 1327 of the seventh embodiment of the invention, the address selection condition notification unit 1439 can employ an arbitrary notification mode.

On the other hand, as one of conditions to be referred to for address selection, the address selection condition determination unit 1428 of the MIP controller 1420 employs an address selection condition transmitted by the address selection condition notification unit 1439, in addition to a mobility condition available for the MIP controller 1430. As a result, the address selection condition determination unit 1428 can consider both the address selection condition and the mobility condition related to multihoming, and determine a ULID to be used for a packet to be transmitted. Based on the address selection condition and the mobility condition, the address selection condition determination unit 1428 determines the most appropriate ULID (or the address corresponding to the ULID) for communication for the packet, and transmits the determination results to the transmission data packet generator 1422. The transmission data packet generator 1422 designates, as an address used for a packet to be transmitted to the multihoming controller 1430 positioned at a lower rank, the ULID that was transmitted by the address selection condition determination unit 1428. It should be noted that the address selection condition determination unit 1428 may be designed so as to passively accept an address selection condition from the address selection condition notification unit 1439, or to actively obtain the address selection condition for a reference from the multiple address manager 1432.

With the above described arrangement, the MN can perform address selection while taking into account both a mobility condition available for the MIP controller 1420, and an address selection condition available for the multihoming controller 1430. And, for example, based on the overall condition, the most appropriate ULID for communication can be selected from among ULIDs included in binding information stored in the MIP controller 1420, and packet transmission can be performed by using an address consonant with this ULID.

As described above, according to the eighth embodiment of the invention, since the MIP controller 1430 selects an address to be used, while taking into account a mobility condition and an address selection condition, address selection can be performed by considering the overall condition related to communication of the MN.

Ninth Embodiment

Figure 27:
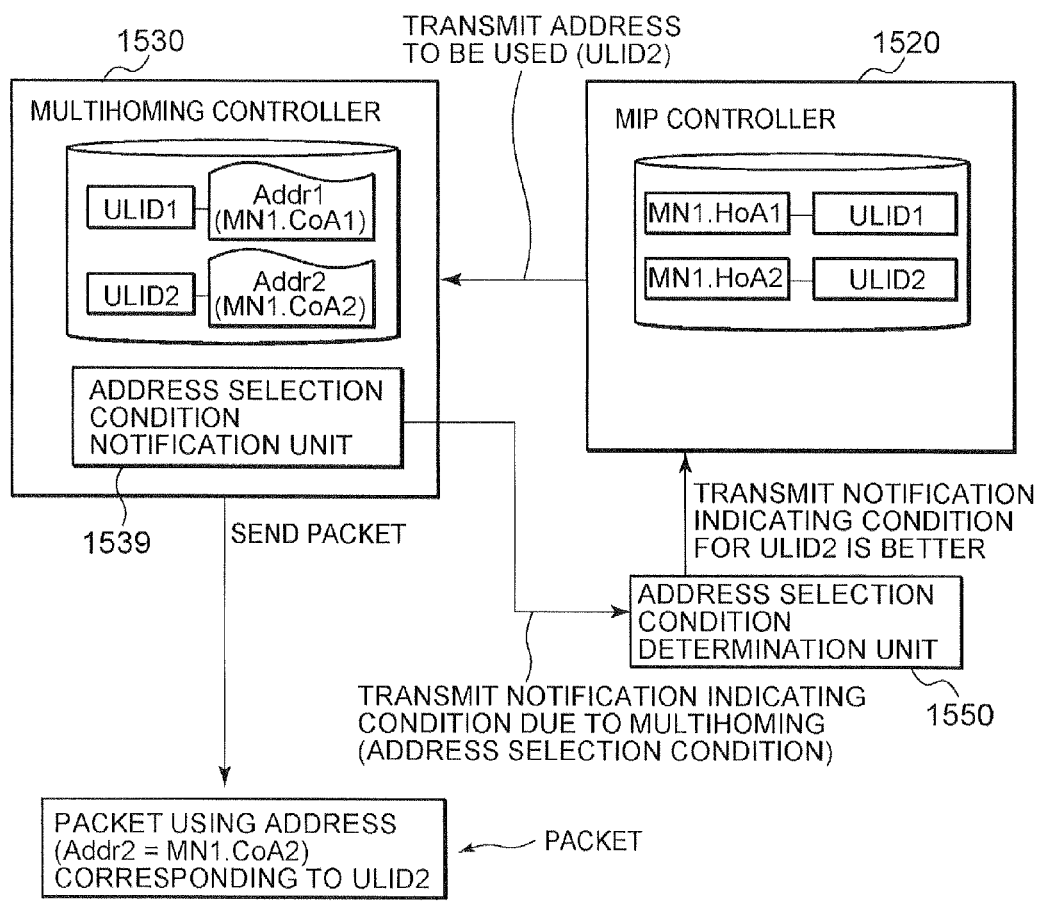
FIG. 27 is a schematic diagram showing the internal arrangement of an MN for explaining the overview of a ninth embodiment of the present invention.

Next, the ninth embodiment of the present invention will be described. FIG. 27 is a schematic diagram showing the internal arrangement of an MN to explain the overview of the ninth embodiment of the invention.

An MIP controller 1520 and a multihoming controller 1530 mounted in an MN are shown in FIG. 27. It should be noted that, as well as in FIG. 19, the presence of the MIP controller 1520 indicates that a protocol, such as an MIP that achieves mobility management, is mounted in the MN, and the presence of the multihoming controller 1530 indicates that a protocol that achieves multihoming is mounted in the MN. Further, as well as in FIG. 19, the multihoming controller 1530 holds a correlation between Addr1 (=MN1.CoA1) and ULID1 and a correlation between Addr2 (=MN1.CoA2) and ULID2, and the MIP controller 1520 holds a correlation between MN1.HoA1 and ULID1 and a correlation between MN1.HoA2 and ULID2.

The multihoming controller 1530 according to the ninth embodiment of the invention includes an address selection condition notification unit 1539. The address selection condition notification unit 1539 includes a function for transmitting, to an address selection condition determination unit 1550, an address selection condition that is available for the multihoming controller 1530 and is related to multihoming. On the other hand, the address selection condition determination unit 1550 includes a function for examining an address selection condition transmitted by the address selection condition notification unit 1539, and further obtaining and examining a mobility condition from the MIP controller 1520, and for, based on these conditions, determining the most appropriate ULID (or an address corresponding to a ULID) for the current connection situation of the MN and/or a communication partner. It should be noted that the address selection condition determination unit 1550 is present separately from the MIP controller 1520 and the multihoming controller 1530.

The address selection condition determination unit 1550 obtains an address selection condition transmitted by the address selection notification unit 1539 of the multihoming controller 1530, also obtains a mobility condition from the MIP controller 1520, and performs address selection based on both the address selection condition and the mobility condition. When the MIP controller 1520 designates, to a transmission packet, one of two addresses (ULID1 and ULID2) to be used, the address selection condition determination unit 1550 considers both the address selection condition and the mobility condition, determines that, for example, the address (Addr2) corresponding to ULID2 is better to use than the address (Addr1) corresponding to ULID1 to perform more appropriate communication, and transmits an instruction for setting of ULID2 to the MIP controller 1520. As a result, the MIP controller 1520 generates a packet for which the address (Addr2) corresponding to the ULID2 is designated as a source address, and transmits it to the multihoming controller 1530. Further, for setting of a destination address as well as for a source address, the address selection condition determination unit 1550 determines a destination address, while taking the address selection condition and the mobility condition into account, and transmits a packet by setting the address. In this manner, the MN performs packet transmission with address setting that reflects the address selection condition and the mobility condition.

Furthermore, the address selection condition determination unit 1550 transmits, to the MIP controller 1520, the determination results (ULID) obtained while taking into account only an address selection condition that was transmitted by the address selection condition notification unit 1539 of the multihoming controller 1530, and the MIP controller 1520 may either employ the ULID transmitted by the address selection condition determination unit 1550, or may determine a ULID while further taking a mobility condition into account.

Figure 28:
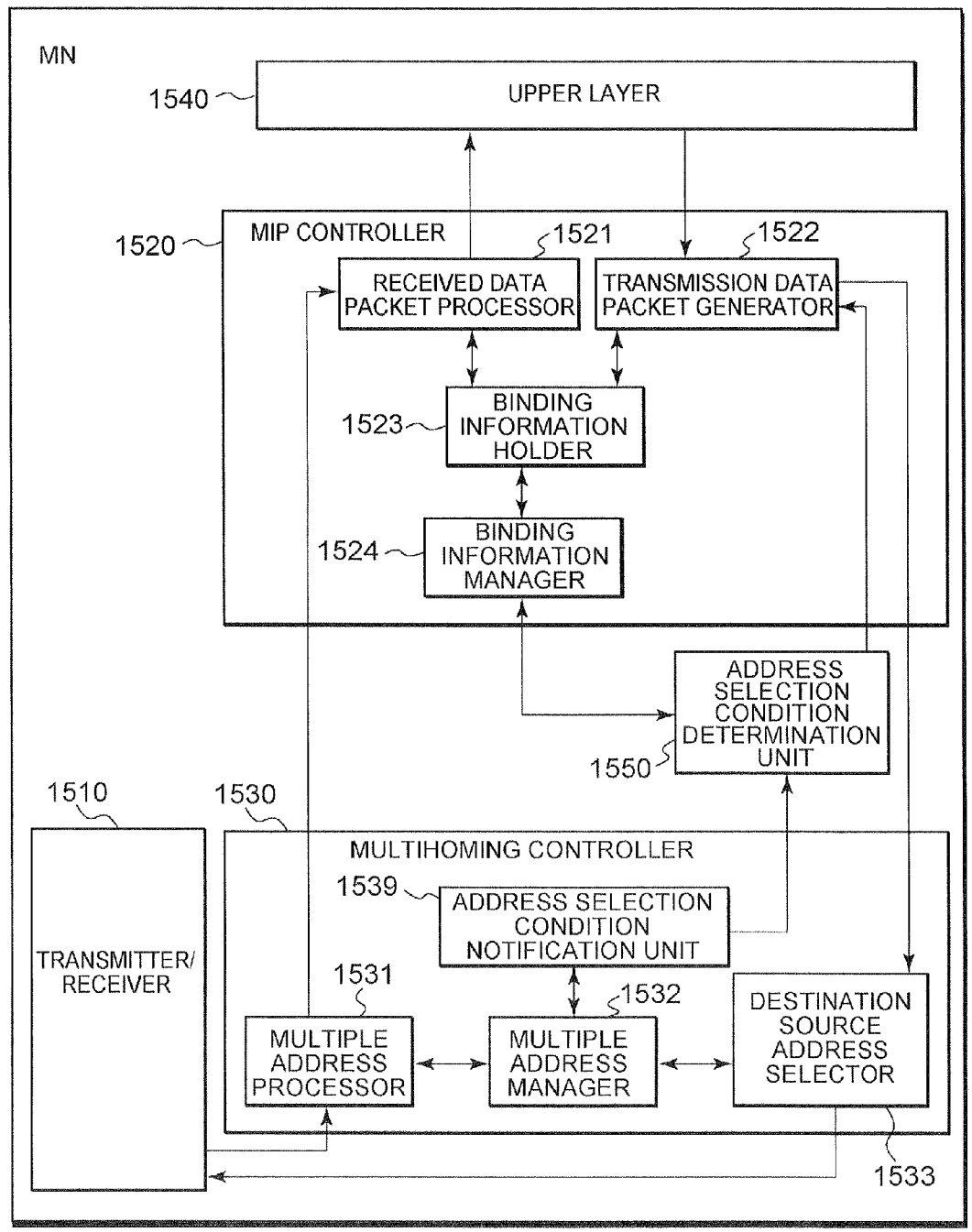
FIG. 28 is a block diagram showing an example internal configuration for the MN according to the ninth embodiment of the present invention.

The ninth embodiment of this invention will now be specifically explained. FIG. 28 is a block diagram showing an example internal arrangement for the MN according to the ninth embodiment of the invention. The MN in FIG. 28 includes a transmitter/receiver 1510, an MIP controller 1520, a multihoming controller 1530, an upper layer 1540 and an address selection condition determination unit 1550. Further, the MIP controller 1520 includes a received data packet processor 1521, a transmission data packet generator 1522, a binding information holder 1523 and a binding information manager 1524, while the multihoming controller 1530 includes a multiple address processor 1531, a multiple address manager 1532, a destination/source address selector 1533 and an address selection condition notification unit 1539. It should be noted that the MIP controller 1520, the multihoming controller 1530, the address selection condition notification unit 1539 and the address selection condition determination unit 1550 shown in FIG. 28 correspond to the MIP controller 1520, the multihoming controller 1530, the address selection condition notification unit 1539 and the address selection condition determination unit 1550 shown in FIG. 27.

The internal arrangement of the MN for the ninth embodiment of the invention will now be described by comparison with the internal arrangement (arrangement in FIG. 26) of the MN for the eighth embodiment of the invention.

Compared with the internal arrangement of the MN for the eighth embodiment of the invention, the MN for the ninth embodiment of the invention differs in that the address selection condition determination unit 1550 is provided separately from the MIP controller 1520 and the multihoming controller 1530.

The ninth embodiment of this invention is so designed that the address selection condition notification unit 1539 of the multihoming controller 1530 transmits, to the address selection condition determination unit 1550, an address selection condition available for the multihoming controller 1530. It should be noted that, as well as the mobility notification unit 1327 of the seventh embodiment of the invention, the address selection condition notification unit 1539 can employ an arbitrary notification mode.

On the other hand, the address selection condition determination unit 1550 can consider the address selection condition transmitted by the address selection condition notification unit 1539, and determine a ULID to be used for a packet to be transmitted. Based on the address selection condition, the address selection condition determination unit 1550 determines the most appropriate ULID (or the address corresponding to the ULID) for communication for the packet, and transmits the determination results to the transmission data packet generator 1522 of the MIP controller 1520. The transmission data packet generator 1522 designates, as an address used for a packet to be transmitted to the multihoming controller 1530 positioned at a lower rank, the ULID that was transmitted by the address selection condition determination unit 1550. It should be noted that the address selection condition determination unit 1550 may be designed so as to passively accept an address selection condition from the address selection condition notification unit 1539, or to actively obtain the address selection condition for a reference from the multiple address manager 1532.

Additionally, the address selection condition determination unit 1550 can obtain a mobility condition from the binding information manager 1524 of the MIP controller 1520, and can determine a ULID used for a transmission packet, while taking into account both the address selection condition and the mobility condition. In this case, the ULID that the address selection condition determination unit 1550 transmits to the MIP controller 1520 is to be determined based on the overall condition that includes both the address selection condition and the mobility condition.

With the above described arrangement, the MN can perform address selection while taking into account both an address selection condition available for the MIP controller 1420 (also a mobility condition available for the MIP controller 1530). And, for example, based on the overall condition, the most appropriate ULID for communication can be selected from among ULIDs included in binding information stored in the MIP controller 1520, and packet transmission can be performed by using an address consonant with this ULID.

As described above, according to the ninth embodiment of the invention, since the address selection condition determination unit 1550 selects an address to be used, while taking into account a mobility condition and an address selection condition, the MIP controller 1520 can perform address selection based on a notification received from the address selection condition determination unit 1550, so that selection and usage of an address while taking an address selection condition into account is enabled.

As components used in common for the first to the fourth embodiments of the invention, the MN includes: the multihoming controller, which is the presence representing that a protocol that achieves multihoming is mounted; and the mobility controller, which is the presence representing that a protocol, such as MIP that achieves mobility management, is mounted. These controllers are regarded as separate controllers having different functions. The mobility controller serves as a function that provides moving transmission of the MN, and this is a necessary function only for the MN. On the other hand, the multihoming controller serves as a function for managing a plurality of addresses configured in the multihomed state of a node, and this function is used not only by the MN, but also in the case wherein a fixed node is in the multihomed state by site multihoming.

As described above, the multihomed state is a state that could happen regardless of a fixed node. For the MN, as assuming while referring to FIG. 1, the case wherein multiple addresses managed by the multihoming controller are HoAs for the MIP could easily occur. While taking this case into account, it can be said that the multihomed state due to multiple HoA is closely related to the operation and the structure of the MIP. Since multihoming using multiple HoA (hereinafter referred to as MIP multihoming) can be said as one form of the multihomed state handled by the multihoming controller, the function for handling the MIP multihoming may be provided as a controller (MIP multihoming controller) separate from the multihoming controller. Therefore, in this case, when the function included in the multihoming controller explained in the first to the fourth embodiments of the invention is provided for the MIP multihoming controller, the same effects as obtained in each embodiment described above can be obtained. Furthermore, also in the case of multihoming performed lower than the MIP controller, as described in the fifth to the ninth embodiments of the invention, the function that handles these states can be provided as an MIP multihoming controller that handles lower multihoming. Additionally, when only mobility is focused on, the presence of a multihoming controller that performs multihoming other than MIP multihoming can be ignored, and when a multihome other than an MIP multihome is not present, only the MIP multihome can be operated. Therefore, by employing the functions of two controllers, i.e., the MIP multihoming controller and the MIP controller described in the first to the ninth embodiments of the invention, the multihoming problem of this invention can be resolved.

Moreover, the technical contents disclosed in the individual embodiments of the invention have merely expressed examples of the invention, and the present invention includes a scope that is understood or inferred based on the technical contents disclosed in the individual embodiments. Furthermore, the meanings described by terms and definitions of the terms that are employed in the above described embodiments of the invention, the concepts disclosed in the individual embodiments of the invention, etc., are not limited to those in the embodiments, and can be applied for other embodiments.

The individual functional blocks employed for the explanation for the above embodiments of the invention are provided typically as LSI (Large Scale Integration) that are integrated circuits. These may be separately formed as chips, or may be formed into one chip to cover one part or all of them. It should be noted that an LSI is employed here; however, depending on an integration level, the circuit may be called an IC (Integrated Circuit), a system LSI, a super LSI or a ultra LSI.

Further, the integrated circuit method is not limited to the LSI, and a special circuit or a general-purpose processor may be employed. After the LSI is manufactured, an FPGA (Field Programmable Gate Array) that can be programmed, or a reconfigurable processor, for which connection and setup of the circuit cell of the LSI can be reconfigured, may be employed.

Furthermore, when an integrated circuit technology to replace the LSI appears by the advance of a semiconductor technique or by development of another technique, naturally, the functional blocks may be integrated by using this technology. There is a possibility that, for example, a biotechnology will be applied.

INDUSTRIAL APPLICABILITY

The present invention provides the effects that, in the case wherein the communication node includes both a mobility management function and a multihoming function, an appropriate address can be selected from multiple addresses in a multihomed state. This invention can be applied for a technique related to communication using an IP, and a technique that provides both a multihoming function and a mobile function.

The invention claimed is:

1. A communication node comprising:
   a multihoming control unit that manages a multihomed host that includes a plurality of addresses originating in different networks;
   a mobility management unit, located at a layer lower than the multihoming control unit, that manages movements;
   a mobility condition determination unit that determines an address appropriate for communication with a communication partner, by taking into account a mobility condition that is caused by movement of the communication node or the communication partner and is available from said mobility management unit; and
   a transmission data packet generation unit that generates a packet for which said address appropriate for communication with the communication partner is designated based on determination results determined by said mobility condition determination unit.

2. The communication node according to claim 1,
   wherein said mobility management unit includes said mobility condition determination unit, and
   wherein said multihoming control unit selects, from the plurality of addresses, said address appropriate for communication with the communication partner based on a notification of the determination results transmitted from said mobility condition determination unit to said multihoming control unit.

3. The communication node according to claim 1,
   wherein said mobility management unit includes said mobility condition determination unit, and
   wherein said mobility condition determination unit determines which address is appropriate for communication with the communication partner, in disregard of an address selection condition that is related to a multihomed state and is available from said multihoming unit.

4. The communication node according to claim 1,
   wherein said mobility management unit includes said mobility condition determination unit, and
   wherein said multihoming control unit transmits, to said mobility condition determination unit, a notification indicating an address selection condition that is related to a multihomed state and is available from said multihoming control unit, and
   wherein said mobility condition determination unit determines said address appropriate for communication with the communication partner by taking into account both the mobility condition and the address selection condition.

5. The communication node according to claim 1,
   wherein said mobility management unit includes a mobility condition notification unit for obtaining the mobility condition and transmitting the mobility condition to said mobility condition determination unit;
   wherein said multihoming control unit includes said mobility condition determination unit, and
   wherein, based on the determination results determined by said mobility condition determination unit, said multihoming control unit selects said address appropriate for communication with the communication partner from the plurality of addresses.

6. The communication node according to claim 5,
   wherein said mobility condition determination unit determines said address appropriate for communication with the communication partner, by taking into account both the mobility condition and also an address selection condition that is related to a multihomed state and is available from said multihoming control unit.

7. The communication node according to claim 1,
   wherein said mobility management unit includes a mobility condition notification unit for obtaining the mobility condition, and transmits, to said mobility condition determination unit, a notification indicating the mobility condition,
   wherein said mobility condition determination unit is provided separately from said multihoming control unit and said mobility management unit, and
   wherein, based on the determination results received from said mobility condition determination unit, said multihoming control unit selects, from the plurality of addresses, said address appropriate for communication with the communication partner.

8. The communication node according to claim 1,
   wherein said mobility management unit includes:
   a multiple home address information sets holding unit that employs the plurality of addresses as individual home addresses to hold correlation information between the plurality of home addresses and care-of addresses corresponding to the home addresses; and
   a message generation unit that generates and transmits a plurality of messages, each of which includes each of a plurality of correlation information sets and is added with identification information to identify the communication node.

9. The communication node according to claim 8, wherein said message generation unit generates and transmits the messages, wherein each message includes both the correlation information and also a usage priority of an address included in the correlation information.

10. The communication node according to claim 1,
    wherein said mobility management unit includes:
    a message reception unit that receives, from a different communication node, a message which includes correlation information between a home address owned by the different communication node and a corresponding care-of address and is added with identification information to identify the different communication node; and
    a binding cache holding unit that stores together the correlation information and the identification information received by the message reception unit.

11. The communication node according to claim 10,
    wherein said message reception unit receives the message that includes both the correlation information and also a usage priority of an address included in the correlation information, and
    wherein said binding cache holding unit stores the usage priority of the address, in correlation with the correlation information and the identification information.

12. The communication node according to claim 10, wherein the mobility condition taken into account by said mobility condition determination unit is employed as a condition that is available from information held by said binding cache holding unit.

13. The communication node according to claim 1,
    wherein said mobility management unit includes:
    an address information holding unit that employs one of the plurality of addresses as a home address, and that holds correlation information between the home address and a plurality of care-of addresses corresponding to the home address; and
    a message transmission unit that generates and transmits a first message that includes the correlation information and a second message that includes care-of address selection information to be used as a condition for selection of one of the plurality of care-of addresses.

14. The communication node according to claim 1, wherein said mobility management unit includes:
a message reception unit that receives, from a different node, a first message that includes correlation information between a home address for the different node and a plurality of care-of addresses corresponding to the home address, and a second message that includes care-of address selection information to be used as a condition for selection of one of the plurality of care-of addresses; and
a destination address setting unit that selects one of the plurality of care-of addresses based on the care-of address selection information included in the second message that is received by the message reception unit, and that designates the selected care-of address as a destination address of a packet that should arrive at the different communication node.

15. The communication node according to claim 1, wherein said mobility management unit includes:
a message reception unit that receives, from a different communication node, a first message that includes a plurality of addresses for the different communication node, and a second message that includes address selection information to be used as a condition for selection of one of the plurality of addresses; and
a destination address setting unit that selects one of the plurality of addresses based on the address selection information that is included in the second message received by the message reception unit, and that designates the selected address as a destination address of a packet to be transmitted to the different communication node.

16. A communication node comprising:
a multihoming control unit that manages a multihomed host that includes a plurality of addresses originating in different networks;
a mobility management unit, located at a layer higher than the multihoming control unit, that manages movements;
an address selection condition determination unit that determines an address appropriate for communication with a communication partner, by taking into account an address selection condition that is related to a multihomed state and is available from said multihoming control unit; and
a transmission data packet generation unit that generates a packet for which said address appropriate for communication with the communication partner is designated based on determination results determined by said address selection condition determination unit.

17. The communication node according to claim 16, wherein said multihoming control unit includes said address selection condition determination unit, and
wherein said mobility management unit selects, from the plurality of addresses, said address appropriate for communication with the communication partner, based on a notification of the determination results transmitted from said address selection condition determination unit to said mobility management unit.

18. The communication node according to claim 16, wherein said multihoming control unit includes said address selection condition determination unit, and
wherein said address selection condition determination unit determines which address is appropriate for communication with the communication partner, in disregard of a mobility condition that is caused by movement of the communication node or the communication partner and is available from said mobility management unit.

19. The communication node according to claim 16,
wherein said multihoming control unit includes said address selection condition determination unit,
wherein said mobility management unit transmits, to said address selection condition determination unit, a notification indicating a mobility condition that is caused by movement of the communication node or the communication partner and is available from said mobility management unit, and
wherein said address selection condition determination unit determines said address appropriate for communication with the communication partner by taking into account both the address selection condition and also the mobility condition.

20. The communication node according to claim 16,
wherein said multihoming control unit includes an address selection condition notification unit that obtains the address selection condition and transmitting the address selection condition to said address selection condition determination unit,
wherein said mobility management unit includes said address selection condition determination unit, and
wherein, based on the determination results determined by said address selection condition determination unit, said mobility management unit selects said address appropriate for communication with the communication partner from the plurality of addresses.

21. The communication node according to claim 20, wherein said address selection condition determination unit determines said address appropriate for communication with the communication partner, by taking into account both the address selection condition, and also a mobility condition that is caused by movement of the communication node or the communication partner and is available from said mobility management unit.

22. The communication node according to claim 16,
wherein said multihoming control unit includes an address selection condition notification unit that obtains the address selection condition, and transmits, to said address selection condition determination unit, a notification indicating the address selection condition,
wherein said address selection condition determination unit is provided separately from said mobility management unit and said multihoming control unit, and
wherein, based on the determination results received from said address selection condition determination unit, said mobility management unit selects, from the plurality of addresses, said address appropriate for communication with the communication partner.

23. A communication node, which has a plurality of care-of addresses corresponding to one home address, comprising:
an address information holding unit that holds correlation information between the home address and the plurality of care-of addresses corresponding to the home address; and
a message transmission unit that generates and transmits a first message that includes the correlation information and a second message that includes care-of address selection information to be used as a condition for selection of one of the plurality of care-of addresses.

24. A communication node, which performs transmission or transfer of a packet, comprising:
a message reception unit that receives, from a different communication node, a first message that includes correlation information between a home address for the different node and a plurality of care-of addresses corresponding to the home address, and a second message that includes care-of address selection information to be used as a condition for selection of one of the plurality of care-of addresses; and a destination address setting unit that selects one of the plurality of care-of addresses based on the care-of address selection information included in the second message that is received by the message reception unit, and that designates the selected care-of address as a destination address of a packet to be transmitted to the different communication node.

25. A communication node, which performs packet transmission, comprising:

a message reception unit that receives, from a different communication node, a first message that includes a plurality of addresses for the different communication node, and a second message that includes address selection information to be used as a condition for selection of one of the plurality of addresses;

a destination address setting unit that selects one of the plurality of addresses based on the address selection information that is included in the second message received by the message reception unit, and that designates the selected address as a destination address of a packet to be transmitted to the different communication node.

26. A communication control method, for a communication node that comprises a multihoming control unit that manages a multihomed host that includes a plurality of addresses originating in different networks, and a mobility management unit, located at a layer lower than the multihoming control unit, that manages movements, the communication control method comprising:

generating a packet, for which an address appropriate for communication with a communication partner is designated, by taking into account a mobility condition that is caused by movement of the communication node or the communication partner and is available from said mobility management unit.

27. The communication control method according to claim 26, wherein said mobility management unit selects said address appropriate for communication with the communication partner, by taking into account the mobility condition.

28. The communication control method according to claim 26, wherein said mobility management unit transmits, to said multihoming control unit, a notification indicating the mobility condition, and wherein said multihoming control unit selects, from the plurality of addresses, said address appropriate for communication with the communication partner, by taking into account the mobility condition.

29. The communication control method according to claim 26, wherein said mobility management unit transmits the mobility condition to a mobility condition determination unit that is provided separately from said multihoming control unit and said mobility management unit, and wherein said mobility condition determination unit selects said address appropriate for communication with the communication partner, by taking into account the mobility condition.

30. The communication control method according to claim 26, wherein both the mobility condition, and also an address selection condition that is related to a multihomed state and is available from said multihoming control unit, is taken into account.

31. A communication control method, for a communication node that comprises a multihoming control unit that manages a multihomed host including a plurality of addresses originating in different networks, and a mobility management unit, located at a layer higher than the multihoming control unit, that manages movements, the communication control method comprising:

generating a packet, for which an address appropriate for communication with a communication partner is designated, by taking into account an address selection condition that is related to a multihomed state and is available from said multihoming control unit.

32. The communication control method according to claim 31, wherein said multihoming control unit selects said address appropriate for communication with the communication partner, by taking into account the address selection condition.

33. The communication control method according to claim 31, wherein said multihoming control unit transmits, to said mobility management unit, a notification indicating the address selection condition, and wherein said mobility management unit selects, from the plurality of addresses, said address appropriate for communication with the communication partner, by taking into account the address selection condition.

34. The communication control method according to claim 31, wherein said multihoming control unit transmits the address selection condition to an address selection condition determination unit that is provided separately from said mobility management unit and said multihoming control unit, and wherein said address selection condition determination unit selects said address appropriate for communication with the communication partner, by taking into account the address selection condition.

35. The communication control method according to claim 31, wherein both the address selection condition, and also a mobility condition that is caused by movement of the communication node or the communication partner and is available from said mobility management unit is taken into account.

* * * * *